United States Patent
Naiki

(10) Patent No.: US 10,505,831 B2
(45) Date of Patent: Dec. 10, 2019

(54) SENSOR NETWORK SYSTEM AND OPERATIONAL METHOD OF THE SAME

(71) Applicant: ROHM CO., LTD., Ukyo-ku, Kyoto-shi, Kyoto (JP)

(72) Inventor: Takashi Naiki, Kyoto (JP)

(73) Assignee: ROHM CO., LTD., Kyoto (JP)

(*) Notice: Subject to any disclaimer, the term of this patent is extended or adjusted under 35 U.S.C. 154(b) by 154 days.

(21) Appl. No.: 15/608,368

(22) Filed: May 30, 2017

(65) Prior Publication Data

US 2017/0339035 A1 Nov. 23, 2017

Related U.S. Application Data

(63) Continuation of application No. PCT/JP2015/074626, filed on Aug. 31, 2015.

(30) Foreign Application Priority Data

Nov. 28, 2014 (JP) ................. 2014-241660

(51) Int. Cl.
*H04L 12/26* (2006.01)
*G08C 25/00* (2006.01)
*H04L 12/24* (2006.01)
*H04L 29/08* (2006.01)

(52) U.S. Cl.
CPC .......... *H04L 43/0817* (2013.01); *G08C 25/00* (2013.01); *H04L 41/0672* (2013.01);
(Continued)

(58) Field of Classification Search
CPC . G08C 25/00; H04L 41/0672; H04L 41/0681; H04L 43/0817; H04L 67/10;
(Continued)

(56) References Cited

U.S. PATENT DOCUMENTS 5,677,493 A 10/1997 Yamamoto
6,016,706 A 1/2000 Yamamoto
(Continued)

FOREIGN PATENT DOCUMENTS

JP 06102116 A 4/1994
JP 2009110546 A 5/2009
(Continued)

OTHER PUBLICATIONS

International Search Report for corresponding application PCT/JP2015/074626, dated Oct. 13, 2015; with English Translation.

*Primary Examiner* — Jamal Javaid
(74) *Attorney, Agent, or Firm* — Cantor Colburn LLP

(57) ABSTRACT

A sensor network system including: a sensor object; a plurality of sensor node communication terminals mounted on the sensor object, and respectively including a plurality of sensor elements each having a function equivalent to one another; a data server configured to store sensor information of the plurality of the sensor elements for plurality of every sensor node communication terminals; and a data management unit configured to analyze the sensor information stored in the data server, wherein the data management unit executes self-diagnostics of failures of the plurality of the sensor elements and the plurality of the sensor node communication terminals in accordance with a failure diagnosis algorithm, and thereby maintenance of the sensor element or sensor node communication terminal determined to be in failure can be performed.

16 Claims, 31 Drawing Sheets

(52) U.S. Cl.
CPC .......... *H04L 41/0681* (2013.01); *H04L 67/10* (2013.01); *H04L 67/125* (2013.01)

(58) Field of Classification Search
CPC ..... H04L 67/125; H04L 41/069; H04L 67/12; G08B 25/10
See application file for complete search history.

(56) References Cited

U.S. PATENT DOCUMENTS

| | | | |
|---|---|---|---|
| 6,859,831 B1* | 2/2005 | Gelvin | B60R 25/1004 |
| | | | 709/224 |
| 7,848,906 B2 | 12/2010 | Keyes, IV | |
| 9,886,723 B1* | 2/2018 | Devereaux | G06Q 40/08 |
| 9,958,291 B1* | 5/2018 | Shunturov | G01D 4/002 |
| 2003/0171827 A1 | 11/2003 | Keyes, IV | |
| 2006/0142875 A1 | 6/2006 | Keyes, IV | |
| 2011/0134973 A1 | 6/2011 | Keyes, IV | |
| 2012/0026890 A1* | 2/2012 | Banka | H04L 67/125 |
| | | | 370/242 |
| 2013/0317659 A1* | 11/2013 | Thomas | H04W 52/0216 |
| | | | 700/286 |
| 2014/0343992 A1 | 11/2014 | DeMerchant et al. | |

FOREIGN PATENT DOCUMENTS

| | | |
|---|---|---|
| JP | 2012-083847 A | 4/2012 |
| JP | 2013-034210 A | 2/2013 |
| JP | 2013-200695 A | 10/2013 |
| JP | 2014-096050 A | 5/2014 |

\* cited by examiner

SENSOR NETWORK SYSTEM AND OPERATIONAL METHOD OF THE SAME

CROSS REFERENCE TO RELATED APPLICATIONS

This is a continuation application (CA) of PCT Application No. PCT/JP2015/74626, filed on Aug. 31, 2015, which claims priority to Japan Patent Application No. P2014-241660 filed on Nov. 28, 2014 and is based upon and claims the benefit of priority from prior Japanese Patent Application No. P2014-241660 filed on Nov. 28, 2014 and PCT Application No. PCT/JP2015/74626, filed on Aug. 31, 2015, the entire contents of each of which are incorporated herein by reference.

FIELD

Embodiments described herein relate to a sensor network system and an operational method of such a sensor network system.

BACKGROUND

In recent years, compact sensor terminals having wireless functions (sensor node communication terminal) containing a power supply have been developed. Such sensor node communication terminals have been installed over a plurality of outdoor building structures (e.g. bridges, roads, railroad service, buildings, and the like), for example, and used for measurements and analyses of environmental information including various physical quantities, e.g. temperatures, humidity, amounts of strain, etc.

There are applicabilities to monitoring of health conditions of infrastructures by introducing such sensor node communication terminals to structures of social infrastructures so as to execute sampling the information. More specifically, there have been proposed variously wireless sensor network systems in which measured data transmitted from a plurality of sensor node communication terminals is received and stored in host communication terminals, and thereby states of building structures etc. are automatically measured in order to monitor the states thereof on the basis of the measured data.

Such above-mentioned building structures, such as bridges, roads, railroad services, buildings, etc., are gradually over-aged by aged change/deterioration due to winds and rains, vibrations, etc. with the lapse of years since the building structures constructed.

Accordingly, there have been spread so-called conceptions of Structural Health Monitoring (SHM) for monitoring progress and positions of deteriorations, etc. in these building structures using such sensor network systems, and predicting timing for performing maintenance (e.g. repairs), before breakage or destruction of the building structures.

It is said that lifetimes of infrastructure constructions which are sensor objects are several tens of year. On the other hand, ordinary electronic components composing sensor node communication terminals do not have sufficient working lifetimes.

For example, although working lifetimes of building structures, e.g. bridges, are supposed to be approximately tens of years, working lifetimes of sensor elements composed by including several kinds of electronic components are from approximately five years to approximately ten years (depending on kinds of the electronic components). Accordingly, in order to continuously perform the structural health monitoring over several tens of years with respect to the infrastructure constructions which are sensor objects, maintenances are required for exchanging the sensor elements or sensor node communication terminals itself in accordance with deterioration states or failed states, etc.

However, since conventional sensor node communication terminals include only one sensor element therein as a sensor configured to detect each physical quantity, the sensor element detected only states where operations of the sensor element are stopped due to expiration of lifetimes or occurrence of failures.

Moreover, when sensor data (measured data) continuously or intermittently transmitted from each sensor node communication terminal is received in host communication terminals, it was difficult to determine whether an abnormality is detected in structures which are sensor objects (i.e., whether the measured data is correct), or whether the measured data is incorrect (i.e., a failure occurs in the sensor node communication terminal), with regard to abnormal measured data.

Moreover, there was a problem that it is only understood that sensor elements mounted on sensor node communication terminals cannot execute sensing due to expiration of lifetimes or occurrence of failures.

Accordingly, there was a problem that it was difficult to predict timing of maintenance, such as replacement, before expiration of lifetimes or occurrence of failures of the sensor elements in conventional sensor elements, and thereby constituting an obstacle to continuous structural health monitoring.

SUMMARY

The embodiments provide: a sensor network system capable of executing self-diagnostics of a sensor element and a sensor node communication terminal and also capable of executing continuously conservation and maintenance thereof; and an operational method of such a sensor network system.

According to one aspect of the embodiments, there is provided a sensor network system comprising: a sensor object; a plurality of sensor node communication terminals mounted on the sensor object, the plurality of the sensor node communication terminals respectively comprising a plurality of sensor elements having a function equivalent to one another; a data server configured to store sensor information for every plurality of the sensor node communication terminals obtained by the plurality of the sensor elements; and a data management unit configured to analyze the sensor information stored in the data server, wherein the data management unit executes self-diagnostics of failures of the plurality of the sensor elements and the plurality of the sensor node communication terminals in accordance with a failure diagnosis algorithm, and thereby maintenance of the sensor element or sensor node communication terminal determined to be in failure can be performed.

According to another aspect of the embodiments, there is provided a sensor network system comprising: a sensor object; a plurality of sensor node communication terminals mounted on the sensor object, the plurality of the sensor node communication terminals respectively comprising a plurality of sensor elements having a function equivalent to one another; and a host communication terminal comprising a data storage unit and a data management unit, the data storage unit configured to collect and store sensor information for the plurality of every sensor node communication terminals obtained in the plurality of the sensor elements, the data management unit configured to analyze the sensor information stored in the data storage unit, wherein the data management unit executes self-diagnostics of failures of the plurality of the sensor elements and the plurality of the sensor node communication terminals in accordance with a failure diagnosis algorithm, and thereby maintenance of the sensor element or sensor node communication terminal determined to be in failure can be performed.

According to still another aspect of the embodiments, there is provided a sensor network system comprising: a sensor object; a plurality of sensor node communication terminals mounted on the sensor object, the plurality of the sensor node communication terminals respectively comprising a plurality of sensor elements having a function equivalent to one another; a host communication terminal configured to collect sensor information for every plurality of the sensor node communication terminals obtained by the plurality of the sensor elements; a data server configured to store the sensor information for every plurality of the sensor node communication terminals obtained by the plurality of the sensor elements; and a data management unit configured to analyze the sensor information stored in the data server, wherein the data management unit executes self-diagnostics of failures of the plurality of the sensor elements and the plurality of the sensor node communication terminals in accordance with a failure diagnosis algorithm, and thereby maintenance of the sensor element or sensor node communication terminal determined to be in failure can be performed.

According to yet another aspect of the embodiments, there is provided a sensor network system comprising: a sensor object; a plurality of group network systems mounted on the sensor object, the plurality of the group network systems respectively including a plurality of sensor node communication terminals and a host communication terminal, each of the sensor node communication terminals including a plurality of sensor elements, each of the sensor elements having a function equivalent to one another, the host communication terminal configured to collect sensor information for every plurality of the sensor node communication terminals obtained by the plurality of the sensor elements; a data server configured to store the sensor information for every plurality of the sensor node communication terminals obtained by the plurality of the sensor elements; and a data management unit configured to analyze the sensor information stored in the data server, wherein the data management unit executes self-diagnostics of failures of the plurality of the sensor elements and the plurality of the sensor node communication terminals in accordance with a failure diagnosis algorithm, and thereby maintenance of the sensor element or sensor node communication terminal determined to be in failure can be performed.

According to further aspect of the embodiments, there is provided a sensor network system comprising: a sensor object; and a plurality of sensor node communication terminals mounted on the sensor object, the plurality of sensor node communication terminals respectively comprising a plurality of sensor elements, a memory, and a control unit, each of the sensor elements having a function equivalent to one another, the memory configured to store sensor information obtained by the plurality of the sensor elements, the control unit configured to analyze the sensor information stored in the memory, wherein the control unit executes self-diagnostics of failures of the plurality of the sensor elements and the plurality of the sensor node communication terminals in accordance with a failure diagnosis algorithm, and thereby maintenance of the sensor element or sensor node communication terminal determined to be in failure can be performed.

According to still further aspect of the embodiments, there is provided a sensor network system comprising: a sensor object; and a plurality of sensor node communication terminals mounted on the sensor object, the plurality of the sensor node communication terminals respectively comprising a plurality of sensor elements having a function equivalent to one another, wherein the a plurality of the sensor elements comprises a sensor, a memory configured to store sensor information obtained by the sensor, and a control unit configured to analyze the sensor information stored in the memory, wherein the control unit executes self-diagnostics of failures of the plurality of the sensor elements and the plurality of the sensor node communication terminals in accordance with a failure diagnosis algorithm, and thereby maintenance of the sensor element or sensor node communication terminal determined to be in failure can be performed.

According to yet further aspect of the embodiments, there is provided an operational method of a sensor network system comprising: receiving measured values of a plurality of sensor elements, and storing the received measured values therein; excepting a sensor element already failed therefrom to be analyzed; determining whether or not a variation in each measured value is within a relationship range; analyzing the measured value of an available sensor element if a result of the determination is YES; determining the corresponding sensor element as a failure if the result of the determination is NO, and analyzing the measured value of the available sensor element; determining whether or not a failure level is not less than a reference value; completing failure determination if the failure level is less than the reference value; performing maintenance of the corresponding sensor element if the failure level is not less than the reference value; and completing the failure determination after resetting failure information of the corresponding sensor element.

According to the embodiments, there can be provided: the sensor network system capable of executing the self-diagnostics of the sensor element and the sensor node communication terminal and also capable of executing continuously the conservation and maintenance thereof; and the operational method of such a sensor network system.

DESCRIPTION OF EMBODIMENTS

Figure 1:
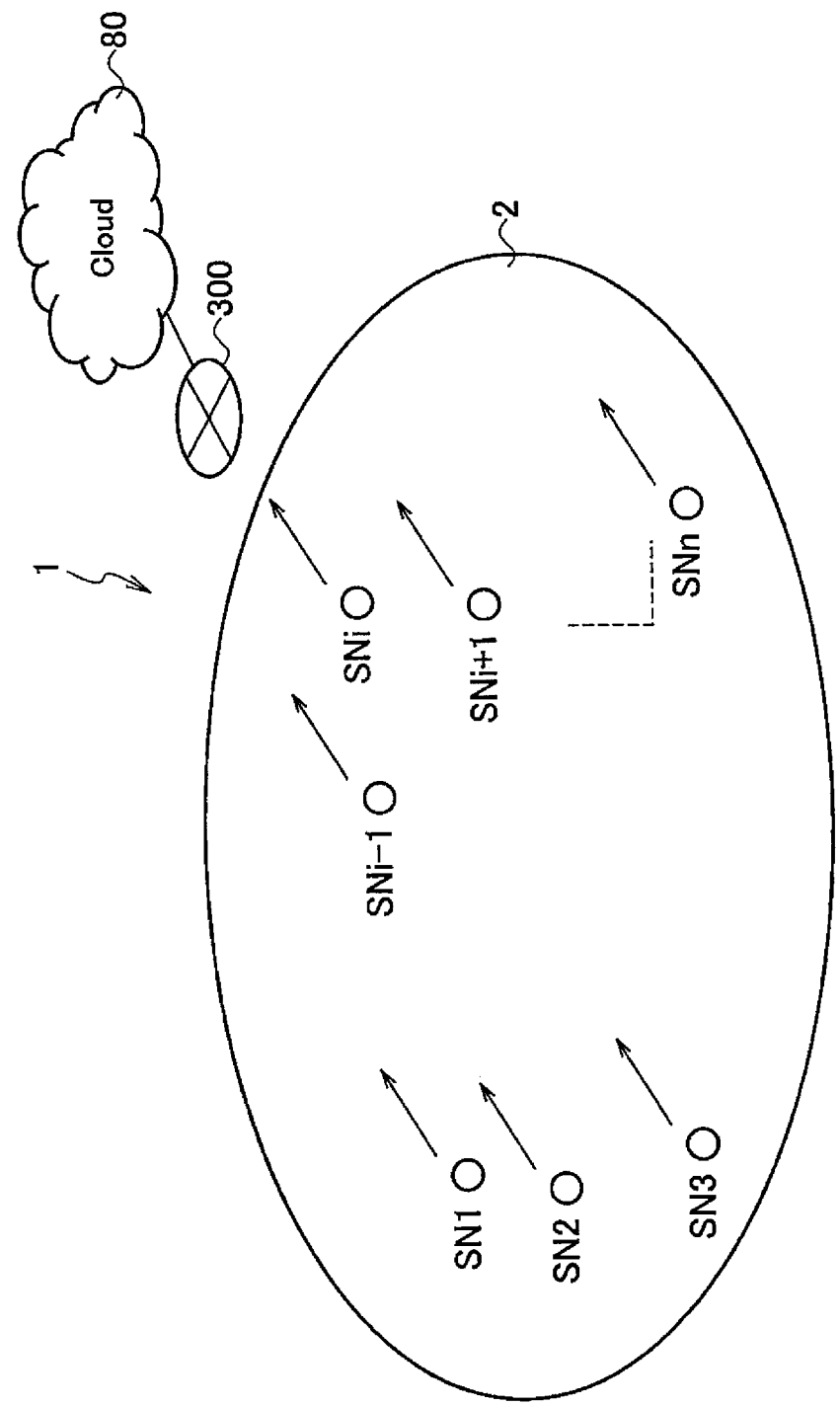
FIG. 1 is a schematic conceptual configuration diagram showing a sensor network system according to a first embodiment.

Next, certain embodiments will now be described with reference to drawings. In the description of the following drawings, the identical or similar reference numeral is attached to the identical or similar part. However, it should be noted that the drawings are schematic and the relation between thickness and the plane size and the ratio of the thickness of each component part differs from an actual thing. Therefore, detailed thickness and size should be determined in consideration of the following explanation. Of course, the part from which the relation and ratio of a mutual size differ also in mutually drawings is included.

Moreover, the embodiments shown hereinafter exemplify the apparatus and method for materializing the technical idea; and the embodiments do not intend to specify the material, shape, structure, placement, etc. of each component part as the following. The embodiments may be changed without departing from the spirit or scope of claims.

First Embodiment

FIG. 1 shows a schematic conceptual configuration of a sensor network system 1 according to a first embodiment. As shown in FIG. 1, the sensor network system 1 according to the embodiments includes: a sensor object 2; a plurality of sensor node communication terminals SN1, SN2, . . . , SNi−1, SNi, SNi+1, . . . , SNn mounted on the sensor object 2, the plurality of the sensor node communication terminals SN1, SN2, . . . , SNi−1, SNi, SNi+1, . . . , SNn respectively including a plurality of sensor elements, each of the sensor elements having a function equivalent to one another, wherein the plurality of sensor elements SN1, SN2, . . . , SNi−1, SNi, SNi+1, . . . , SNn can be connected to a cloud computing system 80 through an Internet 300. Any one of wired communication or wireless communication can be applied to the connection between the plurality of the sensor node communication terminals SN1, SN2, . . . , SNi−1, SNi, SNi+1, . . . , SNn and the cloud computing system 80 through the Internet 300.

In the sensor network system 1 according to the first embodiment, self-diagnostics of failures of the plurality of the sensor elements and the plurality of the sensor node communication terminals SN1, SN2, . . . , SNi−1, SNi, SNi+1, . . . , SNn is executed in accordance with a failure diagnosis algorithm mentioned below, and thereby maintenance of the sensor element or sensor node communication terminal determined to be in failure can be performed.

The sensor object 2 is building structures, e.g. bridges, roads, railroad service, and buildings, etc., for example. Furthermore, the sensor object 2 is not limited to the building structures, but also is various fields, e.g.: air pollution; forest fire; quality control of wine brewing; care of children who play outdoors; care of people who play sports; detection of smartphones; surrounding access control to nuclear power plants, defense facilities, etc.; detection of radioactivity levels of nuclear power plants; control of intensity levels of electromagnetic fields; grasp of traffic congestion situations, e.g. traffic jams; smart roads; smart lightings; high-function shopping; noise environment maps; high-efficiency shipment of vessels; water quality managements; refuse disposal managements; smart parking; managements of golf courses; managements of water leakage/gas leakage; managements of automatic driving; efficiently arrangements and managements of infrastructures in urban areas; and farms.

Second Embodiment

Figure 2:
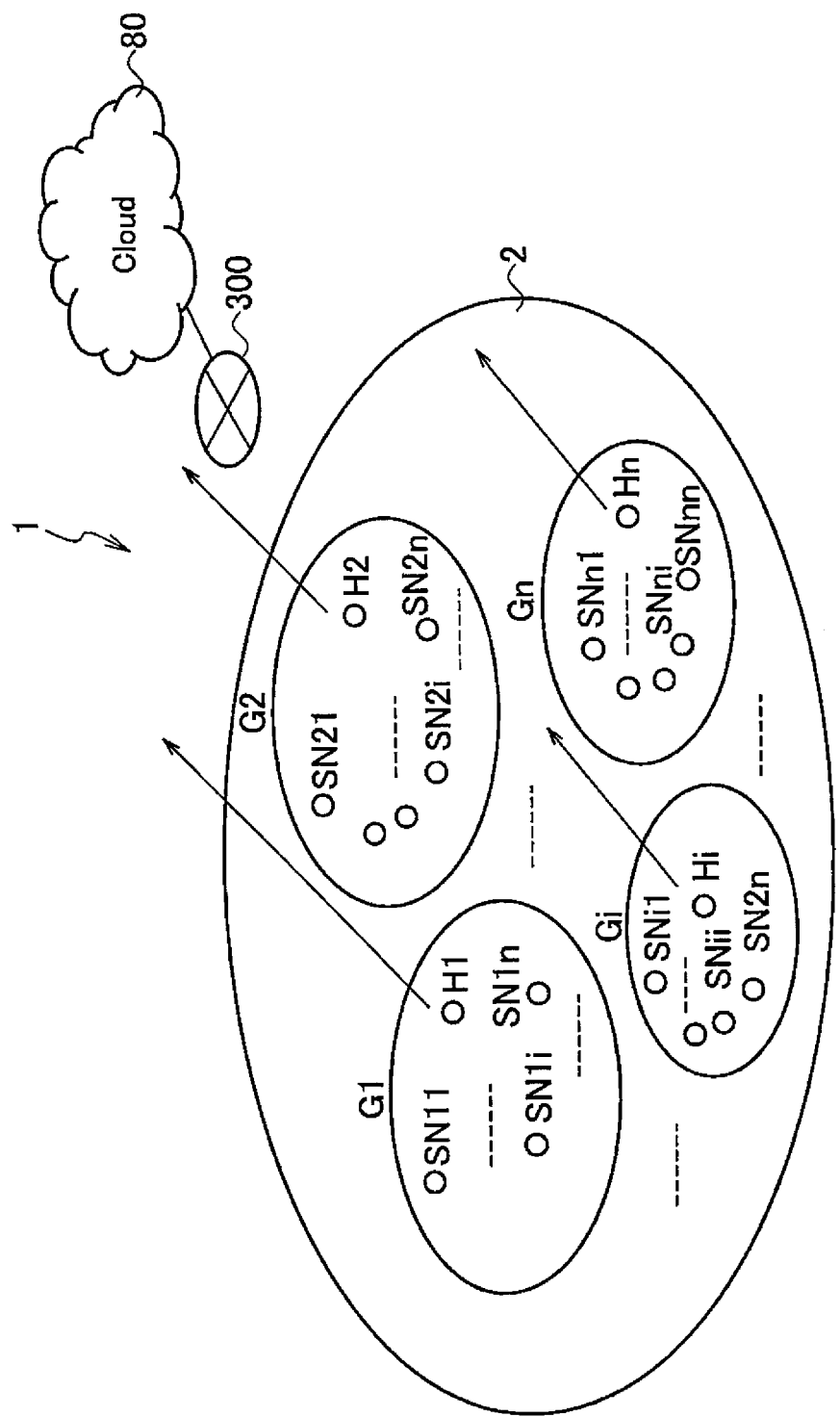
FIG. 2 is a schematic conceptual configuration diagram showing a sensor network system according to a second embodiment.

FIG. 2 shows a schematic conceptual configuration of a sensor network system 1 according to a second embodiment. As shown in FIG. 2, the sensor network system 1 according to the second embodiment includes: a sensor object 2; and a plurality of group network systems G1, G2, . . . , Gi, . . . , Gn mounted on a sensor object 2.

The group network system G1 includes: a host communication terminal H1; and a plurality of sensor node communication terminals SN11, . . . , SN1$i$, . . . , SN1$n$ connected to the host communication terminal Hl, each of the sensor elements SN11, . . . , SN1$i$, . . . , SN1$n$ having a function equivalent to one another. In this case, sensor data obtained by the plurality of the sensor node communication terminals SN11, . . . , SN1$i$, . . . , SN1$n$ is collected by the host communication terminal H1, and can be connected to the cloud computing system 80 through the Internet 300 from the host communication terminal H1. Any one of wired communication or wireless communication can be applied to the communication between the plurality of the sensor node communication terminals SN11, . . . , SN1$i$, . . . , SN1$n$ and the host communication terminal H1. Any one of wired communication or wireless communication can be applied also to the connection to the cloud computing system 80 through the Internet 300 from the host communication terminal H1.

The group network system G2 includes: a host communication terminal H2; and a plurality of sensor node communication terminals SN21, . . . , SN2$i$, . . . , SN2$n$ connected to the host communication terminal H2, each of the sensor elements SN21, . . . , SN2$i$, . . . , SN2$n$ having a function equivalent to one another.

Similarly, the group network system Gi includes: a host communication terminal Hi; and a plurality of sensor node communication terminals SNi1, . . . , SNii, . . . , SNin connected to the host communication terminal Hi, each of the sensor elements SNi1, . . . , SNii, . . . , SNin having a function equivalent to one another.

Similarly, the group network system Gn includes: a host communication terminal Hn; and a plurality of sensor node communication terminals SNn1, . . . , SNni, . . . , SNnn connected to the host communication terminal Hn, each of the sensor elements SNn1, . . . , SNni, . . . , SNnn having a function equivalent to one another.

Also in other group network systems G2, . . . , Gi, . . . , Gn, sensor data obtained by the plurality of the sensor node communication terminals is collected by the host communication terminals H2, . . . , Hi, . . . , Hn, and can be connected to the cloud computing system 80 through the Internet 300 from the host communication terminals H2, . . . , Hi, . . . , Hn.

Similarly, any one of wired communication or wireless communication can be applied to the communication between the plurality of the sensor node communication terminals in each group, and the host communication terminals H2, . . . , Hi, . . . , Hn. Moreover, any one of the wired communication or wireless communication can be applied also to the connection to the cloud computing system 80 through the Internet 300 from the host communication terminals H2, . . . , Hi, . . . , Hn.

In the sensor network system 1 according to the second embodiment, self-diagnostics of failures of the plurality of the sensor elements and the plurality of the sensor node communication terminals in each of the group network systems G1, G2, . . . , Gi, . . . , Gn is executed in accordance with a failure diagnosis algorithm mentioned below, maintenance of the sensor element or sensor node communication terminal determined to be in failure can be performed.

Third Embodiment

Figure 3:
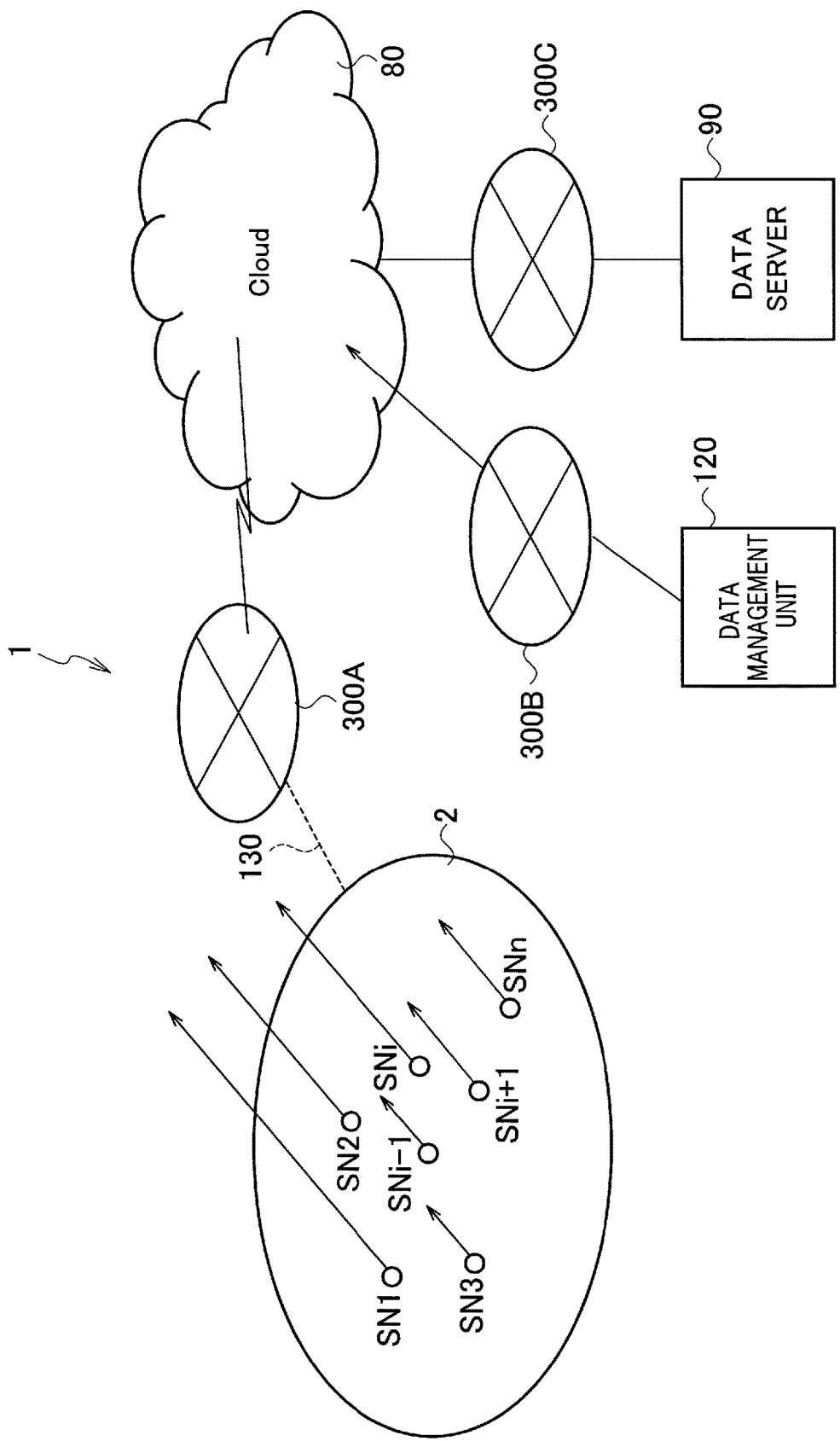
FIG. 3 is a schematic block configuration diagram showing a sensor network system according to a third embodiment.

FIG. 3 shows a schematic block configuration of a sensor network system 1 according to a third embodiment.

As shown in FIG. 3, the sensor network system 1 according to the third embodiment includes: a sensor object 2; a plurality of sensor node communication terminals SN1, SN2, . . . , SN$i$−1, SN$i$, SN$i$+1, . . . , SNn mounted on the sensor object 2, the plurality of the sensor node communication terminals SN1, SN2, . . . , SN$i$−1, SN$i$, SN$i$+1, . . . , SNn respectively including a plurality of sensor elements, each of the sensor elements SN1, SN2, . . . , SN$i$−1, SN$i$, SN$i$+1, . . . , SNn having a function equivalent to one another; a data server 90 configured to store sensor information for every plurality of the sensor node communication terminals obtained by the plurality of the sensor elements; and a data management unit 120 configured to analyze the sensor information stored in the data server 90. In the embodiment, the data management unit 120 executes self-diagnostics of failures of the plurality of the sensor elements and the plurality of the sensor node communication terminals SN1, SN2, . . . , SN$i$−1, SN$i$, SN$i$+1, . . . , SNn in accordance with a failure diagnosis algorithm mentioned below, and thereby maintenance of the sensor element or sensor node communication terminal determined to be in failure can be performed.

As shown in FIG. 3, the sensor network system includes a cloud computing system 80 connectable to the plurality of the sensor node communication terminals SN1, SN2, . . . , SN$i$−1, SN$i$, SN$i$+1, . . . , SNn through an Internet 300A. The data management unit 120 may be connected to the cloud computing system 80 through a first exclusive Internet 300B, and the data server 90 may be connected to the cloud computing system 80 through a second exclusive Internet 300C.

In the embodiment, the data management unit 120 can access to the data server 90 through the first exclusive Internet 300B and the cloud computing system 80, and the second exclusive Internet 300C, and can execute analysis processing of measured data obtained from the plurality of sensor node communication terminals SN1, SN2, . . . , SN$i$−1, SN$i$, SN$i$+1, . . . , SNn. The data management unit 120 can be configured by including a calculating machine in data management companies, etc., for example.

Moreover, the plurality of the sensor node communication terminals SN1, SN2, . . . , SN$i$−1, SN$i$, SN$i$+1, . . . , SNn and the cloud computing system 80 connectable through the Internet 300A can be connected to each other by any one of wired communication or wireless communication.

Fourth Embodiment

Figure 4:
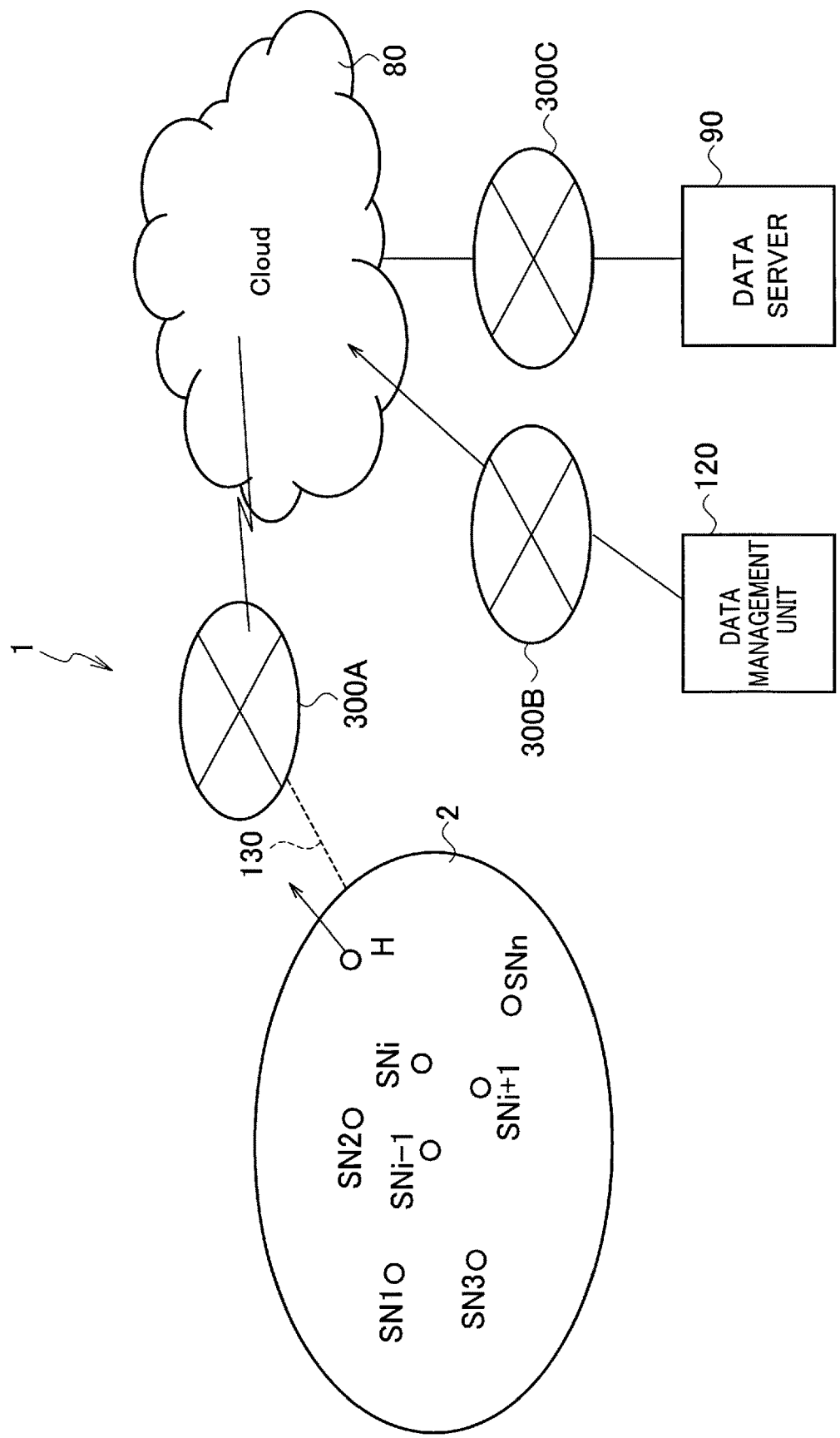
FIG. 4 is a schematic block configuration diagram showing a sensor network system according to a fourth embodiment.

FIG. 4 shows a schematic block configuration of a sensor network system 1 according to a fourth embodiment. As shown in FIG. 4, the sensor network system 1 according to the fourth embodiment includes: a sensor object 2; a plurality of sensor node communication terminals SN1, SN2, . . . , SN$i$−1, SN$i$, SN$i$+1, . . . , SNn mounted on the sensor object 2, the plurality of the sensor node communication terminals SN1, SN2, . . . , SN$i$−1, SN$i$, SN$i$+1, . . . , SNn respectively including a plurality of sensor elements, each of the sensor elements SN1, SN2, . . . , SN$i$−1, SN$i$, SN$i$+1, . . . , SNn having a function equivalent to one another; a host communication terminal H configured to collect sensor information for every plurality of the sensor node communication terminals obtained by the plurality of the sensor elements; a data server 90 configured to store sensor information for every plurality of the sensor node communication terminals obtained by the plurality of the sensor elements; and a data management unit 120 configured to analyze the sensor information stored in the data server 90. In the embodiment, the data management unit 120 executes self-diagnostics of failures of the plurality of the sensor elements and the plurality of the sensor node communication terminals SN1, SN2, . . . , SNi−1, SNi, SNi+1, . . . , SNn in accordance with a failure diagnosis algorithm mentioned below, and thereby maintenance of the sensor element or sensor node communication terminal determined to be in failure can be performed.

The plurality of the sensor node communication terminals SN1, SN2, . . . , SNi−1, SNi, SNi+1, . . . , SNn and the host communication terminal H can be connected to each other by any one of the wired communication or wireless communication.

Moreover, as shown in FIG. 4, the sensor network system includes a cloud computing system 80 connectable to the host communication terminal H through the Internet 300A. The data management unit 120 may be connected to the cloud computing system 80 through a first exclusive Internet 300B, and the data server 90 may be connected to the cloud computing system 80 through a second exclusive Internet 300C.

In the embodiment, the data management unit 120 can access to the data server 90 through the first exclusive Internet 300B, the cloud computing system 80, and the second exclusive Internet 300C.

The host communication terminal H and the cloud computing system connectable through the Internet 300A can be connected to each other by any one of wired communication through a wired line 130 or wireless communication.

Fifth Embodiment

Figure 5:
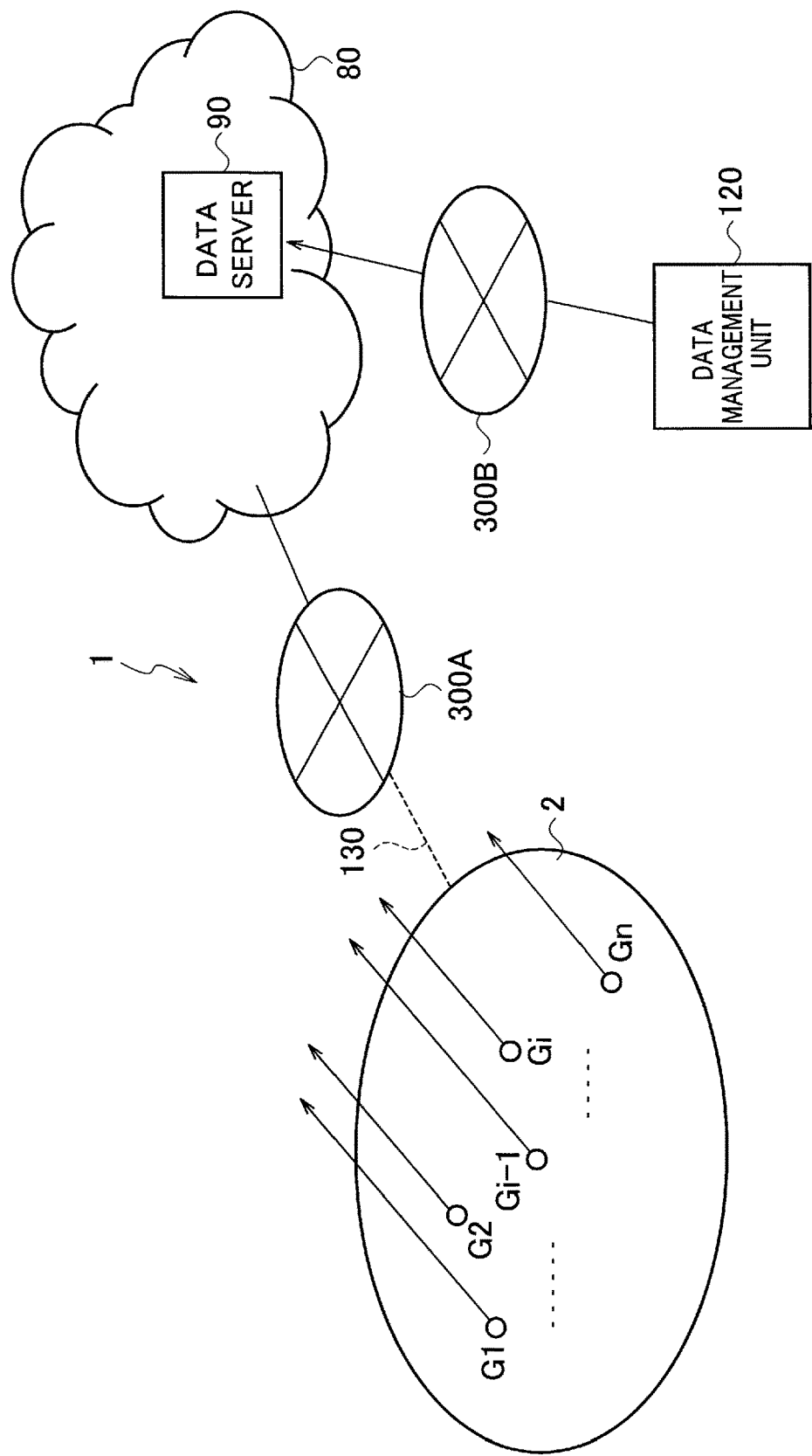
FIG. 5 is a schematic block configuration diagram showing a sensor network system according to a fifth embodiment.

FIG. 5 shows a schematic block configuration of a sensor network system according to a fifth embodiment. As shown in FIG. 5, the sensor network system 1 according to the fifth embodiment includes: a sensor object 2; and a plurality of group network systems G1, G2, . . . , Gi, . . . , Gn mounted on the sensor object 2. The group network system G1 includes: a host communication terminal Hl; and a plurality of sensor node communication terminals SN11, . . . , SN1*i*, . . . , SN1*n* connected to the host communication terminal H1, in the same manner as FIG. 2. The group network system G2 includes: a host communication terminal H2; and a plurality of sensor node communication terminals SN21, . . . , SN2*i*, . . . , SN2*n* connected to the host communication terminal H2. Similarly, the group network system Gi includes: a host communication terminal Hi; and a plurality of sensor node communication terminals SNi1, . . . , SNii, . . . , SNin connected to the host communication terminal Hi. Similarly, the group network system Gn includes: a host communication terminal Hn; and a plurality of sensor node communication terminals SNn1, . . . , SNni, . . . , SNnn connected to the host communication terminal Hn.

As shown in FIG. 5, the sensor network system 1 according to the fifth embodiment includes: a plurality of group network systems G1, G2, . . . , Gi, . . . , Gn mounted on the sensor object 2, the plurality of the group network systems G1, G2, . . . , Gi, . . . , Gn respectively including a plurality of sensor node communication terminals and a host communication terminal, each of the sensor node communication terminals including a plurality of sensor elements, each of the sensor elements having a function equivalent to one another, the host communication terminal configured to collect sensor information for every plurality of the sensor node communication terminals obtained by the plurality of the sensor elements; a data server 90 configured to store sensor information for every plurality of the sensor node communication terminals obtained by the plurality of the sensor elements; and a data management unit 120 configured to analyze the sensor information stored in the data server 90. In the embodiment, the data management unit 120 executes self-diagnostics of failures of the plurality of the sensor elements and the plurality of the sensor node communication terminals in accordance with a failure diagnosis algorithm, and thereby maintenance of the sensor element or sensor node communication terminal determined to be in failure can be performed.

In the plurality of the group network systems G1, G2, . . . , Gi, . . . , Gn, the plurality of the sensor node communication terminals and the host communication terminals can be connected to each other by any one of wired communication or wireless communication.

Moreover, as shown in FIG. 5, the sensor network system includes a cloud computing system 80 connectable to the host communication terminal through the Internet 300A. The data management unit 120 may be connected to the cloud computing system 80 through an exclusive Internet 300B, and the data server 90 may be disposed in the cloud computing system 80.

The data management unit 120 is accessible to the data server 90 through the exclusive Internet 300B.

Moreover, the host communication terminal and the cloud computing system 80 connectable through the Internet 300A can be connected to each other by any one of wired communication through a wired line 130 or wireless communication.

In the group network systems G1, G2, . . . , Gi, . . . , Gn, sensor data obtained by the plurality of sensor node communication terminals in each group is collected by the host communication terminals H1, H2, . . . , Hi, . . . , Hn, and can be connected to the cloud computing system 80 through the Internet 300A from the host communication terminals H1, H2, . . . , Hi, . . . , Hn.

(Failure Diagnosis of Sensor Element and Sensor Node Communication Terminal)

In the sensor network system 1 according to the first to fifth embodiments, a failure diagnosis of sensor elements and sensor node communication terminals is executed by statistical processing etc. in accordance with a failure diagnosis algorithm. Such a failure diagnosis may be executed in the sensor element sensor node communication terminal or the host communication terminal, or in data management departments of the above-mentioned data management companies. A place of executing the failure diagnosis is determined in accordance with a scale and/or an object of the sensor network. Respective configurations of hardware of the sensor element sensor node communication terminal and the host communication terminal, or hardware of the data management unit of the data management company are changed in accordance with the place of executing the failure diagnosis of the failure diagnosis.

Although an amount of data to be collected in the data management unit of the data management company becomes huge, and therefore "big data" have to be treated, a load of job in the sensor element sensor node communication terminal and the host communication terminal can be reduced if the failure diagnosis is executed in the data management unit of the data management company.

On the other hand, the failure diagnosis may also be executed in the sensor element sensor node communication terminal and/or the host communication terminal. In this case, a load of job of the data management unit of the data management company can be reduced, and a scale of the data server can also be reduced.

Various power supply means, e.g. batteries, solar cells, environmental power generations, etc., are applicable to a power supply unit mounted on each of the sensor element sensor node communication terminal and the host communication terminal. In consideration of a balance of the load of job between the sensor element sensor node communication terminal or the host communication terminal, and the data management unit of the data management company, it may be determined what kind of the power supply means to be mounted therein.

In particular, it is preferable to make maintenance of the sensor element and/or the sensor node communication terminal into the minimum if the sensor element, the sensor node communication terminal, and the host communication terminal are distantly separated from the data management unit of the data management company.

(Failure Diagnosis Algorithm)

Figure 6A:
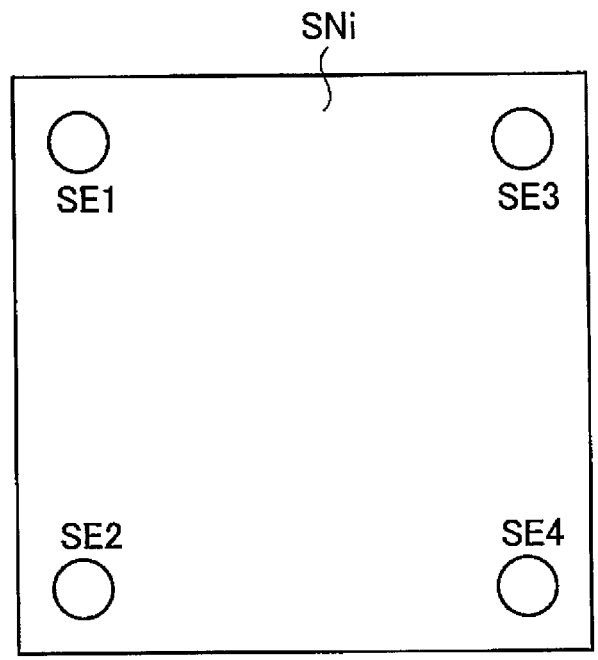
FIG. 6A is a schematic configuration example of providing four pieces of sensor elements in a sensor node communication terminal applicable to the sensor network system according to the embodiments.
Figure 6B:
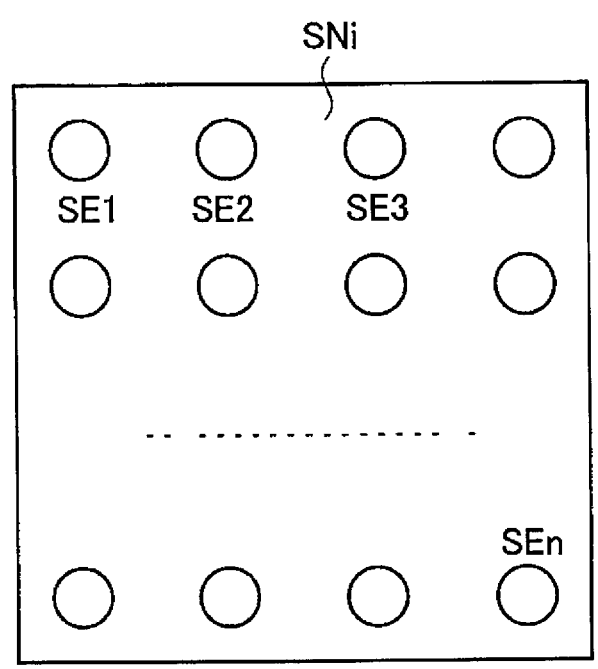
FIG. 6B shows a schematic configuration example of providing n pieces of the sensor elements in a sensor node communication terminal applicable to the sensor network system according to the embodiments.

In a sensor node communication terminal SNi applicable to the sensor network system 1 according to the embodiments, FIG. 6A shows a schematic configuration example of including four-pieces of sensor elements SE1, SE2, SE3, SE4, and FIG. 6B shows a schematic configuration example of including n-pieces of sensor elements SE1, SE2, SE3, . . . , SEn.

The number of the sensor elements SEi which are mounted on the sensor node communication terminal SNi is not limited to four, but may be two, three, or equal to or greater than five. The sensor node communication terminal SNi corresponds to any one of the sensor node communication terminals shown in FIGS. 1, 3, and 4. If adopting the configuration of the group network systems G1, G2, . . . , Gi, . . . , Gn shown in FIG. 2 or 5, it corresponds to any one of the sensor node communication terminals in each of the group network systems G1, G2, . . . , Gi, . . . , Gn.

A process flow will now be explained using an example where four sensor elements SE1, SE2, SE3, SE4 each having a function equivalent to one another and similar specification are mounted on the sensor node communication terminal SNi, as shown in FIG. 6A, in the sensor network system 1 according to the embodiments.

Figure 10:
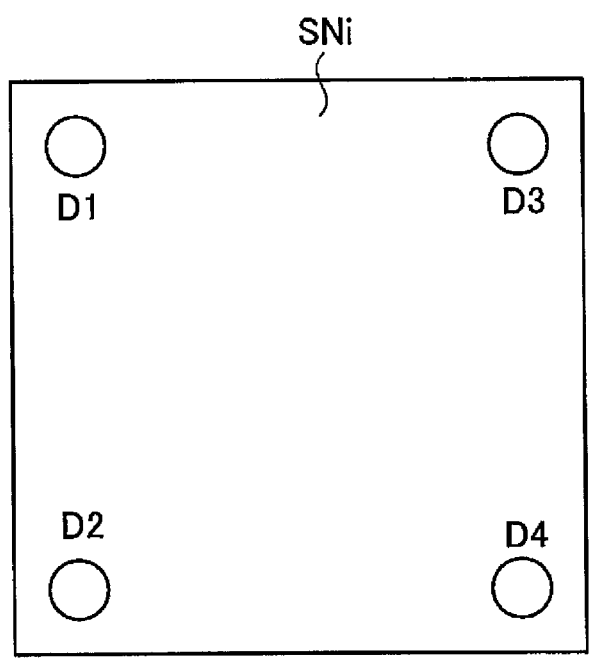
FIG. 10 is a schematic diagram of measured data of four sensor elements in the sensor node communication terminal applicable to the sensor network system according to the embodiments.

(A) Output values (measured data) Di (D1, D2, D3, D4; Refer to FIG. 10) from the four sensor elements SE1, SE2, SE3, SE4 mounted on the sensor node communication terminal SNi have only a difference in a relationship range capable of taking into consideration: a range $\Delta Mi$ of measurement variation that is considered normal in the sensor element if the respective sensor elements SE1, SE2, SE3, SE4 normally function; a variation range $\Delta Ai$ of environmental conditions for which the sensor element is used; a measurement error $\Delta Ci$ in a means of converting the values into digital values suitable for communication; and varying conditions $\Delta Vi$ of a filter for noise reduction etc.

In this case, the $\Delta Mi$ indicates a range of measurement variation that is considered normal in a sensor which normally functions, $\Delta Ai$ indicates a variation range of environmental conditions where the sensor is used, $\Delta Ci$ indicates a measurement error of a means for converting the output values into digital values suitable for communication (Analog Digital Converter (ADC)), and $\Delta Vi$ expresses varying conditions of a filter for noise reduction, etc. Accordingly, the output values Di (D1, D2, D3, and D4) from the four sensor elements SE1, SE2, SE3, and SE4 include a relationship range expressed by an error function $\Delta f$ ($\Delta Mi$, $\Delta Ai$, $\Delta Ci$, and $\Delta Vi$) using $\Delta Mi$, $\Delta Ai$, $\Delta Ci$, and $\Delta Vi$ as a parameter.

Figure 7:
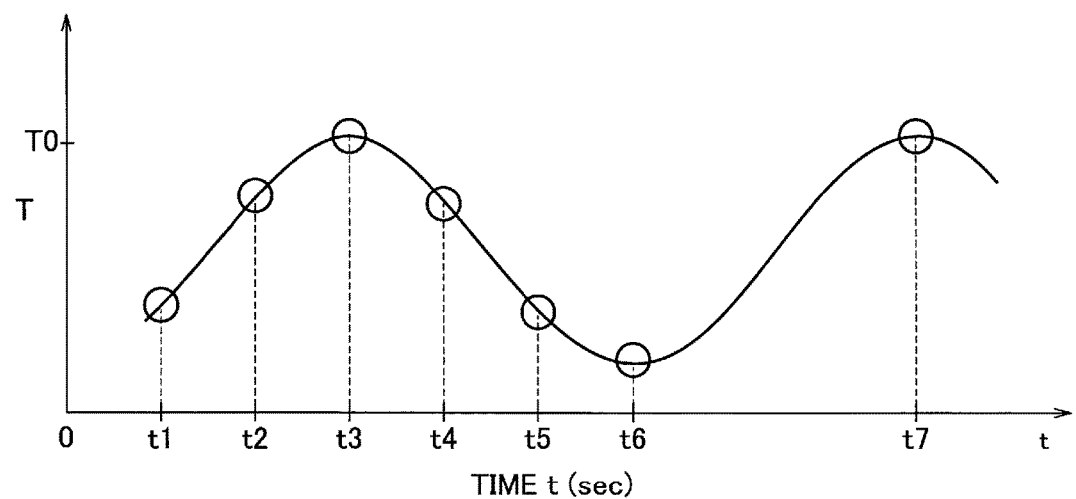
FIG. 7 is a schematic diagram showing an example of time variation characteristics of environmental temperature T in the sensor network system according to the embodiments.

FIG. 7 shows a schematic diagram showing an example of time variation characteristics of an environmental temperature T in the sensor network system 1 according to the embodiments.

In the sensor network system 1 according to the embodiments, the variation range $\Delta Ci$ of environmental conditions (environmental temperature T) is within a relationship range expressed with the white round marks in each time t1, t2, t3, t4, t5, t6, and t7, as shown in FIG. 7.

(B) At a certain time point, when one of output values Di from the four sensor elements SEi shows a value exceeding this relationship range, it is determined that the aforementioned one sensor element cannot execute a correct measurement (is in failure). At this time, it is recognized that a degree of failures of the sensor node communication terminal SNi is ¼ (25%), and the output values of the remaining three sensors are adopted as a measurement result.

Figure 8:
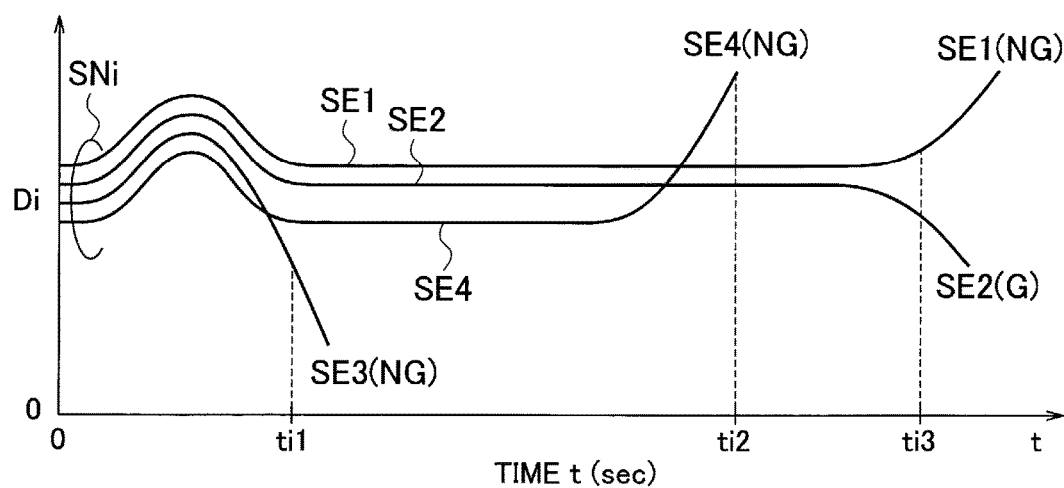
FIG. 8 shows an example of time variation characteristics of measured data of four sensor elements in the sensor node communication terminal applicable to the sensor network system according to the embodiments.

FIG. 8 shows an example of time variation characteristics of measured data of four sensor elements SE1, SE2, SE3, SE4 in the sensor node communication terminal SNi applicable to the sensor network system according to the embodiments.

In certain time ti1, when the sensor element SE3 indicates a value exceeding the relationship range in the output values Di of the four sensor elements SE1, SE2, SE3, and SE4, it is determined that the sensor element SE3 cannot execute a correct measurement (is in failure). At this time, it is recognized that a degree of failures of the sensor node communication terminal SNi is ¼ (25%), and the output values of the remaining three sensors SE1, SE2, and SE4 are adopted as a measurement result.

In this way, a load of the data processing may be reduced by deciding that the situation where an output value of a specific sensor element became abnormal continuously multiple times is not in a situation where the output value became temporarily abnormal due to a certain "sudden reason" and then recovered, and by not adopting the output value from then on, in considering that the concerned sensor element is in failure.

In the embodiments, the "sudden reason" includes a case where there is no cause in a mounted sensor element itself, e.g., a case where only a value at that time is incidentally turned to an unexpected value due to an extraneous noise etc. in a system in which a sensor value is input and converted into a digital value; a case where an accidental error occurs in communications to host communication terminal H/gateway/repeater for receiving a signal from the sensor node communication terminal SNi, or in a signal transmission to an information analysis means forward thereof, etc.

(C) Also in a certain time point, when a value of one sensor element in the output values Di of the three remaining sensor elements SEi except for the output value of the already failed sensor element exceeds the above-mentioned relationship range, it is determined that the aforementioned one sensor element cannot execute a correct measurement (is in failure). At this time, it is recognized that a degree of failures of the sensor node communication terminal SNi is ⅔ (50%), and the output values of the remaining two sensors are adopted as a measurement result.

As shown in FIG. 8, in certain time ti2, when one sensor element SE4 indicates a value exceeding this relationship range in the output values of the remaining three sensor elements SE1, SE2, SE4 except for the output value of the already failed sensor element SE3, it is determined that the aforementioned one sensor element SE4 cannot execute a correct measurement (is in failure). At this time, it is recognized that a degree of failures of the sensor node communication terminal SNi is ⅔ (50%), and the output values of the remaining two sensor elements SE1, SE2 are adopted as a measurement result.

(D) Also at a point in time point, when a value of one sensor element in the output values Di of the two remaining sensor elements SEi except for the output values of the already failed two sensor elements become different values by exceeding the above-mentioned relationship range, it is recognized that a degree of the failures of the sensor node communication terminal SNi is ¾ (75%), in considering that the aforementioned sensor element is in failure. Moreover, when output values Di of two remaining sensor elements except for the output values of the already failed two sensor elements become different values by exceeding the above-mentioned relationship range, if one value in the output values of two different available sensor elements can be selected on the basis of relevance, e.g., information on another type sensors mounted neighborhood, e.g. a temperature sensor, and relevance so far with the sensors, relevance with values measured by other sensor node communication terminals SNi−1, SNi+1, SNi−2 installed near depending on circumstances etc., the value of the one sensor element may be adopted, and it may be recognized that a degree of the failure of the sensor node communication terminal SNi is ¾ (75%), in considering that the other sensor element is in failure.

As shown in FIG. 8, in certain time ti3, when a value of one sensor element SE1 in the output values Di of the two remaining sensor elements SE1 and SE2 except for the output value of the already failed two sensor elements SE3 and SE4 becomes different values by exceeding the above-mentioned relationship range, it is recognized that a degree of the failures of the sensor node communication terminal SNi is ¾ (75%), in considering that the aforementioned sensor element SE1 is in failure. Moreover, when output values Di of two remaining sensor elements SE1 and SE2 except for the output values of the already failed two sensor elements SE3 and SE4 become different values by exceeding the above-mentioned relationship range, if one value of the sensor element (SE2) in the output values of two different available sensor elements can be selected on the basis of relevance, e.g., information on another type sensors mounted neighborhood, e.g. a temperature sensor, and relevance so far with the sensors, relevance with values measured by other sensor node communication terminals SNi−1, SNi+1, and SNi−2 installed near depending on circumstances, etc., the value of the one sensor element (SE2) may be adopted, and it may be recognized that a degree of the failure of the sensor node communication terminal SNi is ¾ (75%), in considering that the other sensor element (SE1) is in failure.

(E) Also when the output values Di of the available three or two sensor elements respectively became different values by exceeding the relationship range, also in the cases of the above-mentioned (B) and (C), processing is executed as the similar state as that of the above-mentioned (D). More specifically, e.g., information on another type sensors mounted neighborhood, if one value of the sensor element in the output values of the different available sensor elements can be selected on the basis of relevance, e.g. a temperature sensor, and relevance so far with the sensors, relevance with values measured by other sensor node communication terminals SNi−1, SNi+1, and SNi−2 installed near depending on circumstances etc., the aforementioned value of the one sensor element may be adopted, and it may be recognized that a degree of the failure of the sensor node communication terminal SNi is ¾ (75%), in considering that the other sensor element is in failure.

(F) Moreover, with regard to a sensor node communication terminal SNi in which only two sensor elements is mounted from beginning, the determination is executed as the above-mentioned (D). When one adoptable output value of the sensor element can be selected as a result, it is recognized that a degree of the failures of the sensor node communication terminal SNi is ½ (50%) as a result.

(G) Accordingly, when the sensor node communication terminal SNi reaches at the reference value previously determined which is a degree of failures of the sensor node communication terminal, maintenance, such as replacement or repair, can be performed, and an output value of the sensor element which should be adopted can be obtained even if it is in such a state. After maintenance of the concerned sensor element, the failure information of the concerned sensor element is reset, and the processing is completed. Moreover, when the sensor node communication terminal SNi does not reach at the previously determined reference value which is a degree of failures of the sensor node communication terminal, the processing is completed as it is.

(Regarding Determination of Failure of Sensor Element)

In the sensor network system according to the embodiments, a plurality of sensor elements SEi and a plurality of other functional components are mounted on one sensor node communication terminal SNi.

During all of the plurality of the sensor elements SEi are normally operated, it is determined that the sensor node communication terminal SNi is in a healthy state.

When it becomes a situation where one of the sensor elements SEi is in failure and the sensor element should notify abnormal measured data, a result of other sensor elements being normally operated is adopted, and the unit of the sensor node communication terminal SNi reports that the unit of the sensor node communication terminal SNi approaches a failed state, and promotes maintenance of repair, replacement, etc., while maintaining the normal operation.

Thus, while maintaining the correct operation of the whole sensor network system, a timing of the maintenance can be known and thereby an uninterrupted operation can be realized.

It is more effective to arrange the plurality of the mounted sensor elements SEi so as to be separated from one another as much as possible, and to avoid common use of wiring etc. so as to use the sensor elements independently as much as possible.

Accordingly, if a part of electronic substrate is corroded due to moisture etc., or if damage occurs in the electronic substrate due to strong shock etc., it can report that it is in a failed state in part; while one or more sensor elements SEi can avoid the corrosion and damage, and the correct operation as the whole sensor network system can be maintained.

For example, if four sensor elements are mounted on one sensor node communication terminal, all of four sensor elements are not simultaneously in failure, but the sensor element is often separately in failure one after another since there is a difference in lifetimes of industrial products. Accordingly, if maintenance of four sensor elements is performed, for example, a reference value of a degree of failures of the sensor node communication terminal is set to 75% if only one sensor element is in failure, is set to 50% if one more sensor element is further in failure, is set to 25% if one more sensor element is further in failure, and is set to 0% if one more sensor element is further in failure. Then, a degree of the failures of the sensor node communication terminal can be grasped by means of majority decision of measured data of the plurality of the sensor elements as mentioned above, and thereby timing of the maintenance of the sensor element sensor node communication terminal can be planned.

For example, when a strain sensor is mounted in the sensor elements in order to check a bridge, it can be determined whether it is (1) an abnormality of bridge or (2) an abnormality of sensor elements, if there are four sensor elements. More specifically, with respect to abnormal measured data from the sensor element SE1, for example, it can be determined whether it is abnormality of the bridge (i.e., the measured data from the sensor element SE1 is correct) or the measured data from the sensor element SE1 is incorrect (i.e., the sensor element SE1 is in failure, and the measured data from the sensor elements SE2-SE4 is correct) by grasping the degree of failures of the sensor node communication terminal as mentioned above.

According to the sensor network system according to the embodiments, the self-test data or self-diagnostics data of the plurality of sensor elements and the plurality of sensor node communication terminals can be obtained in accordance with the above-mentioned failure diagnosis algorithm, and thereby the failure diagnosis can be executed.

According to the sensor network system according to the embodiments, the degree of failures of the sensor node communication terminal can be grasped in accordance with the above-mentioned failure diagnosis algorithm, and thereby correct data can be output from other sensor elements, while grasping the sensor element which is going to be broken in the plurality of sensor elements. According to the sensor network system according to the embodiments, information (big data) of the plurality of sensor element which are in the relationship range is analyzed by the statistical method in accordance with the above-mentioned failure diagnosis algorithm, and thereby a sensor element excluded from the group can be extracted. Next, the degree of failures of the sensor node communication terminal can be determined by grasping a flow of the measured data from the past, in order to establish associations with whether or not the information (big data) of the plurality of sensor element is in accordance with a certain kind of a function, for example. Furthermore, the degree of failures of the sensor node communication terminal can be determined by using the relationship with the surrounding sensor node communication terminal.

(Flow Chart)

Figure 9:
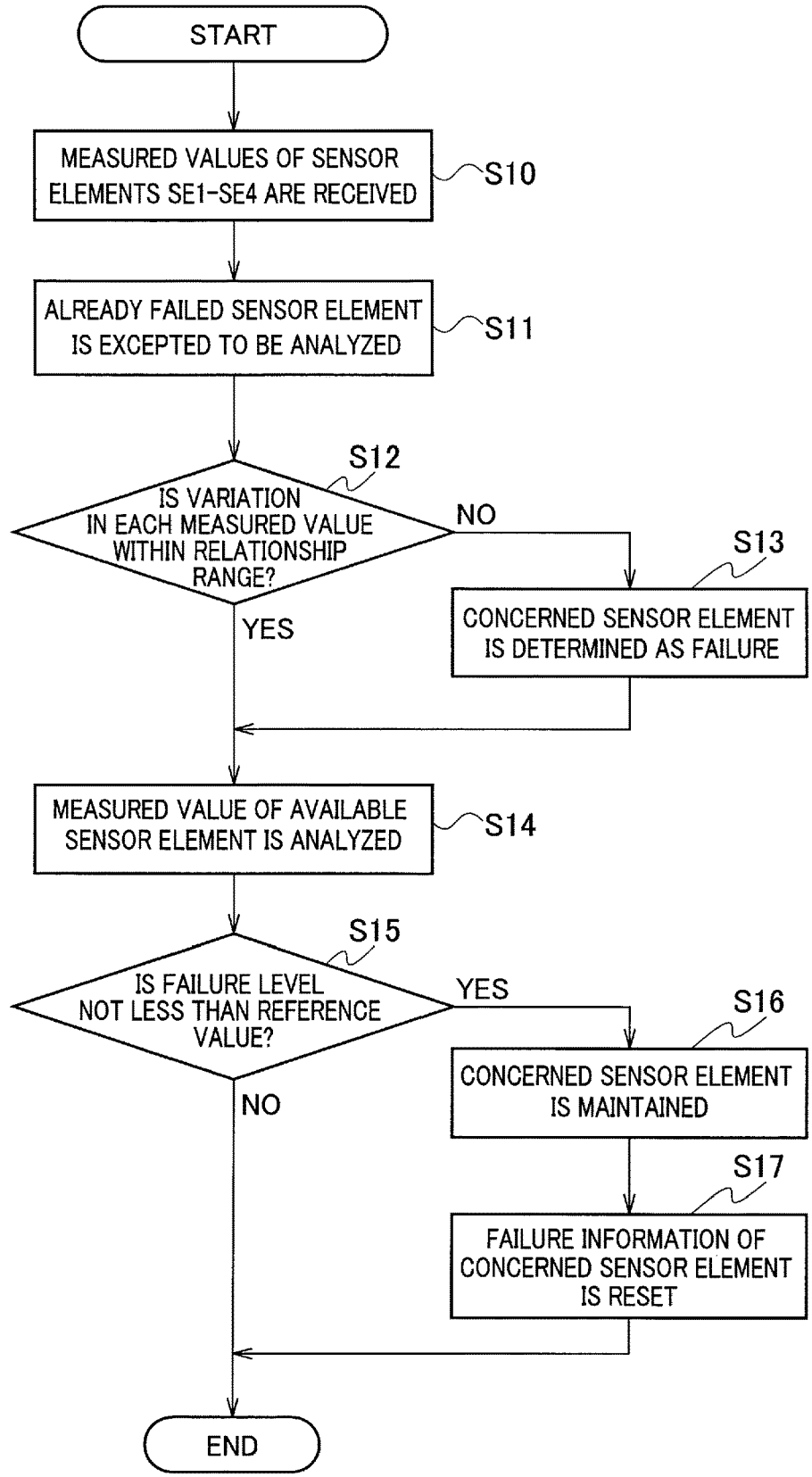
FIG. 9 is a flow chart of failure determination processing of the sensors executed by the sensor network system according to the embodiments.

FIG. 9 shows a flow chart of sensor failure determination processing executed in the sensor network system according to the embodiments.

As shown in FIG. 9, an operational method of the sensor network system according to the embodiments includes: receiving measured values of a plurality of sensor elements, and storing the received measured values therein; excepting a sensor element already failed therefrom to be analyzed; determining whether or not a variation in each measured value is within a relationship range; analyzing the measured value of an available sensor element if a result of the determination is YES; determining the concerned sensor element as a failure if the result of the determination is NO, and analyzing the measured value of the available sensor element; determining whether or not a failure level is not less than a reference value; completing failure determination if the failure level is less than the reference value; performing maintenance of the concerned sensor element if the failure level is not less than the reference value; and completing the failure determination after resetting failure information of the concerned sensor element.

The sensor failure determination processing is executed in the sensor element sensor, the node communication terminal SNi and/or the host communication terminal H, or in the data management unit of the data analysis company forward thereof.

A case of arranging four sensor elements SE1, SE2, SE3, and SE4 will now be explained for convenience of explanation. However, even if the installed number of the sensor elements is increases or decreased, the method of fundamental failure determination is the same.

Moreover, output values (measured values) from the four sensor elements SE1, SE2, SE3, and SE4 have only a difference in a relationship range capable of taking into consideration: a range of measurement dispersion that is considered normal in the sensor elements SE1, SE2, SE3, and SE4 if the respective sensor elements SE1, SE2, SE3, and SE4 normally function; environmental conditions for which the sensor elements SE1, SE2, SE3, and SE4 are used; a measurement error in a means of converting the values into a digital value suitable for communication; and varying conditions of a filter for noise reduction, etc.

(a) In Step S10, measured data (measured values) of the sensor elements SE1, SE2, SE3, and SE4 is firstly received in the sensor node communication terminal SNi and/or the data management unit 140 of the and host communication terminal H, or the data management unit 120 of the data analysis company.

(b) Next, in Step S11, a sensor element already failed is excepted therefrom to be analyzed.

(c) Next, in Step S12, it is determined whether or not a variation in each measured value is within a relationship range.

(d) In Step S12, if a result of the determination is YES, the processing goes to Step S14, and a measured value of an available sensor element is analyzed.

(e) In Step S12, if the result of the determination is NO, the processing goes to Step S13, and it is determined that the concerned sensor element is in failure. Then, the processing goes to Step S14, and the measured value of the available sensor element is analyzed.

(f) Next, in Step S15, it is determined whether or not a degree of the failure of the sensor node communication terminal SNi is not less than a reference value.

(g) In Step S15, if the degree of the failure of the sensor node communication terminal SNi is less than the reference value, this failure determination is completed.

(h) If the degree of the failure of the sensor node communication terminal SNi is not less than the reference value in Step S15, the processing goes to Step S16 and maintenance of the concerned sensor element is performed.

(i) Next, the processing goes to Step S17, and this failure determination is completed after resetting the failure information of the concerned sensor element.

In Step S12, it is determined whether or not a variation in each measured data is within a relationship range. There are a piecemeal calculation error and variation between the measurement valued in the four sensor elements. Due to measuring environments with a slight difference, the measurement values of the respective four sensor elements are not always the same value as one another, although keeping the relationship of a certain range with respect to a state of the measurement object. However, while the four sensor elements are operated normally, the respective measurement values are respectively within a relationship range of approximate values. Accordingly, while the four sensor elements execute a normal operation, newly measured values are approximate values with one another.

However, if one sensor element and the relationship with respect to the measurement object changes, since a measurement value output from the aforementioned one sensor element is a value output on the basis of a relationship which is not normal relationship, the measurement value output from the aforementioned one sensor element becomes a value widely different from measurement values output from other normal three sensor elements, as compared with the normal operation time. When "a measurement value of one sensor element is excluded from the group", it can be recognized that the one sensor element is in failure. More specifically, it is determined whether the variation in each measured data of the sensor elements SE1-SE4 is within the relationship range. In this determination, a sensor element excluded from the group is detected with a statistical method by collecting and computing of the data in the data management unit of the receiving side host communication terminal or the data management unit of the data management company.

A configuration of hardware, necessary energy, and requests to communication, etc. can be changed by how each part (e.g., the sensor node communication terminal, the receiving side host communication terminal, and the data management unit (calculating machine) of the management company for analyzing collected data and the like) share a flow of processes from the collection of data to the failure determination of sensors and the analysis of the collected data.

A principal portion of the sensor network system according to the embodiments and the operational method of such a sensor network system is as follows: "a plurality of the sensor elements are mounted therein" and "workings resulting" therefrom.

Accordingly, the sensor node communication terminal, the host communication terminal, and the data management unit (calculating machine) of the management company for analyzing the collected data and the like have configurations for efficiently using the above-mentioned principal portion.

The following flow of data processing are executed in the sensor network system according to the embodiments. More specifically,
(1) Sensor data is obtained in a plurality of sensor elements.
(2) Filtering is executed in order to remove a noise, as required.
(3) Sensor data is compared with one another in order to execute a failure diagnosis of the sensor.
(4) Maintenance is requested if a degree of failure is inferior to a preset reference value. If the degree of failure is less than the preset reference value, the degree of failures is reported.
(5) A state of a structure which is a sensor object or a state of a point is analyzed using available sensor data.

The sensor node communication terminal executes the above-mentioned processing (1) and (2), the sensor data from the sensor node communication terminal is transmitted to a receiver of the host communication terminal, and then is temporarily stored in a data storage means (data server or the like) through the Internet, an exclusive line, etc., for example from the host communication terminal. Then, the above-mentioned processing (3), (4), (5) is executed in the data management unit (calculating machine) of the management company for data analysis which can reference the data.

As the above-mentioned sharing of roles, jobs of relatively high calculation load (e.g., storage/reference of histories of sensor data, statistical processing, analysis processing, etc.) are effective to be executed by relatively large-scale calculating machines having a high calculation capability and having relatively fewer limitations of a usable electric power.

On the other hand, relatively small-scaled jobs for removing a sensing noise etc. to reduce the amount of communications data are effective to be executed by the sensor node communication terminal.

According to the above sharing of roles, since the numerous sensor node communication terminals easily acquire an operation energy individually, a system concept called power-saving can be realized.

On the other hand, if there are many amounts of sensing data, a certain amount of the data may be previously processed in the sensor node communication terminal side. If a certain amount of the data is previously processed in the sensor node communication terminal side, communication traffic is decreased and thereby a power consumption in the sensor node communication terminal can be reduced.

(Relevance of Relationship Between Surrounding Sensor Node Communication Terminals)

FIG. 10 schematically shows output values (measured data) Di (D1, D2, D3, and D4) of four sensor elements SE1, SE2, SE3, and SE4, in the sensor node communication terminal SNi applicable to the sensor network system according to the embodiments.

Figure 11A:
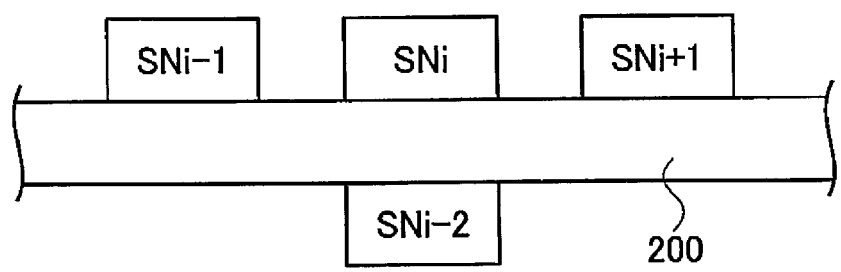
FIG. 11A is a schematic diagram of arranging sensor node communication terminals on a bridge structure, in an application example of the sensor network system according to the embodiments.
Figure 11B:
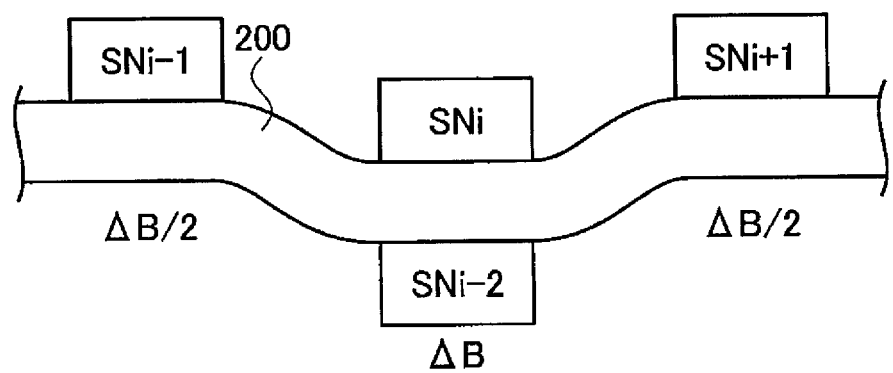
FIG. 11B is a schematic diagram in the state where a strain occurs in the bridge structure in FIG. 11A.

FIG. 11A schematically shows a configuration example of arranging sensor node communication terminals SNi−1, SNi, SNi+1, and SNi−2 on a bridge structure 200, in an application example of the sensor network system according to the embodiments. FIG. 11B schematically shows a configuration example in a state where a strain occurs in the bridge structure 200 in FIG. 11A. The sensor node communication terminal SNi−2 is arranged on a back surface side so as to be separated from the sensor node communication terminal SNi by the bridge structure 200, and it is expected that measured data associated with the sensor node communication terminal SNi can be obtained.

Figure 12A:
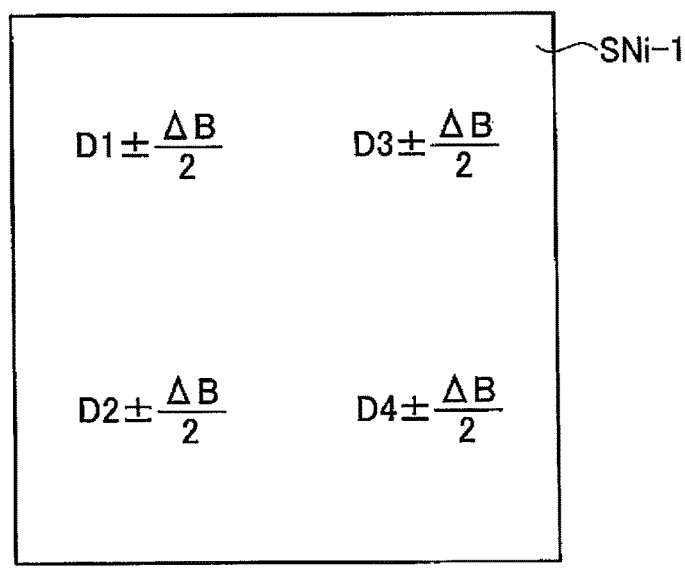
FIG. 12A is a schematic diagram of a measured data of four sensor elements of an adjacent sensor node communication terminal SNi−1 in a case where all of four sensor elements of a sensor node communication terminal SNi are normal, in the application example shown in FIG. 11.
Figure 12B:
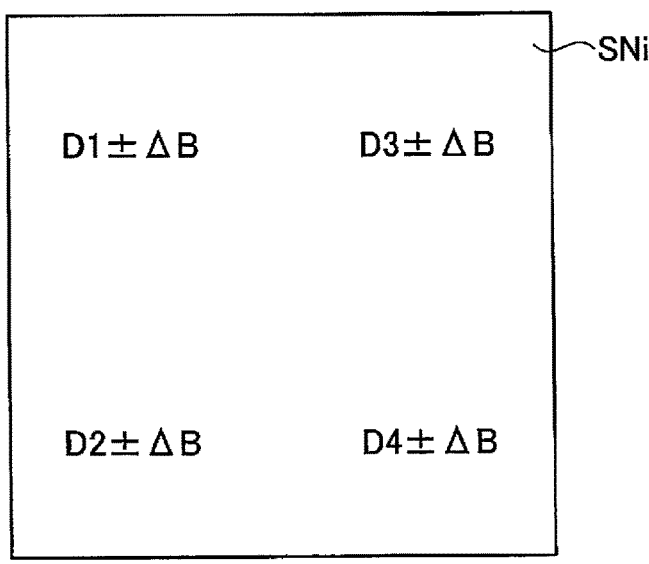
FIG. 12B is a schematic diagram of a measured data of four sensor elements of the sensor node communication terminal SNi in the case where all of four sensor elements of the sensor node communication terminal SNi are normal, in the application example shown in FIG. 11.
Figure 12C:
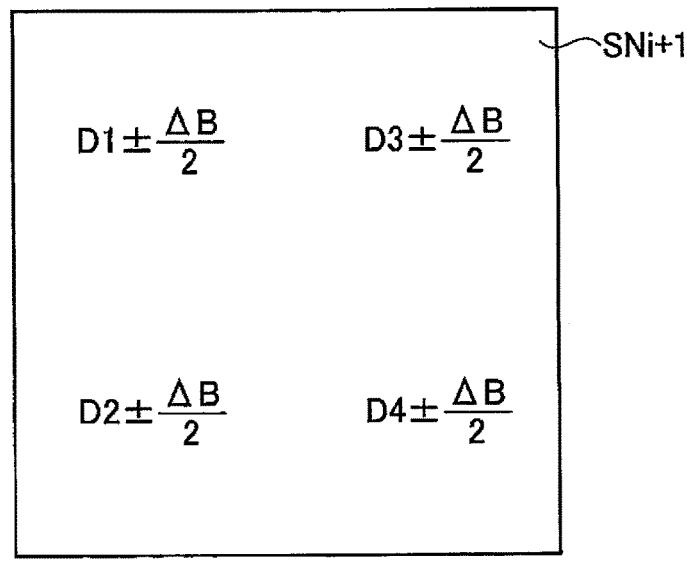
FIG. 12C is a schematic diagram of measured data of four sensor elements of an adjacent sensor node communication terminal SNi+1 in the case where all of four sensor elements of the sensor node communication terminal SNi are normal, in the application example shown in FIG. 11.

FIG. 12A schematically shows measured data of four sensor elements of an adjacent sensor node communication terminal SNi−1, FIG. 12B schematically shows measured data of four sensor elements of the sensor node communication terminal SNi, and FIG. 12C schematically shows measured data of four sensor elements of the adjacent sensor node communication terminal SNi+1, in the case where all of four sensor elements of the sensor node communication terminal SNi are normal, in the application example shown in FIG. 11. In the sensor node communication terminal SNi, the measured data of the four sensor elements SE1, SE2, SE3, and SE4 are respectively expressed by D1+/−ΔB, D2+/−ΔB, D3+/−ΔB, and D4+/−ΔB. ΔB corresponds to a range of variation of the measured data due to the occurrence of the strain in the bridge structure 200.

A range of variation of the adjacent sensor node communication terminals SNi−1 and SNi+1 is a range of variation ΔB/2 that is half of the range of variation LB of the sensor node communication terminal SNi in a point of the occurrence of the strain, for example.

Accordingly, in the sensor node communication terminal SNi−1, the measured data of the four sensor elements SE1, SE2, SE3, and SE4 are respectively expressed by D1+/−ΔB/

2, D2+/−ΔB/2, D3+/−ΔB/2, and D4+/−ΔB/2. Similarly, in the sensor node communication terminal SNi+1, the measured data of the four sensor elements SE1, SE2, SE3, and SE4 are respectively expressed by D1+/−ΔB/2, D2+/−ΔB/2, D3+/−ΔB/2, and D4+/−ΔB/2.

Figure 13A:
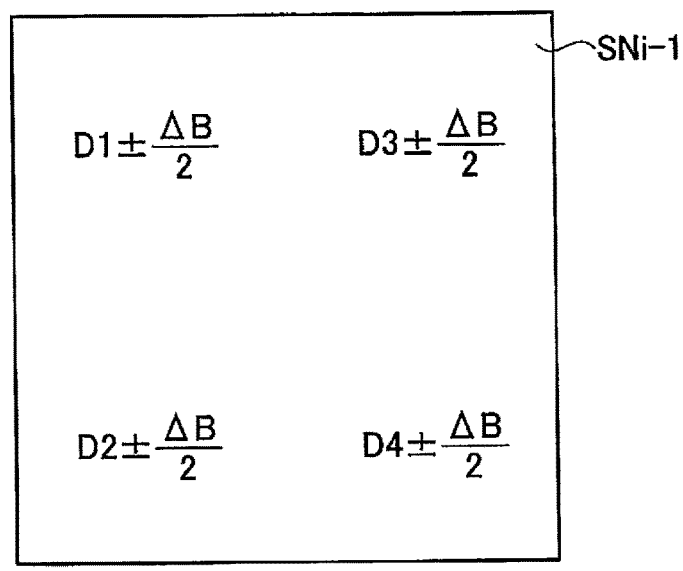
FIG. 13A is a schematic diagram of measured data of four sensor elements of the adjacent sensor node communication terminal SNi−1 in a case where one sensor element of four sensor elements of the sensor node communication terminal SNi is in failure, in the application example shown in FIG. 11.
Figure 13B:
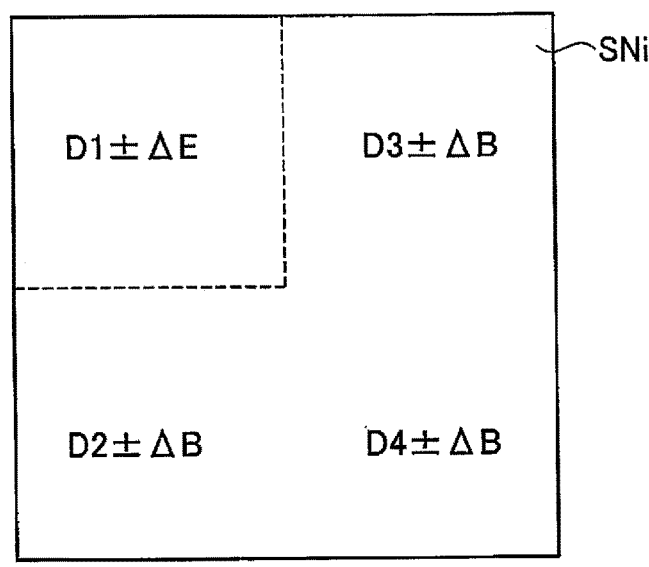
FIG. 13B is a schematic diagram of measured data of four sensor elements of the sensor node communication terminal SNi in the case where one sensor element of four sensor elements of the sensor node communication terminal SNi is in failure, in the application example shown in FIG. 11.
Figure 13C:
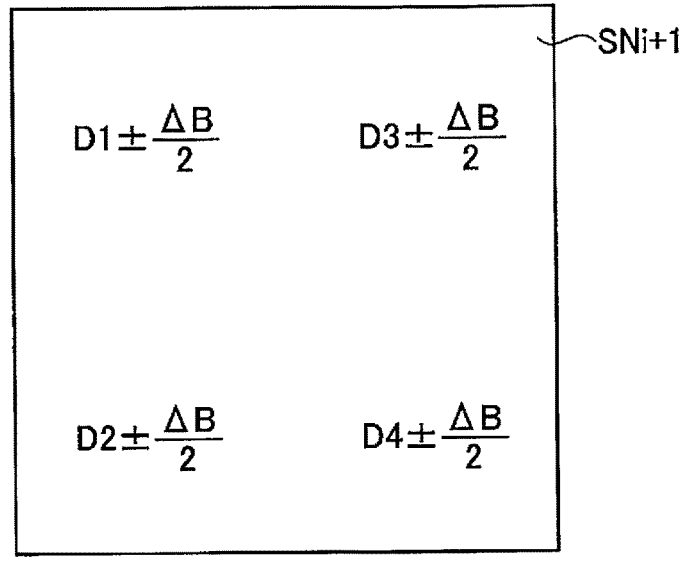
FIG. 13C is a schematic diagram of measured data of four sensor elements of the adjacent sensor node communication terminal SNi+1 in the case where one sensor element of four sensor elements of the sensor node communication terminal SNi is in failure, in the application example shown in FIG. 11.

FIG. 13A schematically shows measured data of four sensor elements of the adjacent sensor node communication terminal SNi−1, FIG. 13B schematically shows measured data of four sensor elements of the sensor node communication terminal SNi, and FIG. 13C schematically shows measured data of four sensor elements of the adjacent sensor node communication terminal SNi+1, in a case where one sensor element of the four sensor elements of the sensor node communication terminal SNi is in failure, in the application example shown in FIG. 11. In the sensor node communication terminal SNi, the measured data of the four sensor elements SE1, SE2, SE3, and SE4 are respectively expressed by D1+/−ΔE, D2+/−ΔB, D3+/−ΔB, and D4+/−ΔB. ΔE corresponds to a range of variation exceeding the relationship range.

A range of variation of the adjacent sensor node communication terminals SNi−1 and SNi+1 is a range of variation ΔB/2 that is half of the range of variation ΔB of the sensor node communication terminal SNi in a point of the occurrence of the strain, for example. Accordingly, in the sensor node communication terminal SNi−1, the measured data of the four sensor elements SE1, SE2, SE3, and SE4 are respectively expressed by D1+/−ΔB/2, D2+/−ΔB/2, D3+/−ΔB/2, and D4+/−ΔB/2. Similarly, in the sensor node communication terminal SNi+1, the measured data of the four sensor elements SE1, SE2, SE3, and SE4 are respectively expressed by D1+/−ΔB/2, D2+/−ΔB/2, D3+/−ΔB/2, and D4+/−ΔB/2. As the above-mentioned result, also when one sensor element of the four sensor elements in the sensor node communication terminal SNi is in failure, it can be determined that the sensor element SE1 of the sensor node communication terminal SNi is in failure, and the information of other sensor elements can be used as correct measurement data, in consideration of the measured data obtained from the adjacent sensor node communication terminals SNi−1 and SNi+1.

Figure 14A:
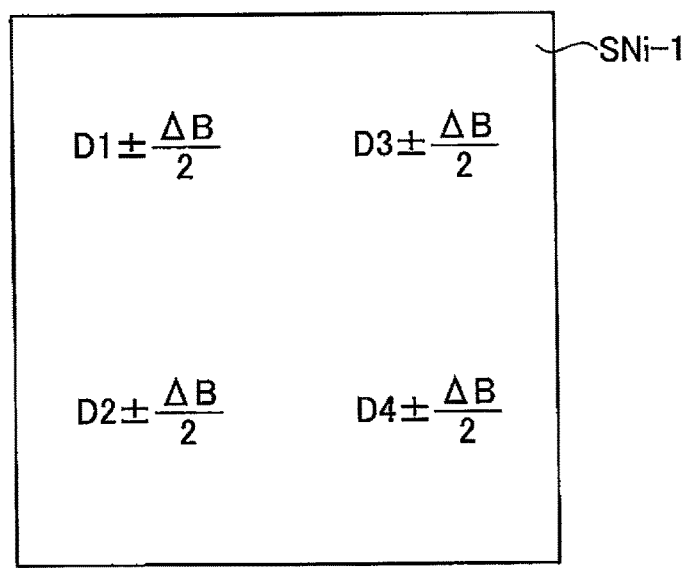
FIG. 14A is a schematic diagram of measured data of four sensor elements of the adjacent sensor node communication terminal SNi−1 in a case where two sensor elements of four sensor elements of the sensor node communication terminal SNi are in failure, in the application example shown in FIG. 11.
Figure 14B:
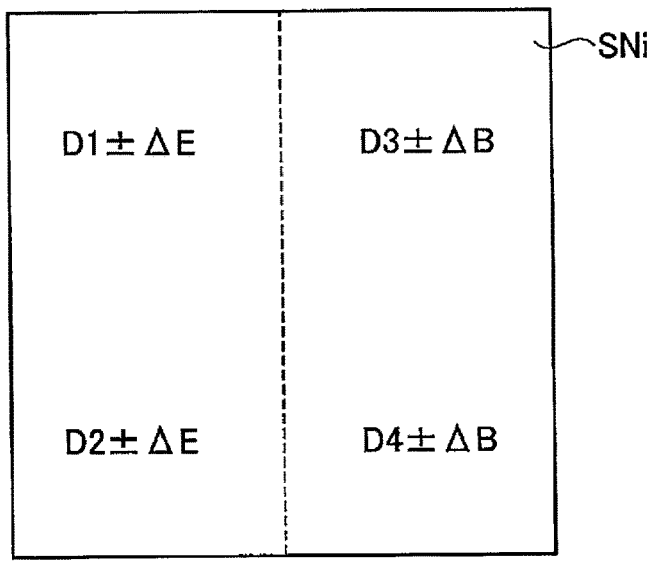
FIG. 14B is a schematic diagram of measured data of four sensor elements of the sensor node communication terminal SNi in the case where two sensor element of four sensor elements of the sensor node communication terminal SNi are in failure, in the application example shown in FIG. 11.
Figure 14C:
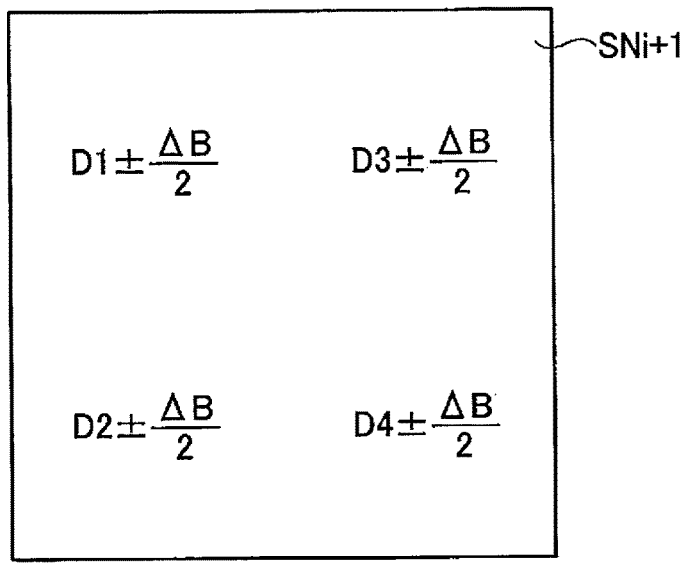
FIG. 14C is a schematic diagram of measured data of four sensor elements of the adjacent sensor node communication terminal SNi+1 in the case where two sensor elements of four sensor elements of the sensor node communication terminal SNi are in failure, in the application example shown in FIG. 11.

FIG. 14A schematically shows measured data of four sensor elements of the adjacent sensor node communication terminal SNi−1, FIG. 14B schematically shows measured data of four sensor elements of the sensor node communication terminal SNi, and FIG. 14C schematically shows measured data of four sensor elements of the adjacent sensor node communication terminal SNi+1, in a case where two sensor elements of the four sensor elements of the sensor node communication terminal SNi are in failure, in the application example shown in FIG. 11. E4 are respectively expressed by D1+/−ΔE, D2+/−ΔE, D3+/−ΔB, and D4+/−ΔB. ΔE corresponds to a range of variation exceeding the relationship range.

A range of variation of the adjacent sensor node communication terminals SNi−1 and SNi+1 is a range of variation ΔB/2 that is half of the range of variation ΔB of the sensor node communication terminal SNi in a point of the occurrence of the strain, for example. Accordingly, in the sensor node communication terminal SNi−1, the measured data of the four sensor elements SE1, SE2, SE3, and SE4 are respectively expressed by D1+/−ΔB/2, D2+/−ΔB/2, D3+/−ΔB/2, D4+/−ΔB/2. Similarly, in the sensor node communication terminal SNi+1, the measured data of the four sensor elements SE1, SE2, SE3, and SE4 are respectively expressed by D1+/−ΔB/2, D2+/−ΔB/2, D3+/−ΔB/2, and D4+/−ΔB/2. As the above-mentioned result, also when two sensor elements of the four sensor elements in the sensor node communication terminal SNi are in failure, it can be determined that the sensor elements SE1 and SE2 of the sensor node communication terminal SNi are in failure, and the information of other sensor elements can be used as correct measurement data, in consideration of the measured data obtained from the adjacent sensor node communication terminals SNi−1 and SNi+1.

Figure 15A:
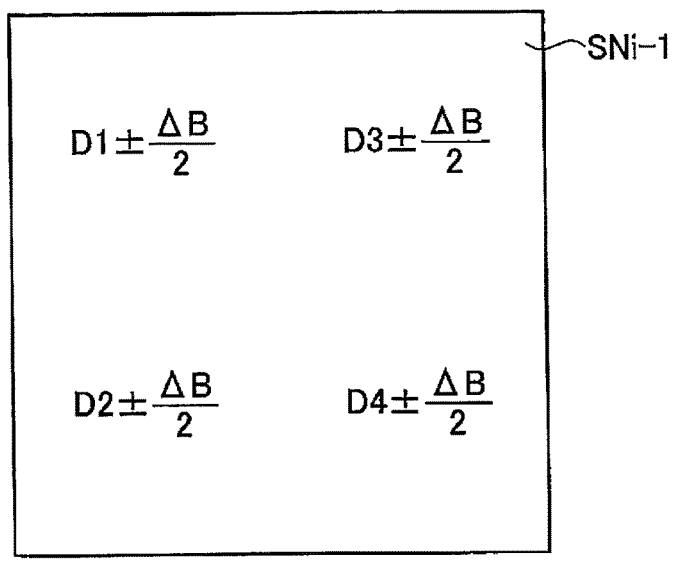
FIG. 15A is a schematic diagram of measured data of four sensor elements of the adjacent sensor node communication terminal SNi−1 in a case where three sensor elements of four sensor elements of the sensor node communication terminal SNi are in failure, in the application example shown in FIG. 11.
Figure 15B:
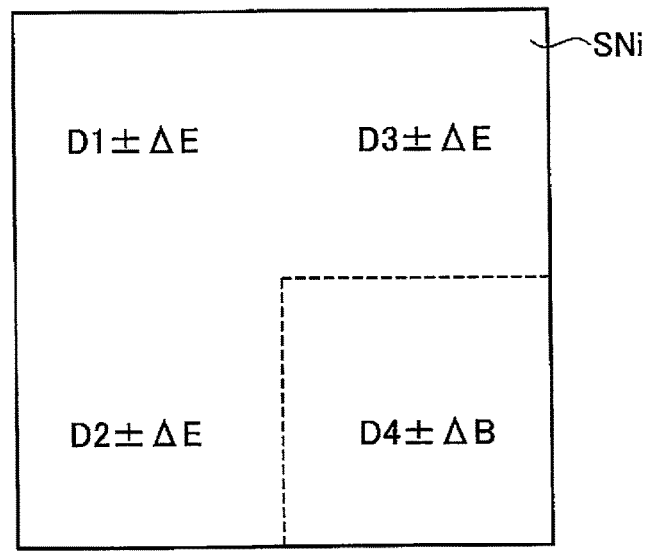
FIG. 15B is a schematic diagram of measured data of four sensor elements of the sensor node communication terminal SNi in the case where three sensor element of four sensor elements of the sensor node communication terminal SNi are in failure, in the application example shown in FIG. 11.
Figure 15C:
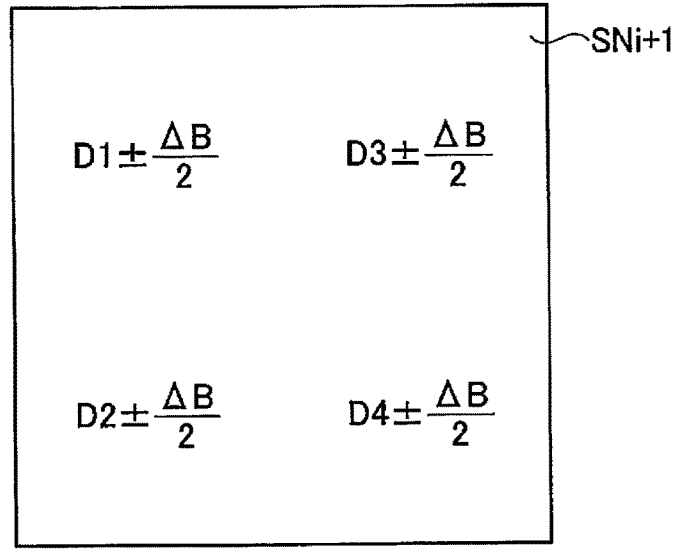
FIG. 15C is a schematic diagram of measured data of four sensor elements of the adjacent sensor node communication terminal SNi+1 in the case where three sensor elements of four sensor elements of the sensor node communication terminal SNi are in failure, in the application example shown in FIG. 11.

FIG. 15A schematically shows measured data of four sensor elements of the adjacent sensor node communication terminal SNi−1, FIG. 15B schematically shows measured data of four sensor elements of the sensor node communication terminal SNi, and FIG. 15C schematically shows measured data of four sensor elements of the adjacent sensor node communication terminal SNi+1, in a case where three sensor elements of the four sensor elements of the sensor node communication terminal SNi are in failure, in the application example shown in FIG. 11. In the sensor node communication terminal SNi, the measured data of the four sensor elements SE1, SE2, SE3, and SE4 are respectively expressed by D1+/−ΔE, D2+/−ΔE, D3+/−ΔE, and D4+/−ΔB. ΔE corresponds to a range of variation exceeding the relationship range.

A range of variation of the adjacent sensor node communication terminals SNi−1 and SNi+1 is a range of variation ΔB/2 that is half of the range of variation ΔB of the sensor node communication terminal SNi in a point of the occurrence of the strain, for example. Accordingly, in the sensor node communication terminal SNi−1, the measured data of the four sensor elements SE1, SE2, SE3, and SE4 are respectively expressed by D1+/−ΔB/2, D2+/−ΔB/2, D3+/−ΔB/2, and D4+/−ΔB/2. Similarly, in the sensor node communication terminal SNi+1, the measured data of the four sensor elements SE1, SE2, SE3, and SE4 are respectively expressed by D1+/−ΔB/2, D2+/−ΔB/2, D3+/−ΔB/2, and D4+/−ΔB/2. As the above-mentioned result, also when three sensor elements of the four sensor elements in the sensor node communication terminal SNi are in failure, it can be determined that the sensor elements SE1, SE2, and SE3 of the sensor node communication terminal SNi are in failure, and the information of other sensor elements can be used as correct measurement data, in consideration of the measured data obtained from the adjacent sensor node communication terminals SNi−1 and SNi+1.

Figure 16A:
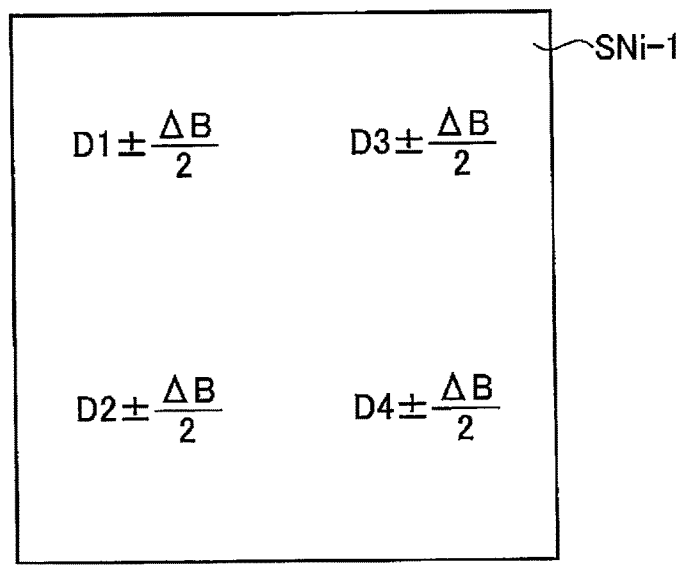
FIG. 16A is a schematic diagram of measured data of four sensor elements of the adjacent sensor node communication terminal SNi−1 in a case where all of four sensor elements of the sensor node communication terminal SNi are in failure, in the application example shown in FIG. 11.
Figure 16B:
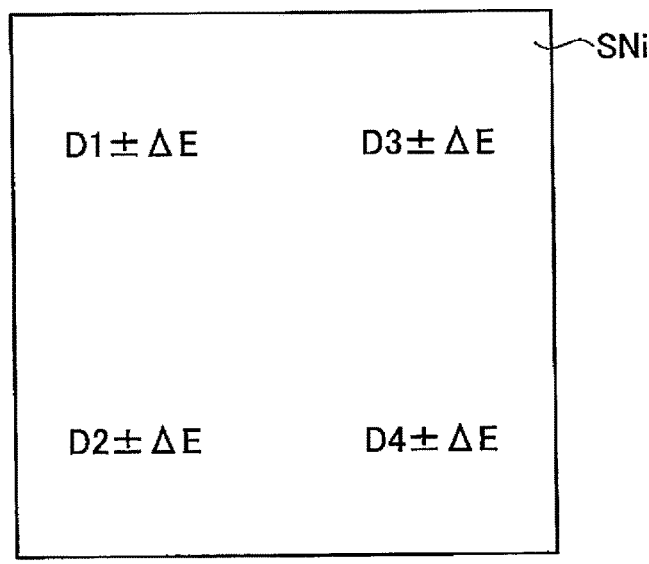
FIG. 16B is a schematic diagram of measured data of four sensor elements of the sensor node communication terminal SNi in the case where all of four sensor elements of the sensor node communication terminal SNi are in failure, in the application example shown in FIG. 11.
Figure 16C:
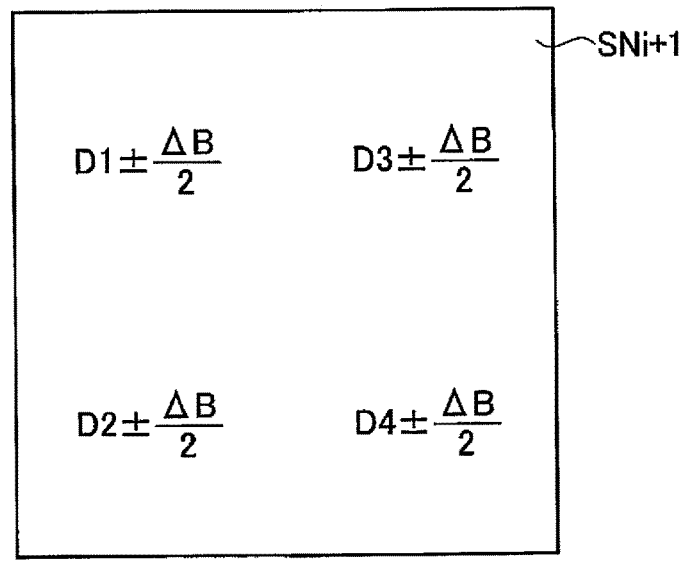
FIG. 16C is a schematic diagram of measured data of four sensor elements of the adjacent sensor node communication terminal SNi+1 in the case where all of four sensor elements of the sensor node communication terminal SNi are in failure, in the application example shown in FIG. 11.

FIG. 16A schematically shows measured data of four sensor elements of the adjacent sensor node communication terminal SNi−1, FIG. 16B schematically shows measured data of four sensor elements of the sensor node communication terminal SNi, and FIG. 16C schematically shows measured data of four sensor elements of the adjacent sensor node communication terminal SNi+1, in a case where all sensor elements of the four sensor elements of the sensor node communication terminal SNi are in failure, in the application example shown in FIG. 11. In the sensor node communication terminal SNi, the measured data of the four sensor elements SE1, SE2, SE3, and SE4 are respectively expressed by D1+/−ΔE, D2+/−ΔE, D3+/−ΔE, and D4+/−ΔE. ΔE corresponds to a range of variation exceeding the relationship range.

A range of variation of the adjacent sensor node communication terminals SNi−1 and SNi+1 is a range of variation ΔB/2 that is half of the range of variation ΔB of the sensor node communication terminal SNi in a point of the occurrence of the strain, for example. Accordingly, in the sensor node communication terminal SNi−1, the measured data of the four sensor elements SE1, SE2, SE3, and SE4 are respectively expressed by D1+/−ΔB/2, D2+/−ΔB/2, D3+/−

ΔB/2, and D4+/−ΔB/2. Similarly, in the sensor node communication terminal SNi+1, the measured data of the four sensor elements SE1, SE2, SE3, and SE4 are respectively expressed by D1+/−ΔB/2, D2+/−ΔB/2, D3+/−ΔB/2, and D4+/−ΔB/2. As the above-mentioned result, also when four sensor elements of the four sensor elements in the sensor node communication terminal SNi are in failure, it can be determined that the sensor elements SE1, SE2, SE3, and SE4 of the sensor node communication terminal SNi are in failure, and the information obtained from adjacent sensor node communication terminals SNi−1 and SNi+1 can be used as correct measurement data, in consideration of the measured data obtained from the adjacent sensor node communication terminals SNi−1 and SNi+1.

The sensor node communication terminal SNi−2 is arranged on a back surface side so as to be separated from the sensor node communication terminal SNi by the bridge structure 200, and the measured data associated with the sensor node communication terminal SNi can be obtained. Accordingly, also when all the four sensor elements of the sensor node communication terminal SNi are in failure, more correct information can be grasped, in consideration of the measured data obtained in the adjacent sensor node communication terminals SNi−1 and SNi+1, and further in consideration of the measured data obtained in the sensor node communication terminal SNi−2.

(Configuration Example of Sensor Element and Sensor Node Communication Terminal)

Figure 17:
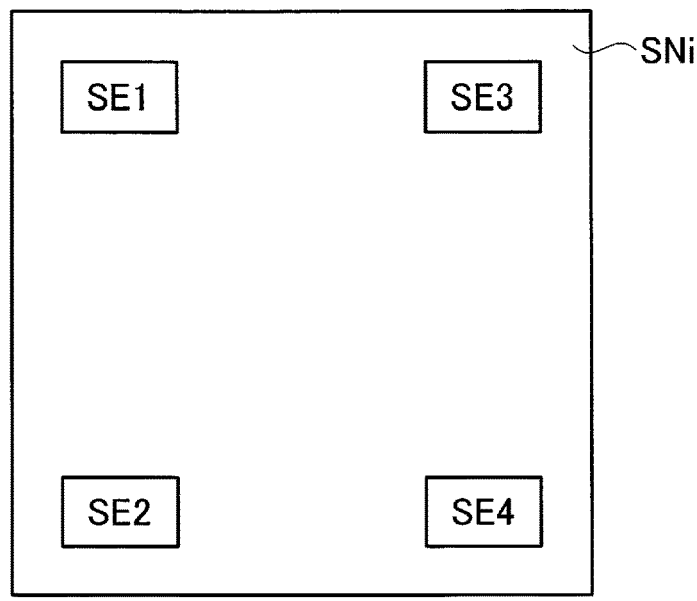
FIG. 17 is a schematic block configuration diagram of each of four sensor elements including an independent configuration, in the sensor node communication terminal applicable to the sensor network system according to the embodiments.

FIG. 17 shows a schematic block configuration in which each of four sensor elements SE1, SE2, SE3, SE4 includes an independent configuration, in the sensor node communication terminal SNi applicable to the sensor network system according to the embodiments. More specifically, in FIG. 17, the four sensor elements SE1, SE2, SE3, and SE4 respectively can be connected independently to a sensor network.

Figure 18:
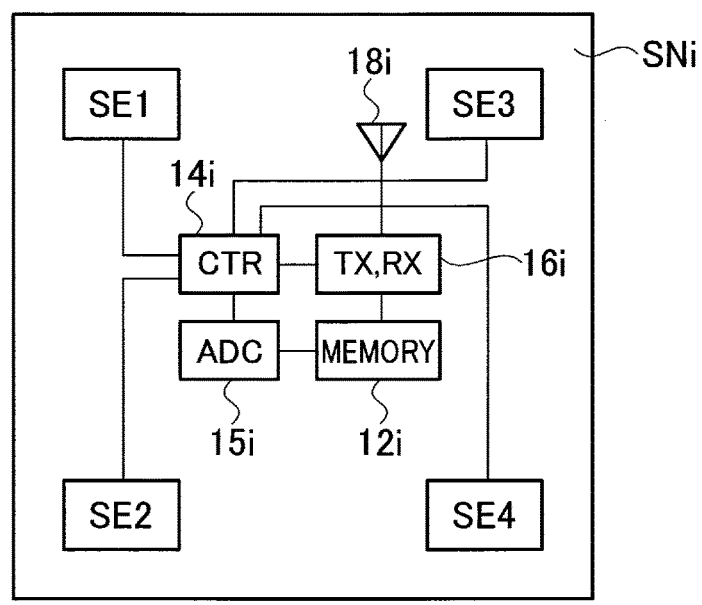
FIG. 18 is a schematic block configuration diagram of which a control unit, an ADC, a wireless transmission/reception unit, an antenna, and a memory are externally connected respectively to the four sensor elements, in the sensor node communication terminal applicable to the sensor network system according to the embodiments.

FIG. 18 shows a schematic block configuration in which a control unit 14$i$, an ADC 15$i$, a wireless transmission/reception unit 16$i$, an antenna 18$i$, and a memory 12$i$ are externally connected to the four sensor elements SE1, SE2, SE3, and SE4, in the sensor node communication terminal SNi applicable to the sensor network system according to the embodiments. Moreover, the four sensor elements SE1, SE2, SE3, and SE4 can use the control unit 14$i$, the ADC 15$i$, the wireless transmission/reception unit 16$i$, the antenna 18$i$, and the memory 12$i$, in common with one another, in FIG. 18.

Figure 19:
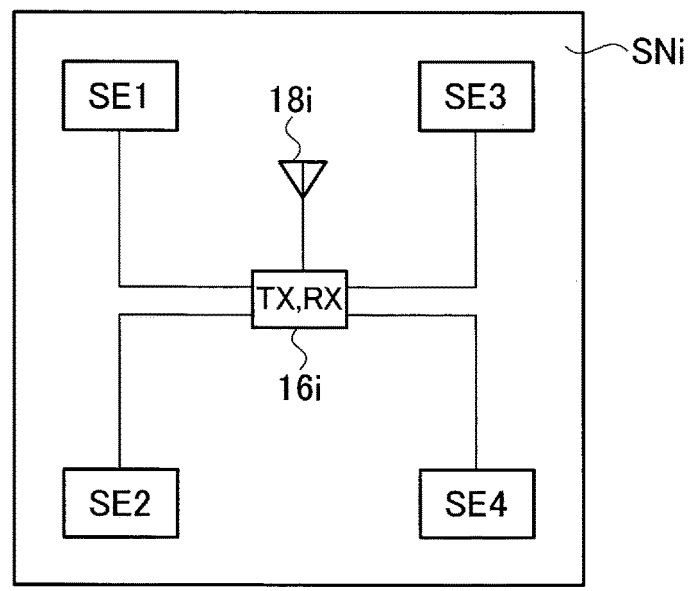
FIG. 19 is a schematic block configuration diagram of which a wireless transmission/reception unit and an antenna are externally connected respectively to the four sensor elements, in the sensor node communication terminal applicable to the sensor network system according to the embodiments.

Moreover, FIG. 19 shows a schematic block configuration in which the wireless transmission/reception unit 16$i$ and the antenna 18$i$ are externally connected to four sensor elements SE1, SE2, SE3, and SE4, in the sensor node communication terminal SNi applicable to the sensor network system according to the embodiments. Moreover, the four sensor elements SE1, SE2, SE3, and SE4 can use the wireless transmission/reception unit 16$i$ and the antenna 18$i$, in common with one another, in FIG. 19.

Figure 20:
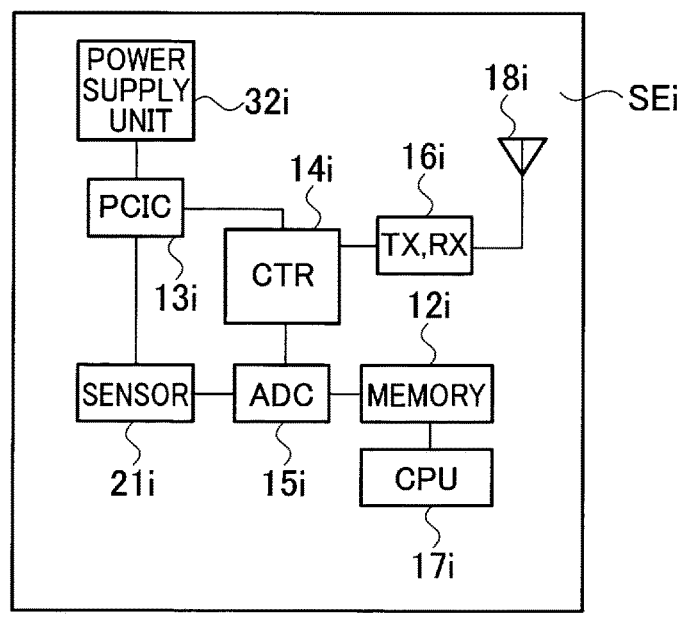
FIG. 20 is a schematic block configuration diagram of a sensor element applicable to the sensor node communication terminal shown in FIG. 17.

FIG. 20 shows a schematic block configuration of a sensor element SEi applicable to the sensor node communication terminal SNi shown in FIG. 17.

As shown in FIG. 20, the sensor element SEi applicable to the sensor node communication terminal SNi shown in FIG. 17 includes: a power supply unit 32$i$; a Power Conditioning Integrated Circuit (PCIC) 13$i$ connected to the power supply unit 32$i$; a control unit (CTR) 14$i$ and a sensor 21$i$ each connected to the PCIC 13$i$; an Analog Digital Converter (ADC) 15$i$ connected to each of the sensor 21$i$ and the CTR 14$i$; a memory 12$i$ connected to the ADC 15$i$; a Central Processing Unit (CPU) 17$i$ connected to the memory 12$i$; and a wireless transmission/reception unit 16$i$ and an antenna 18$i$ each connected to the CTR 14$i$.

Figure 21:
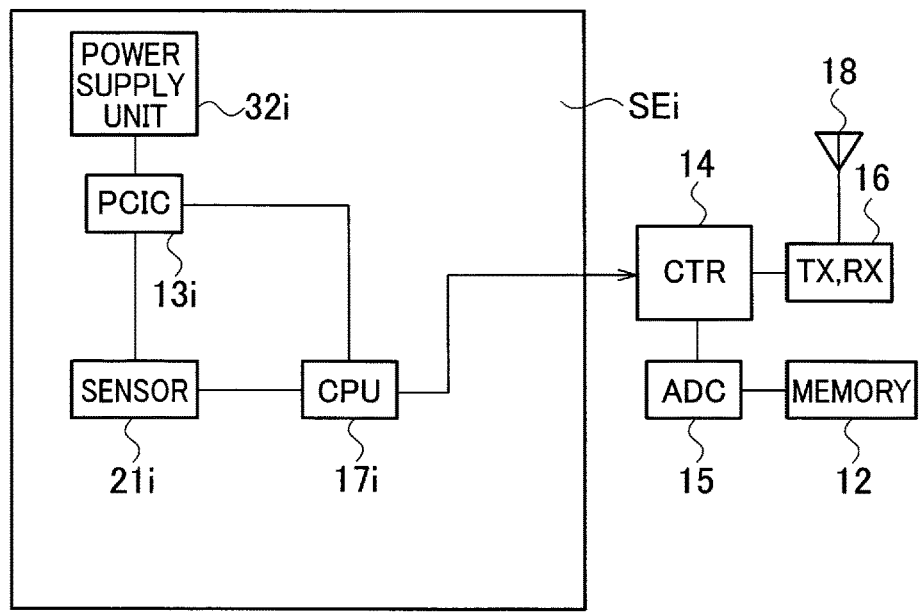
FIG. 21 is a schematic block configuration diagram of a sensor element applicable to the sensor node communication terminal shown in FIG. 18.

FIG. 21 shows a schematic block configuration of a sensor element SEi applicable to the sensor node communication terminal SNi shown in FIG. 18.

As shown in FIG. 21, the sensor element SEi applicable to the sensor node communication terminal SNi shown in FIG. 18 includes: a power supply unit 32$i$; a PCIC 13$i$ connected to the power supply unit 32$i$; a sensor 21$i$ connected to the PCIC 13$i$; and a CPU 17$i$ connected to the sensor 21$i$. A CTR14 connectable to an internal CPU 17$i$, an ADC 15 connected to the CTR14, a wireless transmission/reception unit 16 and an antenna 18 each connected to the CTR14, and a memory 12 connected to the ADC 15 are commonly disposed at the outside of the sensor element SEi.

Figure 22:
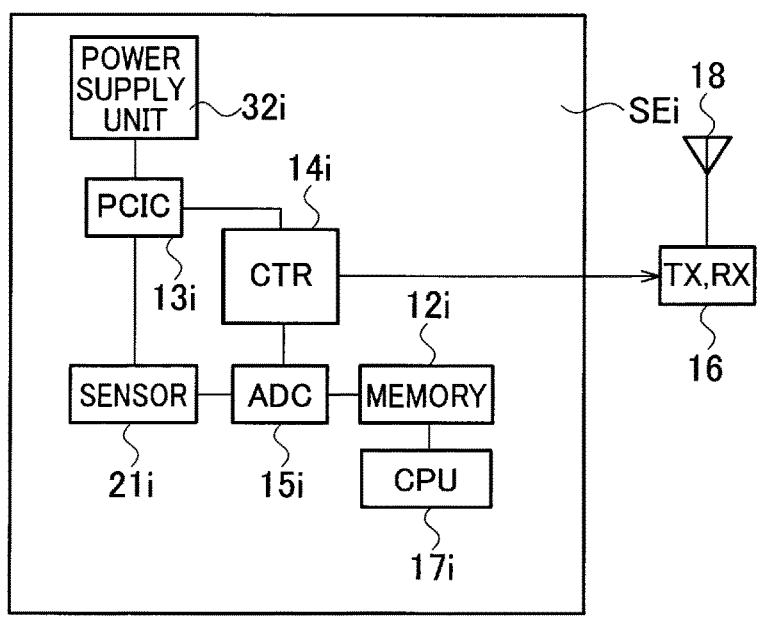
FIG. 22 is a schematic block configuration diagram of a sensor element applicable to the sensor node communication terminal shown in FIG. 19.

FIG. 22 shows a schematic block configuration of a sensor element SEi applicable to the sensor node communication terminal SNi shown in FIG. 19.

As shown in FIG. 22, the sensor element SEi applicable to the sensor node communication terminal SNi shown in FIG. 19 includes: a power supply unit 32$i$; a PCIC 13$i$ connected to the power supply unit 32$i$; a CTR 14$i$ and a sensor 21$i$ each connected to the PCIC 13$i$; an ADC 15$i$ connected to each of the sensor 21$i$ and the CTR 14$i$; a memory 12$i$ connected to the ADC 15$i$; and a CPU 17$i$ connected to the memory 12$i$. A wireless transmission/reception unit 16 connectable to the internal CPU 17$i$ and an antenna 18 are commonly disposed at the outside of the sensor element SEi.

If the sensor node communication terminal SNi shown in FIG. 17 or 19 and the sensor element SEi shown in FIG. 20 or 22 are applied as the sensor network system according to the embodiments, the following configurations may be adopted, for example. That is, the sensor network system according to the embodiments includes: a sensor object; and a plurality of sensor node communication terminals SNi mounted on the sensor object, the sensor node communication terminals SNi respectively including a plurality of sensor elements SE1, SE2, SE3, and SE4 having a function equivalent to one another. Moreover, as shown in FIG. 20 or 22, the plurality of sensor elements SE1, SE2, SE3, and SE4 respectively include: a sensor 21$i$; a memory 12$i$ configured to store sensor information obtained in the sensor 21$i$; and a control unit 14$i$ configured to analyze the sensor information stored in the memory 12$i$, wherein the control unit 14$i$ may execute self-diagnostics of failures of the plurality of the sensor elements and the plurality of the sensor node communication terminals in accordance with a failure diagnosis algorithm, and thereby maintenance of the sensor element or sensor node communication terminal determined to be in failure may be performed.

If the sensor node communication terminal SNi shown in FIG. 18 and the sensor element SEi shown in FIG. 21 are applied as the sensor network system according to the embodiments, the following configurations may be adopted, for example. That is, the sensor network system according to the embodiments may include: a sensor object; and a plurality of sensor node communication terminals SNi mounted on the sensor object. Moreover, the plurality of sensor node communication terminals SNi may respectively include: a plurality of sensor elements SE1, SE2, SE3, and SE4, each of the sensor elements SE1, SE2, SE3, and SE4 having a function equivalent to one another; a memory 12$i$ configured to store sensor information obtained by the plurality of the sensor elements SE1, SE2, SE3, and SE4; and a control unit 14$i$ configured to analyze the sensor information stored in the memory 12$i$. In the embodiments, the control unit 14$i$ may execute self-diagnostics of failures of the plurality of the sensor elements SE1, SE2, SE3, and SE4 and the plurality of the sensor node communication terminals SNi in accordance with a failure diagnosis algorithm, and thereby maintenance of the sensor element or sensor node communication terminal determined to be in failure may be performed.

As shown in below-mentioned FIG. 24, a temperature sensor 210 configured to include a thermistor etc., a humidity sensor 211 configured to measure humidity, a gas sensor 212 configured to detect a concentration of gas, e.g. $CO_2$, a strain sensor 213 configured to include a strain gage etc., a vibration sensor (acceleration sensor) 214 formed to include Micro Electro Mechanical Systems (MEMS) element etc., and the like are adoptable, as examples of the sensor $21i$ disposed the inside of the sensor element SEi. As the sensor $21i$, it is effective to arrange a plurality different type of sensors. In addition, types of the sensors $21i$ provided in the sensor element SEi are not limited to the above-mentioned examples, but also can be appropriately selected in accordance with an installation purpose of the sensor node communication terminal SNi, etc. For example, as physical quantities as sensing objects other than the above-mentioned sensing objects, there are listed a quantity of light, a quantity of airflow, an amount of inclination, pressure, a dose of radiation, etc.

In the detecting operation of the above-mentioned sensor $21i$, although a detecting operation may be constantly executed, it is preferable to execute an intermittent detecting operation for the purpose of power-saving. According to such an intermittent detecting operation, a load of job in the sensor node communication terminal SNi can be reduced.

Since the sensor node communication terminal SNi can be arranged on places difficult to access, places dangerous for maintenance, and/or remote places, power-saving and reduction of the load of job are preferable to be realized.

In the above-mentioned detecting operation of the sensor $21i$, it is preferable to execute an intermittent detecting operation also in the host communication terminal H configured to collect the information from the plurality of the sensor node communication terminals SNi, in order to reduce the load of job and realize the power-saving. The failure diagnosis may be executed in the host communication terminal H, or may be executed in the data management unit of the data analysis company configured to collect and analyze the information from the host communication terminal H.

(Schematic Structure of Wireless Sensor Network System)

Figure 23:
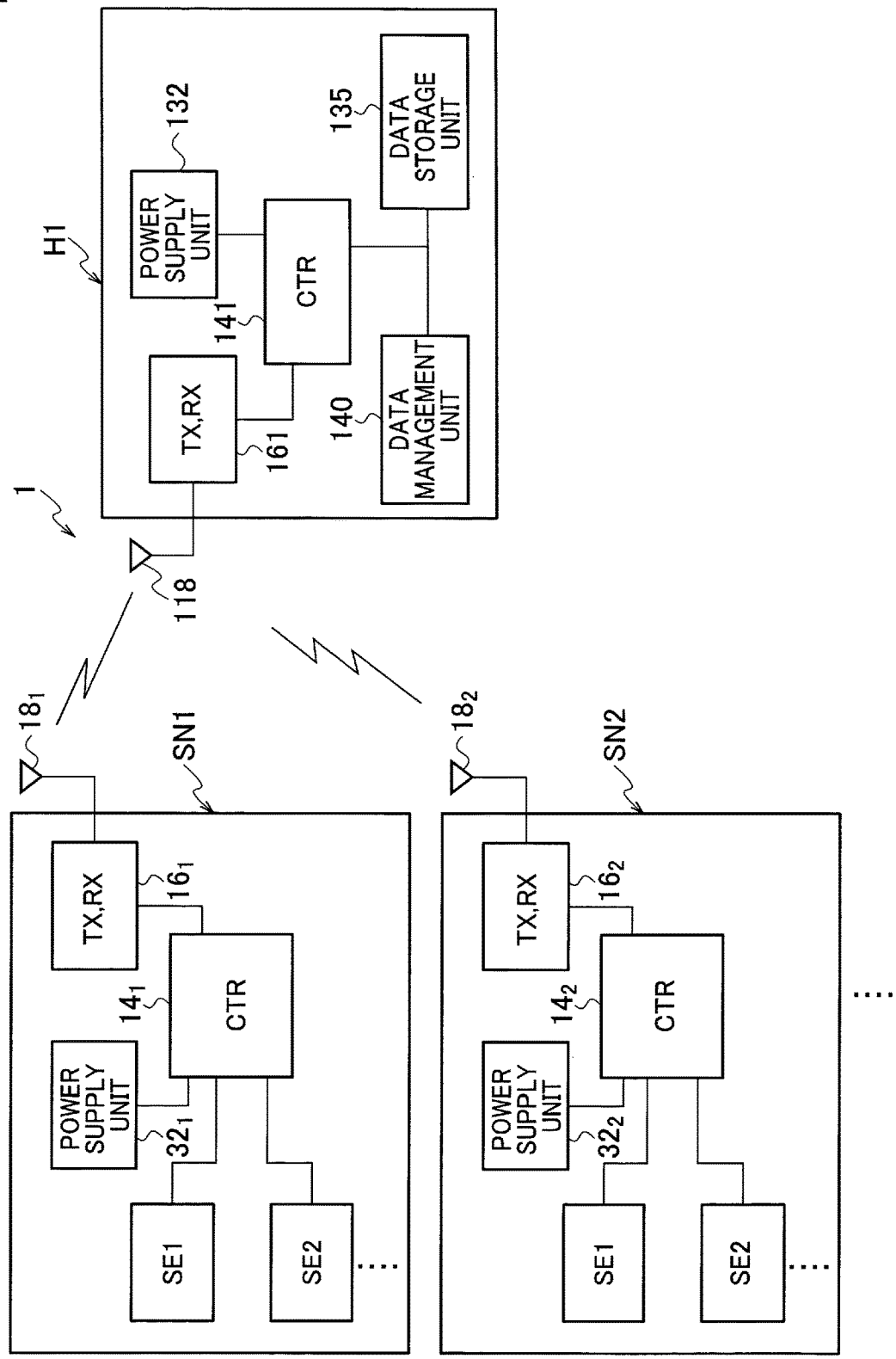
FIG. 23 is a configuration block diagram showing a schematic structure of a wireless sensor network system according to the embodiments.

FIG. 23 shows a schematic block configuration of the wireless sensor network system 1 according to the embodiments.

As shown in FIG. 23, the wireless sensor network system 1 according to the embodiments includes: a plurality of sensor node communication terminals SN1, SN2, . . . including a plurality of sensor elements SE1, SE2, . . . , the plurality of the sensor elements SE1, SE2, . . . having a function equivalent to one another; and a host communication terminal H1 including a data storage unit 135 and a data management unit 140, the data storage unit 135 configured to collect and store sensor information for the plurality of every sensor node communication terminals obtained in the plurality of the sensor elements SE1, SE2, the data management unit 140 configured to analyze the sensor information stored in the data storage unit 135. In the embodiments, the data management unit 140 can execute self-diagnostics of failures of the plurality of the sensor elements SE1, SE2, . . . in the plurality of the sensor node communication terminals SN1, SN2, in accordance with a failure diagnosis algorithm, and thereby maintenance of the sensor element or sensor node communication terminal determined to be in failure can be performed.

Data communications between the sensor node communication terminals SN1, SN2, and the host communication terminal H1 are executed with wireless communications. Alternatively, wired communications may also be used for the data communications between the sensor node communication terminals SN1, SN2, and the host communication terminal H1. Although illustration of the sensor object is omitted, the sensor node communication terminals SN1, SN2, and the host communication terminal H1 are mounted on the sensor object.

In addition, although two sensor node communication terminals SN1 and SN2 is illustrated in FIG. 23, three or more sensor node communication terminals can be provided, in the wireless sensor network system 1 which actually works. More specifically, depending on types, scales, or sizes of building structures etc. as monitoring targets or measuring objects, the total installed number of the sensor node communication terminals can be the order of tens, hundreds, or thousands of pieces, for example.

Moreover, if a large number of the sensor node communication terminals are provided, a plurality of the host communication terminals H1 may be provided, in consideration of a reception efficiency etc., and integrated management of the data etc. received in each host communication terminal H1 may be executed through a predetermined network.

The sensor node communication terminals SN1, SN2, applicable to the wireless sensor network system 1 according to the embodiments respectively include: a plurality of sensor elements SE1, SE2, . . . configured to measure various physical quantities; and wireless transmission/reception units (TX, RX) $16_1$, $16_2$, . . . each including a transmitting unit and a receiving unit, the transmitting unit configured to transmit physical quantities measured in the sensor elements SE1, SE2, . . . , as measured data to the host communication terminal H1, the receiving unit configured to receive predetermined data transmitted from the host communication terminal H1.

Moreover, the sensor node communication terminals SN1, SN2, . . . respectively include: control units $14_1$, $14_2$, . . . configured to control operations of the sensor elements SE1, SE2, . . . and the wireless transmission/reception units $16_1$, $16_2$ . . . ; and power supply units $32_1$, $32_2$, . . . configured to supply electric power to the sensor elements SE1, SE2, . . . , the wireless transmission/reception units $16_1$, $16_2$ . . . , and the control units $14_1$, $14_2$, . . . . Antennas $18_1$, $18_2$, . . . are connected to the wireless transmission/reception units $16_1$, $16_2$ . . . .

In the embodiments, the plurality of the sensor elements SE1, SE2, . . . are installed over a range capable of substantially simultaneously measuring physical quantity regarding one event.

The term "physical quantity regarding one event" used herein means a physical quantity corresponding to vibration, change of a temperature or humidity, occurrence of distortion, etc., for example, which temporally occur respectively as one event in building structures, e.g. bridges.

A concrete example of the "range capable of substantially simultaneously measuring physical quantity regarding one event" on which the sensor elements SE1, SE2, . . . are installed will be mentioned below.

Figure 24:
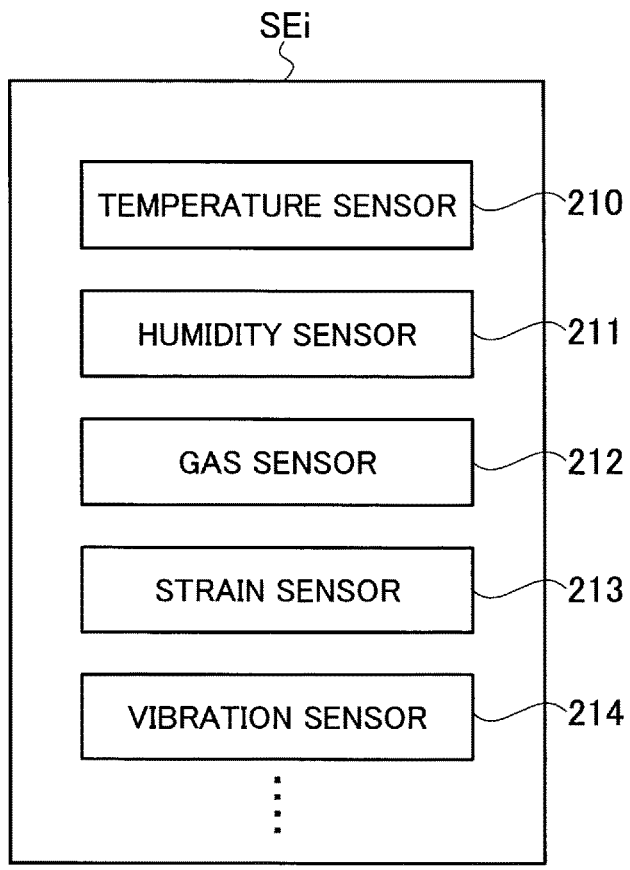
FIG. 24 is a configuration block diagram showing a configuration example of a sensor in the sensor element mounted on the sensor node communication terminal.

FIG. 24 shows an example of a schematic block configuration of various kinds of sensors in the sensor element mounted in the sensor node communication terminal.

As shown in FIG. 24, the sensor element SEi can include any one or two or more sensors, e.g. a temperature sensor 210 configured to include a thermistor etc. for measuring temperatures of outer wall portions of building structures, etc., a humidity sensor 211 configured to measure humidity of building structures etc., a gas sensor 212 configured to detect a concentration of gas, e.g. $CO_2$, a strain sensor 213 configured to include a strain gage etc. configured to detect a strain of wall portions, e.g. building structures, etc., a vibration sensor (acceleration sensor) 214 configured to detect vibration of building structures etc., and the like. The sensor mounted in the sensor element SEi is not limited to the above-mentioned sensors, but can be appropriately selected in accordance with an installation purpose, etc. of the sensor node communication terminal. For example, as physical quantities other than the above-mentioned physical quantities, there are listed a quantity of light, a quantity of airflow, an amount of inclination, pressure, a dose of radiation, etc.

All sensors to be mounted in the sensor elements SE1, SE2, . . . of each sensor node communication terminals SN1, SN2, . . . may be the same sensors. Alternatively, types of the sensor to be mounted may be changed for every sensor node communication terminals SN1, SN2, . . . .

Thereby, in accordance with the types or environments of building structures which are sensor objects, e.g. bridges, roads, railroad services, buildings, on which the sensor node communication terminals SN1, SN2, . . . are mounted, a suitable sensor for each sensor elements SE1, SE2, . . . may be mounted so as to obtain various kinds of physical quantities as measured data necessary for continuous structural health monitoring of the building structures.

(Configuration Example of Power Supply Unit)

Figure 25:
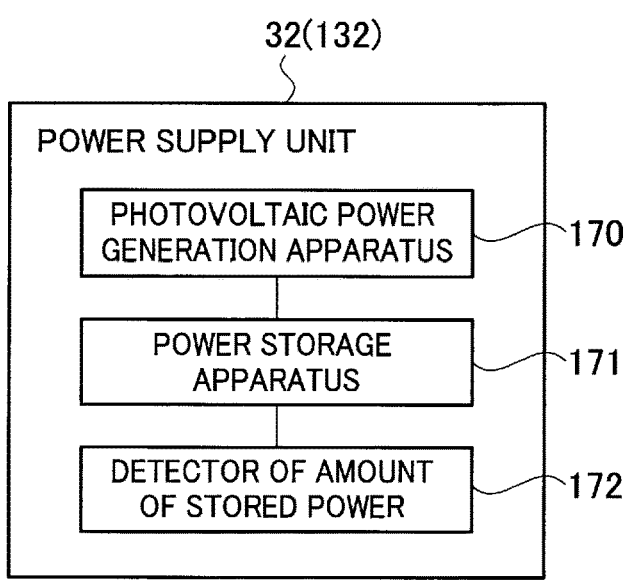
FIG. 25 is a configuration block diagram showing a configuration example of a power supply unit installed in the sensor node communication terminal or a host communication terminal.

FIG. 25 shows an example of a schematic block configuration of a power supply unit 32 (132) installed in the sensor node communication terminal or the host communication terminal. Note that the power supply unit 32 (132) may be batteries or electric power may be supplied from the outside. In an example shown in FIG. 25, the power supply unit 32 includes: a photovoltaic generation apparatus 170, e.g. a solar battery panel; and a power storage apparatus 171 configured to store electric power generated by the aforementioned photovoltaic generation apparatus 170. The power storage apparatus 171 can be configured to include a secondary battery, an electric double-layer capacitor, etc. The power storage apparatus 171 may further include a detector 172 for detecting an amount of stored power configured to detect an amount of the electric power stored in the power storage apparatus 171. The control units 14$_1$, 14$_2$, . . . , 140 shown in FIG. 23 may control the wireless transmission/reception units 16$_1$, 16$_2$, . . . , 161 and to transmit the measured data after initiating the wireless transmission/reception units 16$_1$, 16$_2$, . . . , 161, when the detector 172 for detecting an amount of stored power determines that the amount of the electric power stored in the power storage apparatus 171 exceeds a predetermined threshold value (e.g., voltage etc. capable of initiating the wireless transmission/reception units 16$_1$, 16$_2$, . . . , 161 in the sensor node communication terminal) as one of the conditions. However, the control units 14$_1$, 14$_2$, . . . , 140 do not always initiate the wireless transmission/reception units 16$_1$, 16$_2$, . . . , 161 whenever determining that the amount of the stored electric power exceeds the above-mentioned threshold. The above-mentioned condition is merely one condition, and is a necessary condition.

In an example shown in FIG. 24, the electric power generated by the photovoltaic generation apparatus 170 can be effectively used, and thereby power-saving is realized. Furthermore, by initiating each sensor node communication terminals SN1, SN2, only in a state where the measured data can be certainly transmitted, the measured data can be stably obtained over a long period of time.

In addition, the power supply unit 32 may include various kinds of electric generators to which energy harvesting technologies for transforming into electric power various kinds of energies which exist in environments with various forms, e.g. a thermal (temperature difference) energy, a vibrational energy, and a radio wave energy, are applied, instead of the photovoltaic generation apparatus 170.

Accordingly, driving electric power can be obtained from the photovoltaic generation apparatus 170 etc., without supplying electric power to each sensor node communication terminals SN1, SN2, . . . through the power line etc., and thereby it becomes possible to independently operate each sensor node communication terminals SN1, SN2, . . . .

(Schematic Structure of Host Communication Terminal)

As shown in FIG. 23, the host communication terminal H1 applicable to the wireless sensor network system 1 according to the embodiments includes a wireless transmission/reception unit (TX, RX) 132 including: a receiving unit configured to receive measured data transmitted from sensor node communication terminals SN1, SN2, . . . ; and a transmitting unit configured to transmit a predetermined signal to the sensor node communication terminals SN1, SN2, . . . .

Moreover, as shown in FIG. 23, the host communication terminal H1 includes: a data storage unit 135 configured to collect and store sensor information for every plurality of the sensor node communication terminals obtained by a plurality of sensor elements SE1, SE2, . . . ; a data management unit 140 configured to analyze the sensor information stored in the data storage unit 135; a control unit 141 configured to control operations of the wireless transmission/reception unit 161, the data storage unit 135, and the data management unit 140; and a power supply unit 132. An antenna 118 is connected to the wireless transmission/reception unit 161. In the embodiments, the data storage unit 135 may include a memory, a hard disk drive unit, etc.

The power supply unit 132 may be a battery, and may be configured to receive an electric power supply from a power line. The power supply unit 132 may be configured to include a photovoltaic generation apparatus 170 and a power storage apparatus 171 as shown in FIG. 25, depending on installed environments.

In the embodiments, the data management unit 140 can execute self-diagnostics of failures of the plurality of the sensor elements SE1, SE2, . . . in the plurality of the sensor node communication terminals SN1, SN2, . . . in accordance with a failure diagnosis algorithm, and thereby maintenance of the sensor element or sensor node communication terminal determined to be in failure can be performed.

On the other hand, the data management unit 140 and the data storage unit 135 may be disposed at the outside of the host communication terminal H1. More specifically, the data storage unit 135 may be configured to include a data server, a cloud server, etc., and to manage integrally the measured data etc. received in the host communication terminal H1 by the data management unit 140 accessible to a data server, a cloud server, etc.

In addition, the determination processing executed in accordance with the failure diagnosis algorithm may be executed by the control units $14_1$, $14_2$, . . . at the sensor node communication terminals SN1, SN2, . . . side. Moreover, the determination processing may be executed by the control unit 141 at the host communication terminal H1 side. Moreover, the determination processing may be executed in places (e.g., data analysis management company etc. provided with a data analysis processing unit) in which data is transmitted from the host communication terminal H1 etc. and the data collected by a server etc. is analyzed. In that case, for example, if four sensor elements are mounted in one sensor node communication terminal, four data to be obtained is transmitted to places for executing the determination processing. Moreover, if the determination processing is executed in places for executing data analysis (e.g., data analysis management company etc. provided with a data analysis processing unit), data for four sensor elements is transmitted also in both of data transmission from the sensor node communication terminals SN1, SN2, . . . to the host communication terminal H1 and a data transmission from the host communication terminal H1 to the data analysis processing unit. Moreover, the determination processing not only is executed by the data administrator as mentioned above, but also may be automatically executed.

The failed states of the sensor element are two states of "failure" or "normal", a degree of failures of the sensor node communication terminal is expressed in accordance with the number of failed sensor elements in the four sensor elements, in an explanation of an example of the sensor node communication terminal including four sensor elements. More specifically, a degree of failures is any one selected from five states, i.e., 0%, 25%, 50%, 75%, and 100%. 0% indicates that all four sensor elements are normal; 25% indicates that anyone of the four sensor elements is in failure; 50% indicates that any two of the four sensor elements are in failure; 75% indicates that any three of the four sensor elements are in failure, and the remaining one sensor element is normal; and 100% indicates that all four sensor elements are in failure.

The detailed processing procedure of the failure determination processing is as explained with reference to FIG. 9. More specifically, if determining that a variation of the measured data corresponding to each sensor element SE1, SE2, included in the aforementioned sensor node communication terminals SN1, SN2, is not in the relationship range, data excluded from the group are specified by analyzing each measured data, and thereby the concerned sensor element is determined to be in failure, and then the concerned measured data is treated as unavailable data, and only the other measured data is used for subsequent analysis. Furthermore, the number of the failed sensor elements is used as one of the indices of the degree of failures of the aforementioned sensor node communication terminal. If determining that a degree of failures of the aforementioned sensor node communication terminal is equal to or greater than a preset reference value (threshold) (for example, the degree equal to or greater than 51% is in failure), a report for promoting maintenance of the concerned sensor element or the concerned sensor node communication terminal is executed. In the embodiments, the report can be executed also in the antenna (reporting unit) 118 of the host communication terminal H1. This report may be executed in places for executing data analysis (e.g., data analysis management company etc. provided with a data analysis processing unit), or may be executed in equipment capable of referencing the data analysis processing result (can be referenced by an administrator).

Accordingly, maintenance, e.g., a replacement etc., is immediately performed with respect to the reported sensor element, and thereby structural health monitoring can be continuously executed.

Moreover, it is also controllable to reset the information regarding the failure of the sensor element after the completion of the maintenance.

Accordingly, the determination of the failure etc. can newly be started by the host communication terminal H1 etc. also with regard to the replaced sensor element.

(Configuration Example of Wireless Sensor Network System)

Figure 26:
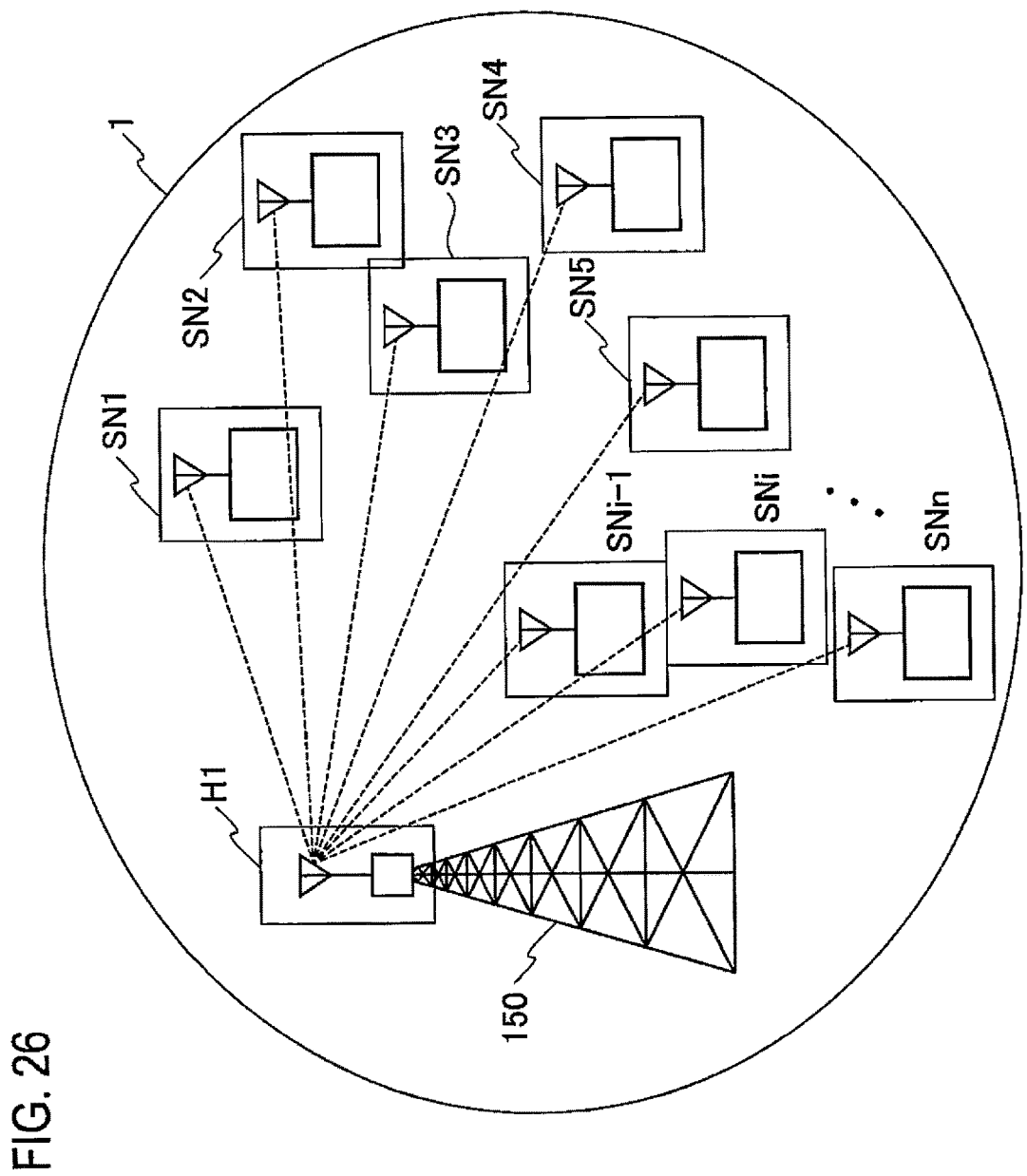
FIG. 26 is a schematic configuration diagram showing a configuration example of the wireless sensor network system according to the embodiments.

FIG. 26 shows a schematic configuration example of the wireless sensor network system 1 according to the embodiments.

In the configuration example shown in FIG. 26, the wireless sensor network system 1 includes: a plurality of sensor node communication terminals SN1, SN2, . . . , SNi−1, SNi, . . . , SNn; and a host communication terminal H1 configured to receive data measured in sensor elements of the sensor node communication terminals SN1, SN2, . . . , SNi−1, SNi, . . . , SNn. In the embodiment, a receiver of a host communication terminal H1 may execute an operation of receiving the measured data wirelessly transmitted from the sensor node communication terminals SN1, SN2, . . . , SNi−1, SNi, . . . , SNn to the host communication terminal H1 by opening a reception window with respect to a fixed-time transmitting operation by a system shared timer.

As shown in FIG. 26, the wireless sensor network system 1 according to the embodiments includes: a plurality of sensor node communication terminals SN1, SN2, . . . , SNi−1, SNi, . . . SNn including a plurality of sensor elements, the plurality of the sensor elements having a function equivalent to one another; and a host communication terminal H1 configured to collect sensor information for every plurality of the sensor node communication terminals obtained by the plurality of the sensor elements. In the embodiments, the host communication terminal H1 includes: a data storage unit configured to store sensor information for every plurality of sensor node communication terminals; and a data management unit configured to analyze the sensor information stored in the data storage unit. The data management unit executes self-diagnostics of failures of the plurality of the sensor elements in the plurality of the sensor node communication terminals SN1, SN2, . . . , SNi−1, SNi, . . . , SNn in accordance with a failure diagnosis algorithm, and thereby maintenance of the sensor element or sensor node communication terminal determined to be in failure can be performed.

Each sensor node communication terminals SN1, SN2, . . . , SNi−1, SNi, . . . , SNn may be installed in building structures, e.g., bridges, roads, railroad services, buildings, etc., for example. Furthermore, the sensor object 2 is not limited to the building structures, but also is various fields, e.g.: air pollution; forest fire; quality control of wine brewing; care of children who play outdoors; care of people who play sports; detection of smartphones; surrounding access control to nuclear power plants, defense facilities, etc.; detection of radioactivity levels of nuclear power plants; control of intensity levels of electromagnetic fields; grasp of traffic congestion situations, e.g. traffic jams; smart roads; smart lightings; high-function shopping; noise environment maps; high-efficiency shipment of vessels; water quality managements; refuse disposal managements; smart parking;

managements of golf courses; managements of water leakage/gas leakage; managements of automatic driving; efficiently arrangements and managements of infrastructures in urban areas, etc.

In addition, as mentioned above, each sensor node communication terminals SN1, SN2, . . . , SNi−1, SNi, . . . , SNn can be independently driven by providing a battery, a solar power generation photovoltaic generation apparatus, etc. as the power supply unit.

The host communication terminal H1 is installed in an upper portion of a support 150 or a tower having a predetermined height, for example. Accordingly, signals and data can be certainly transmitted and received between each sensor node communication terminals SN1, SN2, . . . , SNi−1, SNi, . . . , SNn.

If a number of the sensor node communication terminals are installed, two or more sets of the host communication terminals H1 are provided in consideration of a reception efficiency of the sensor node communication terminal installed in a position shadowed from radio waves, etc., and thereby data received in each host communication terminal H1 may be integrated by the data management unit through a predetermined network.

(Arrangement Example of Sensor Element and Example of Sensor Module)

Figure 27A:
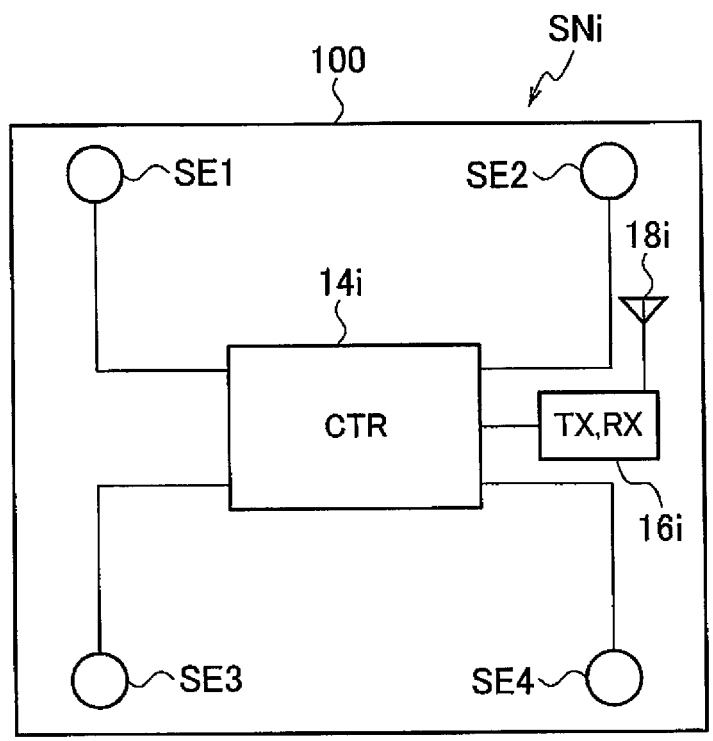
FIG. 27A is a schematic plain diagram showing an example of arranging four sensor elements, in an arrangement example of sensor elements which can be mounted on the sensor node communication terminal.
Figure 27B:
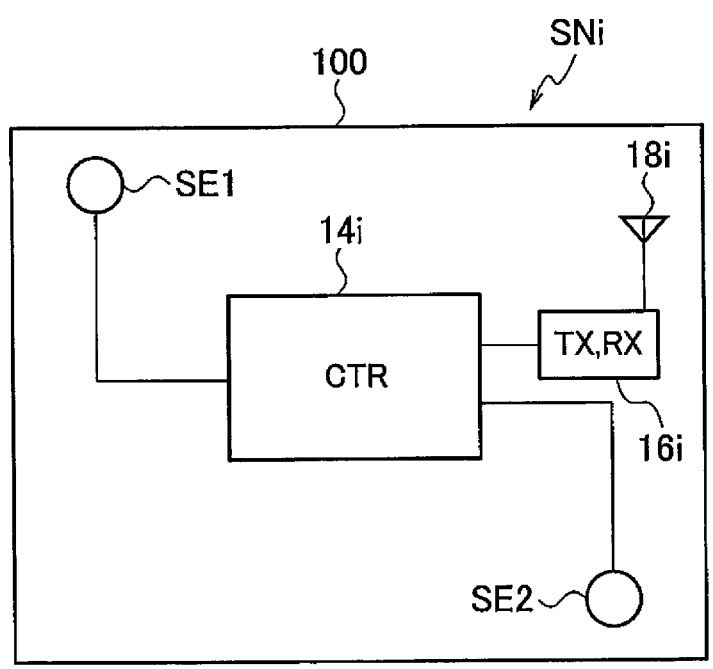
FIG. 27B is a schematic plain diagram showing an example of arranging two sensor elements, in an arrangement example of sensor elements which can be mounted on the sensor node communication terminal.
Figure 28A:
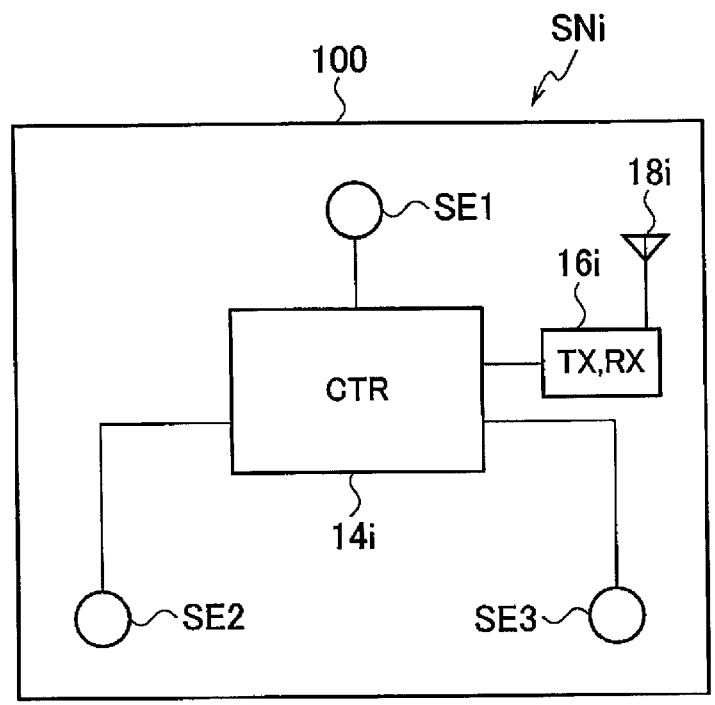
FIG. 28A is a schematic plain diagram showing an example of arranging three sensor elements, in an arrangement example of sensor elements which can be mounted on the sensor node communication terminal.
Figure 28B:
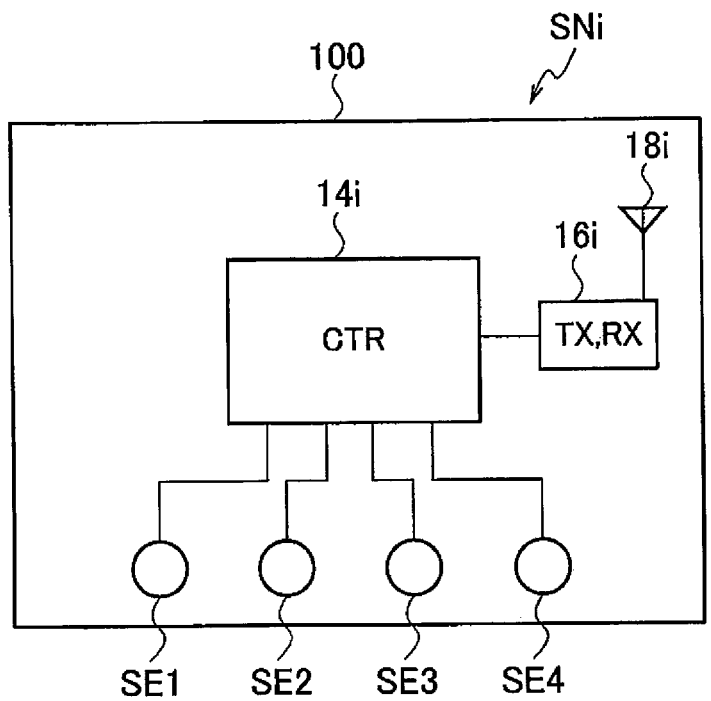
FIG. 28B is a schematic plain diagram showing an example of linearly arranging four sensor elements, in an arrangement example of sensor elements which can be mounted on the sensor node communication terminal.

In an arrangement example of the sensor elements which can be mounted in the sensor node communication terminal SNi, FIG. 27A schematically shows an example of arranging four sensor elements SE1, SE2, SE3, and SE4, and FIG. 27B schematically shows an example of arranging two sensor elements SE1 and SE2. Moreover, FIG. 28A shows an example of arranging three sensor elements SE1, SE2 and SE3, and FIG. 28B shows an example of linearly arranging four sensor elements SE1, SE2, SE3, and SE4. As a matter of convenience of explanation, although the number of the installed sensor elements is the maximum four pieces, it is not limited to this installed number, also when installing two, three, or five or more sensor elements, for example, the same arrangement formation can be adopted.

As shown in FIGS. 27 and 28, the sensor node communication terminal SNi includes a substrate 100, and sensor elements SE1, SE2, . . . , a control unit 14$i$, and a wireless transmission/reception unit 16$i$ connected to an antenna 18$i$ are arranged on the substrate 100. Other components, a power supply unit 32$i$, a PCIC 13$i$, a sensor 21$i$, an ADC 15$i$, memory 12$i$, a CPU 17$i$, etc. are mounted at the sensor element side.

In the examples shown in FIGS. 27-28, the above-mentioned term "range capable of substantially simultaneously measuring physical quantity regarding one event" means corner portions or edge portions two-dimensionally separated from one another on the substrate 100.

Firstly, in the arrangement example shown in FIG. 27A, the sensor elements SE1, SE2, SE3, and SE4 are respectively arranged at four corners on the rectangular-shaped substrate 100. According to the aforementioned configuration, the four sensor elements SE1, SE2, SE3, and SE4 are respectively installed at the corner portions two-dimensionally separated from one another on the substrate 100, and thereby can almost simultaneously measure a physical quantity regarding one event.

In the arrangement example shown in FIG. 27B, the sensor elements SE1 and SE2 are respectively arranged at two corners positioned in a vertical angle on the rectangular-shaped substrate 100. According to the aforementioned configuration, the two sensor elements SE1 and SE2 are respectively installed at the corner portions two-dimensionally separated from each other on the substrate 100, and thereby almost simultaneously measures a physical quantity regarding one event.

In the arrangement example shown in FIG. 28A, the sensor elements SE1, SE2 and SE3 are respectively arranged along the edge portions on the rectangular-shaped substrate 100. According to the aforementioned configuration, the three sensor elements SE1, SE2, and SE3 are respectively installed along the edge portions two-dimensionally separated from one another on the substrate 100, and thereby almost simultaneously measures a physical quantity regarding one event.

The sensor elements SE1, SE2, SE3, and SE4 are arranged so as to be respectively separated from one another at a predetermined distance (e.g., distance corresponding to the length of one sensor element) linearly along one edge portion on the rectangular-shaped substrate 100, in the arrangement example shown in FIG. 28B. According to the aforementioned configuration, the four sensor elements SE1, SE2, SE3, and SE4 are respectively installed along the one edge portion two-dimensionally separated from one another on the substrate 100, and thereby almost simultaneously measures a physical quantity regarding one event.

Figure 29:
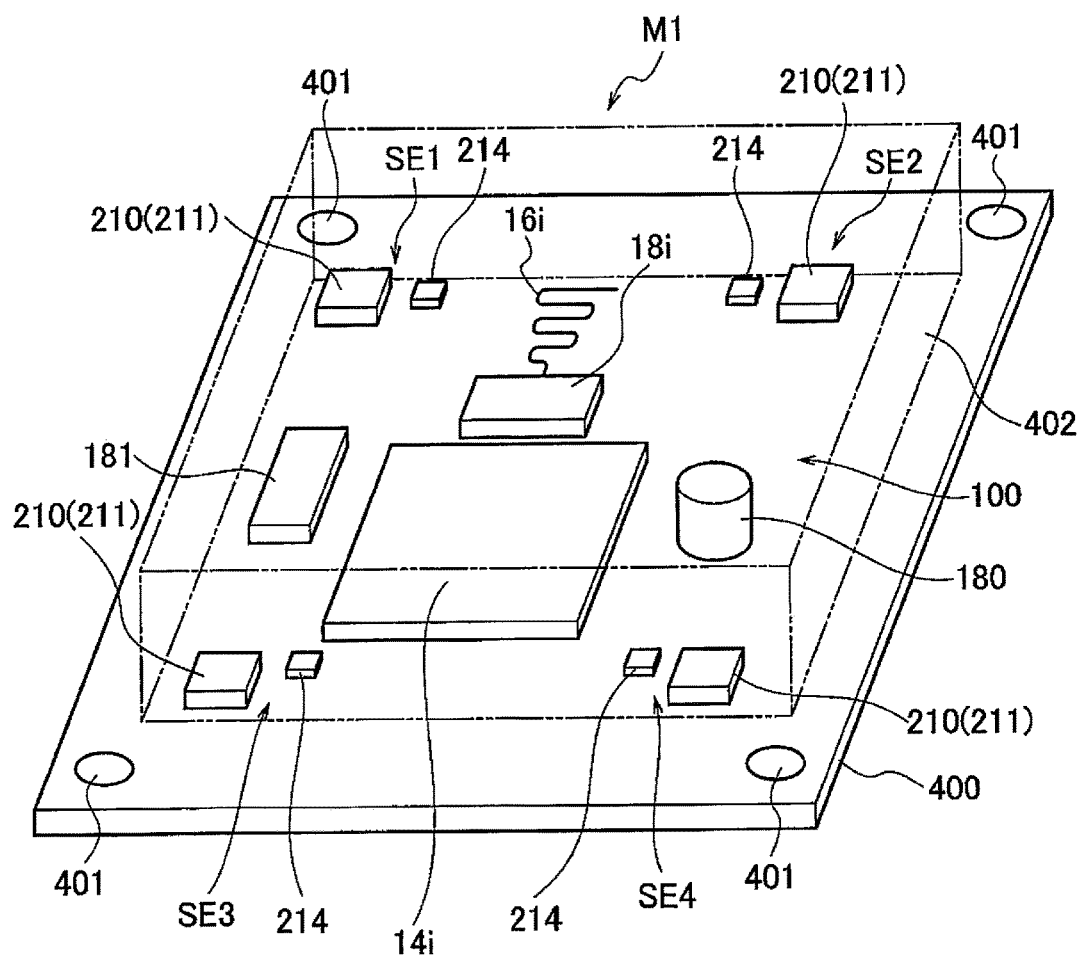
FIG. 29 is a partial-perspective bird's-eye view diagram showing a configuration example of a sensor module which can be mounted on the sensor node communication terminal.

FIG. 29 shows a partial-perspective bird's-eye view diagram showing a configuration example of a sensor module M1 which can be mounted in the sensor node communication terminal. FIG. 29 shows a specific configuration example of the arrangement example shown in FIG. 27A.

The sensor module M1 includes: a metallic attachment plate 400 having attaching holes 401 respectively in the four corners; and a rectangular-shaped substrate 100 disposed on the attachment plate 400.

A control unit 14$i$, a capacitor 180 as a storage element, a crystal oscillator 181 configured to generate a clock for control, a wireless transmission/reception unit 16$i$, and an antenna (antenna pattern) 18$i$ are disposed at an approximately center on the rectangular-shaped substrate 100.

At four corners on the substrate 100, sensor elements SE1, SE2, SE3, and SE4 are arranged. In the example shown in FIG. 29, temperature sensors 210 (humidity sensors 211) and vibration sensors 214 are arranged as sensors (21) of the respective sensor elements SE1, SE2, SE3, and SE4.

The sensors (21) of each sensor elements SE1, SE2, SE3, and SE4 are not limited to a combination of the temperature sensor 210 (humidity sensor 211) and the vibration sensor 214, nut may be include combinations of various kinds of sensors shown in FIG. 24.

Moreover, the substrate 100 is covered with a housing 402 configured to include a resin, ceramics, etc., so as to be protected from wind and rain etc.

(Arrangement Example of Substrate on which Sensor Elements are Mounted)

Figure 30:
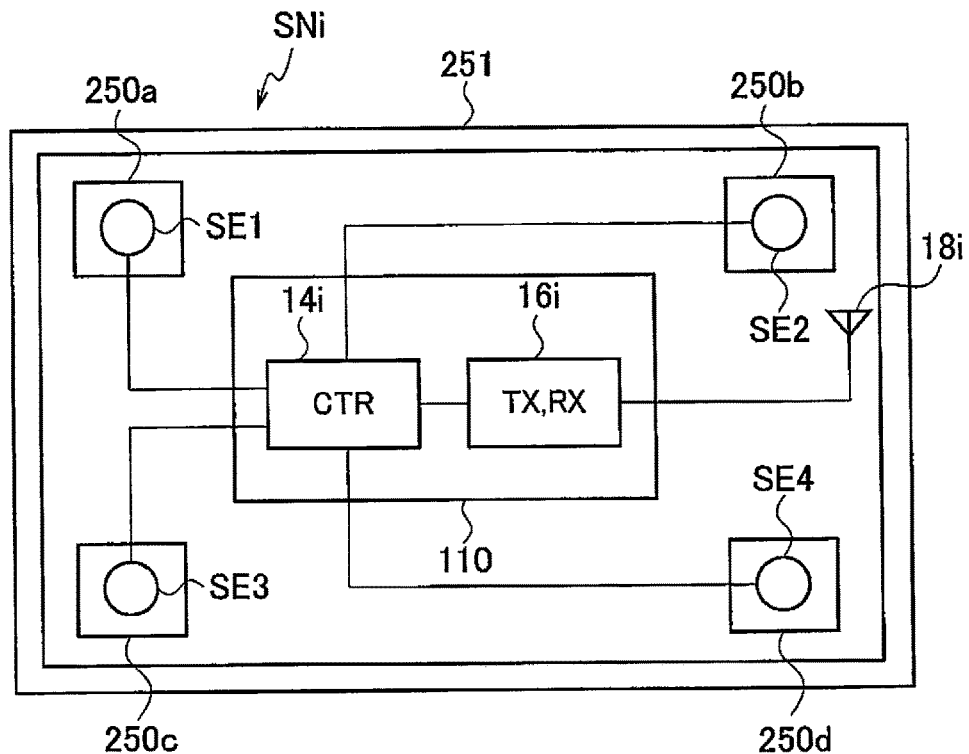
FIG. 30 is a schematic plain diagram of an arrangement example of a substrate on which a sensor element which can be mounted on the sensor node communication terminal is mounted.
Figure 31:
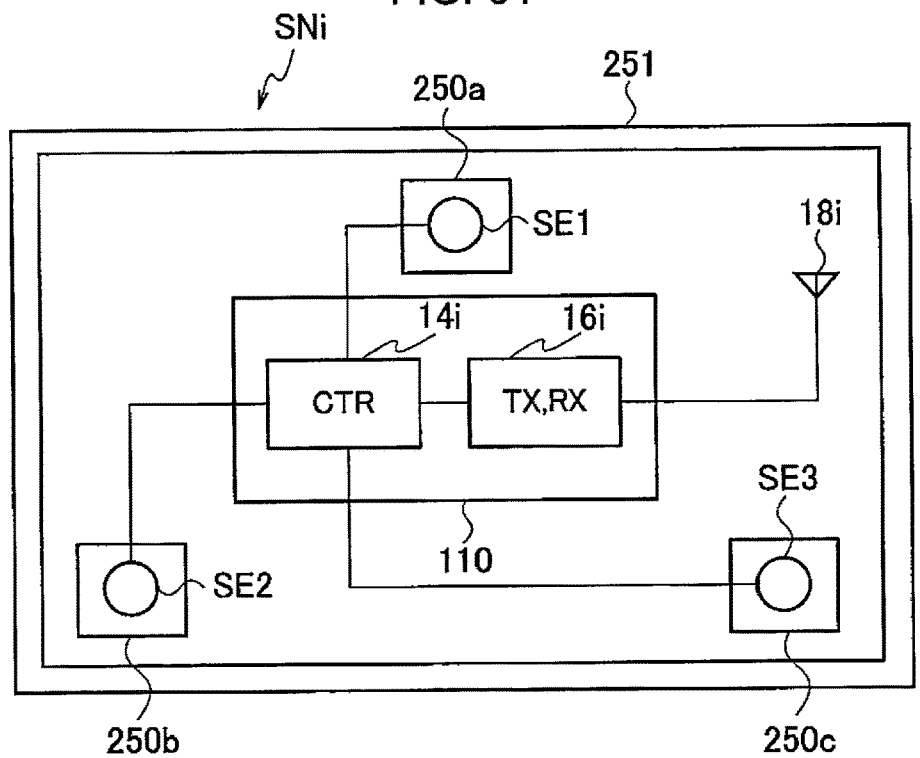
FIG. 31 is a schematic plain diagram of another arrangement example of the substrate on which the sensor element which can be mounted on the sensor node communication terminal is mounted.

An arrangement example of substrates 250$a$, 250$b$, 250$c$, and 250$d$ which mount sensor elements SE1, SE2 SE3, and SE4, respectively is expressed as schematically shown in FIG. 30. Moreover, FIG. 31 schematically shows an arrangement example of substrates 250$a$, 250$b$, and 250$c$ on which the sensor elements SE1, SE2, and SE3 are respectively mounted. Moreover, FIG. 32 schematically shows an arrangement example of substrates 250$a$ and 250$b$ on which the sensor elements SE1 and SE2 are respectively mounted.

Figure 32:
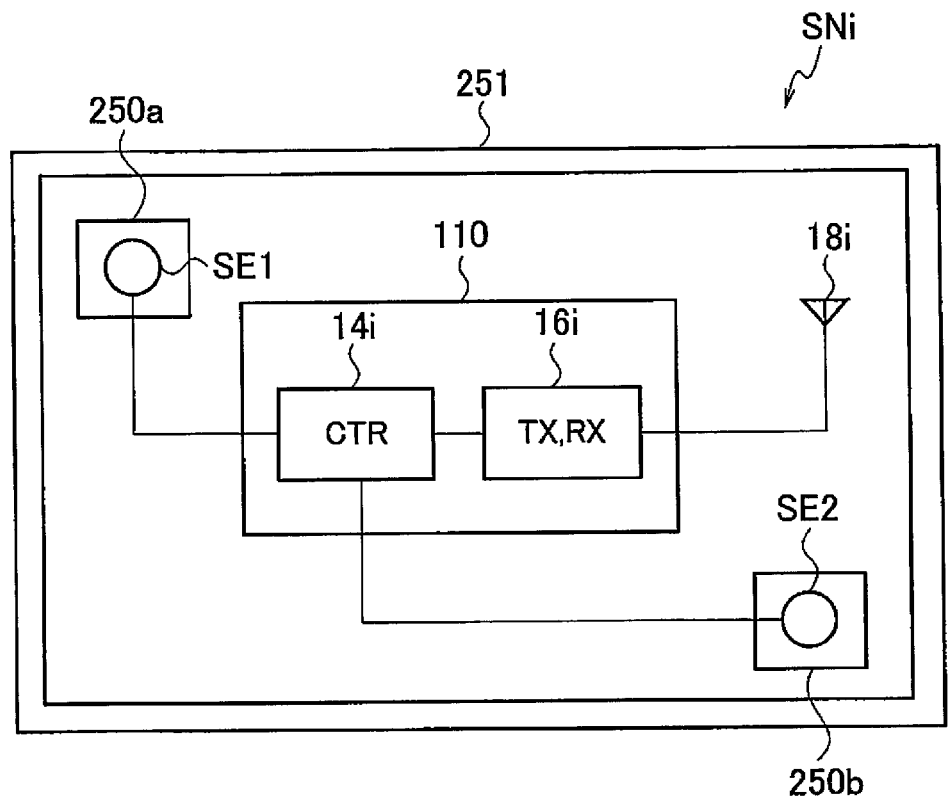
FIG. 32 is a schematic plain diagram of still another arrangement example of the substrate on which the sensor element which can be mounted on the sensor node communication terminal is mounted.

With reference to FIGS. 30-32, there will now be explained the arrangement examples of the substrates on which the sensor elements SE1, SE2, . . . are mounted, in the sensor node communication terminal SNi.

In the arrangement examples of the substrates shown in FIGS. 30-32, the sensor node communication terminal SNi includes: a housing or frame body 251; and substrates 110, 250*a*, 250*b*, . . . arranged on the housing or frame body 251. Moreover, a CTR 14*i* and a wireless transmission/reception unit 16*i* are arranged on the substrate 110, and sensor elements SE1, SE2, . . . are arranged on the substrates 250*a*, 250*b*, . . . . Other components, a power supply unit 32*i*, a PCIC 13*i*, a sensor 21*i*, an ADC 15*i*, memory 12*i*, a CPU 17*i*, etc. are mounted at the sensor element side.

More specifically, the sensor node communication terminal SNi includes the substrates 250*a*, 250*b*, . . . on which at least any of the sensor elements SE1, SE2, is mounted, in the arrangement examples of the substrates shown in FIGS. 30-32, the "range capable of substantially simultaneously measuring physical quantity regarding one event" is a range in which the plurality of the substrates 250*a*, 250*b*, . . . are respectively arranged so as to be two-dimensionally separated from one another at a predetermined distance.

As a matter of convenience of explanation, although the number of the installed sensor elements is the maximum four pieces, it is not limited to this installed number, the same arrangement formation can be adopted also when installing five or more sensor elements.

In the arrangement example of the substrate shown in FIG. 30, the substrate 250*a* on which the sensor element SE1 is mounted, a substrate 250*b* on which the sensor element SE2 is mounted, a substrate 250*c* on which the sensor element SE3 is mounted, and a substrate 250*d* on which the sensor element SE4 is mounted are respectively arranged at the four corners on the rectangular-shaped bottom surface in the housing or frame body 251. Moreover, a substrate 110 is arranged at an approximately center of a bottom surface of the housing or frame body 251, and a wireless transmission/reception unit 16*i* connected to a control unit 14*i* and an antenna 18*i* is mounted thereon. The sensor elements SE1, SE2, SE3, and SE4 are connected to the control unit 14*i*. According to the aforementioned configuration, the substrates 250*a*, 250*b*, 250*c* and 250*d* on which the four sensor elements SE1, SE2, SE3, and SE4 are mounted are respectively installed at the corner portions two-dimensionally separated from one another on the substrate 100, and thereby can almost simultaneously measure a physical quantity regarding one event.

In the arrangement example of the substrate shown in FIG. 31, a total of three substrates, e.g., a substrate 250*a* on which the sensor element SE1 is mounted, a substrate 250*b* on which the sensor element SE2 is mounted, and a substrate 250*c* on which the sensor element SE3 is mounted, at corner portions or inner edge portions of a rectangular-shaped bottom surface in the housing or frame body 251 are arranged. Moreover, a substrate 110 is arranged at an approximately center of a bottom surface of the housing or frame body 251, and a wireless transmission/reception unit 16*i* connected to a control unit 14*i* and an antenna 18*i* is mounted thereon. The sensor elements SE1, SE2 and SE3 are connected to the control unit 14*i*. According to the aforementioned configuration, the substrates 250*a*, 250*b*, and 250*c* on which the four sensor elements SE1, SE2, and SE3 are mounted are respectively installed at the corner portions or inner edge portions two-dimensionally separated from one another on the substrate 100, and thereby can almost simultaneously measure a physical quantity regarding one event.

In the arrangement example of the substrates shown in FIG. 32, a substrate 250*a* on which the sensor element SE1 is mounted and a substrate 250*b* on which the sensor element SE2 is mounted are arranged in corner portions positioned on a diagonal line of the rectangular-shaped bottom surface in the housing or frame body 251. Moreover, a substrate 110 is arranged at an approximately center of a bottom surface of the housing or frame body 251, and a wireless transmission/reception unit 16*i* connected to a control unit 14*i* and an antenna 18*i* is mounted thereon. The sensor elements SE1 and SE2 are connected to the control unit 14*i*. According to the aforementioned configuration, the substrates 250*a* and 250*b* on which the four sensor elements SE1 and SE2 are mounted are respectively installed at the corner portions positioned on a diagonal line so as to be two-dimensionally separated from one another on the substrate 100, and thereby can almost simultaneously measure a physical quantity regarding one event.

(Arrangement Example of Sensor Modules on which Sensor Element is Mounted)

Figure 33:
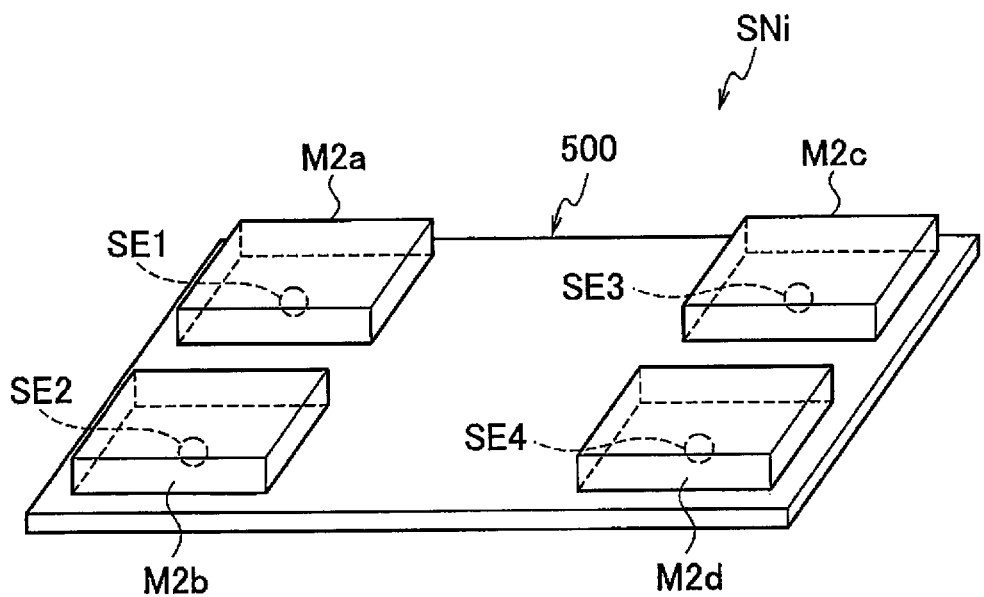
FIG. 33 is a schematic bird's-eye view of an arrangement example of a sensor module in which the sensor element is mounted, in the sensor node communication terminal.

FIG. 33 shows an arrangement example of sensor modules respectively on which sensor elements are mounted, in the sensor node communication terminal SNi according to the embodiments. More specifically, FIG. 33 shows a schematic bird's-eye view configuration of sensor modules M2*a*, M2*b*, M2*c*, and M2*d* respectively on which sensor elements SE1, SE2, SE3, and SE4 are mounted.

Figure 34:
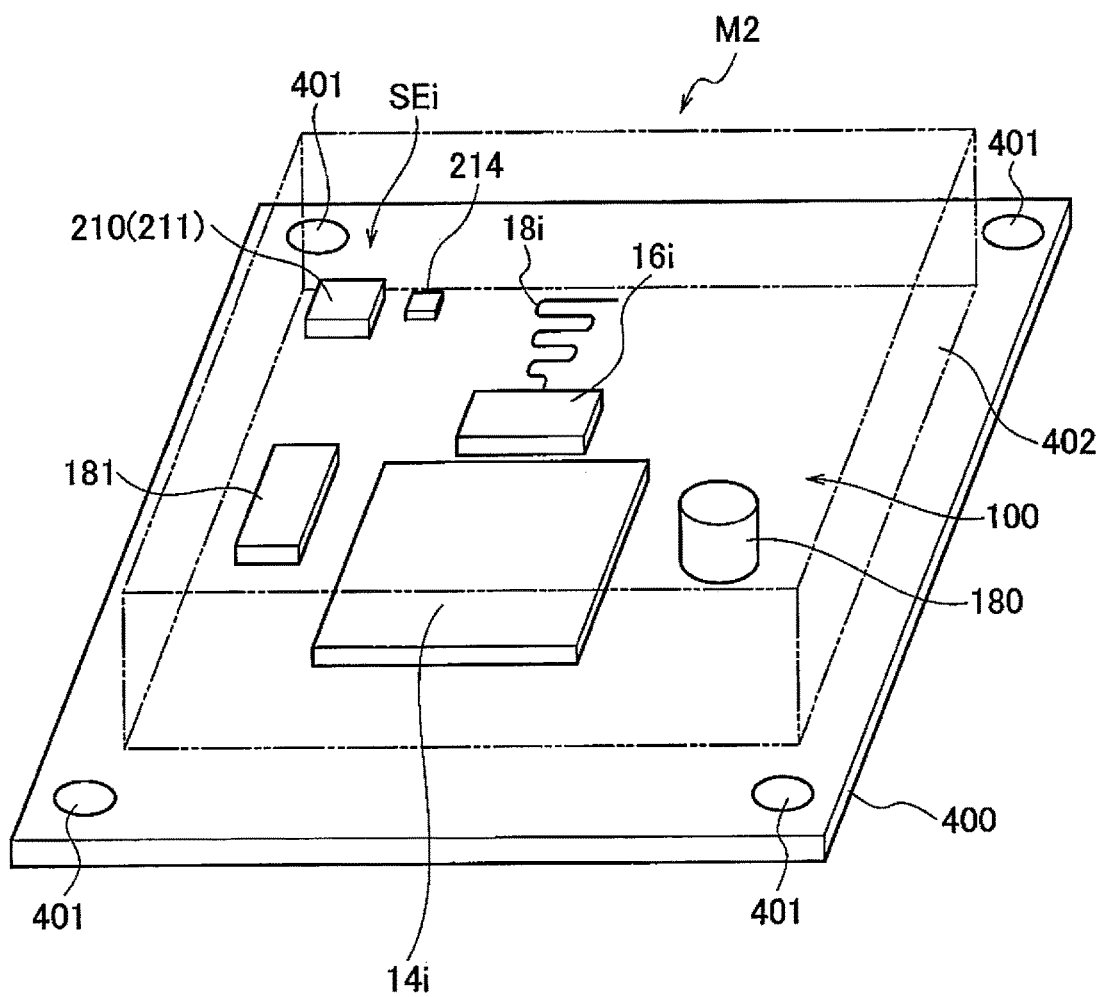
FIG. 34 is a partial-perspective bird's-eye view diagram showing a configuration example of a sensor module in which a sensor element is mounted, in the sensor node communication terminal.

FIG. 34 shows a partial-perspective bird's-eye view configuration showing a configuration example of the sensor module on which the sensor element SEi is mounted, in the sensor node communication terminal SNi according to the embodiments.

In the arrangement example shown in FIGS. 33 and 34, the "range capable of substantially simultaneously measuring physical quantity regarding one event" is a range of arranging the plurality of sensor modules M2*a*, M2*b*, M2*c*, and M2*d* so as to be two-dimensionally separated at a predetermined distance.

More specifically, in the arrangement example shown in FIG. 33, the four sensor modules M2*a*, M2*b*, M2*c*, and M2*d* are arranged at the four corners of a plate-shaped installation potion 500.

According to the aforementioned configuration, the sensor modules M2*a*, M2*b*, M2*c*, and M2*d* on which the four sensor elements SE1, SE2, SE3, and SE4 are mounted are respectively installed at the corner portions two-dimensionally separated from one another on the substrate 100, and thereby can almost simultaneously measure a physical quantity regarding one event.

The sensor module M2 includes: a metallic attachment plate 400 having attaching holes 401 respectively in the four corners; and a substrate 100 disposed on the attachment plate 400. A sensor element SEi, a CTR 14*i*, a capacitor 180 as a storage element, a crystal oscillator 181 configured to generate a clock for control, a wireless transmission/reception unit 16*i*, and an antenna (antenna pattern) 18*i* are arranged on the substrate 100. The sensor element SEi (any one of the sensor elements SE1, SE2, SE3, and SE4) is arranged at one corner portion of the substrate 100. In the example shown in FIG. 34, a temperature sensor 210 or humidity sensor 211 and a vibration sensor 214 are arranged as sensors. As sensors, it is not limited to the combination of the temperature sensor 210 or humidity sensor 211 and the vibration sensor 214, any combinations of various kinds of the sensors shown in FIG. 24 are applicable.

A control unit 14*i*, a capacitor 180 as a storage element, a crystal oscillator 181 configured to generate a clock for control, a wireless transmission/reception unit 16*i*, and an antenna (antenna pattern) 18*i* are disposed at an approximately center on the substrate 100. Moreover, the substrate 100 is covered with a housing 402 configured to include a resin, ceramics, etc., so as to be protected from wind and rain etc. The installation position of the sensor elements SEi is not limited to the corner portions as shown in FIG. 34, but the sensor elements SEi may be arranged at any positions on the substrate 100.

(Three-Dimensional Arrangement Example of Sensor Elements)

Figure 35:
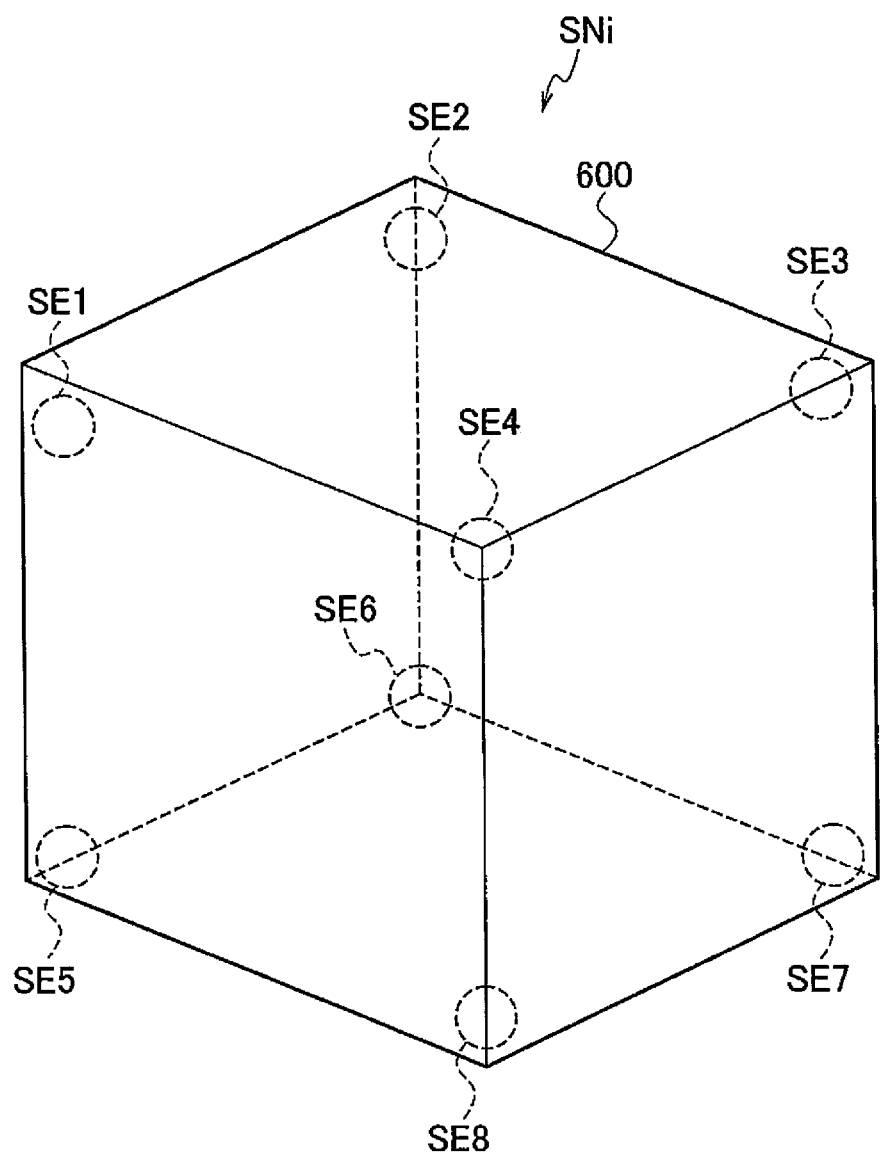
FIG. 35 is a schematic bird's-eye view configuration diagram showing a three-dimensional arrangement example of the sensor element which can be mounted on the sensor node communication terminal.

FIG. 35 shows a schematic bird's-eye view configuration which shows a three-dimensional arrangement example of the sensor elements which can be mounted on the sensor node communication terminal according to the embodiments.

In the example shown in FIG. 35, sensor elements SE1-SE8 are respectively arranged at eight corner portions in a rectangular parallelepiped housing 600.

In addition, it may be configured so that each sensor element SE1-SE8 itself may be arranged at each corner portion, and may be connected to a control unit (not illustrated), and data measured in each sensor element SE1-SE8 may be transmitted to the host communication terminal H1 through the wireless transmission/reception unit.

According to the aforementioned configuration, the sensor elements SE1-SE8 are respectively installed at the corner portions three-dimensionally separated from one another, and thereby almost simultaneously measures a physical quantity regarding one event.

Moreover, a substrate and/or module on which the sensor elements SE1-SE8 are mounted may be arranged at corner portions in the housing 600.

In the example shown in FIG. 35, although the sensor elements SE1-SE8 are respectively arranged at all the eight corner portions in the housing 600, it is not limited to such a arrangement, but the sensor elements may be arranged at some corner portions. Moreover, the sensor elements SE1-SE8 may be arranged not only at the corner portions, but may be arranged so as to be separated from one another along an inner edge portion in the housing 600.

In addition, failure determination of the sensor elements SE1-SE8 arranged so as to be three-dimensionally separated from one another as shown in FIG. 35 can be executed by applying the processing procedure of the sensor failure determination processing explained with reference to FIG. 9.

Accordingly, maintenance, such as a replacement or repair, of the sensor elements SE1-SE8 can be performed. Moreover, it becomes possible to execute continuous structural health monitoring of building structures by adopting data measured in the sensor element which normally operates.

(Sensor Network System for Bridges)

Figure 36:
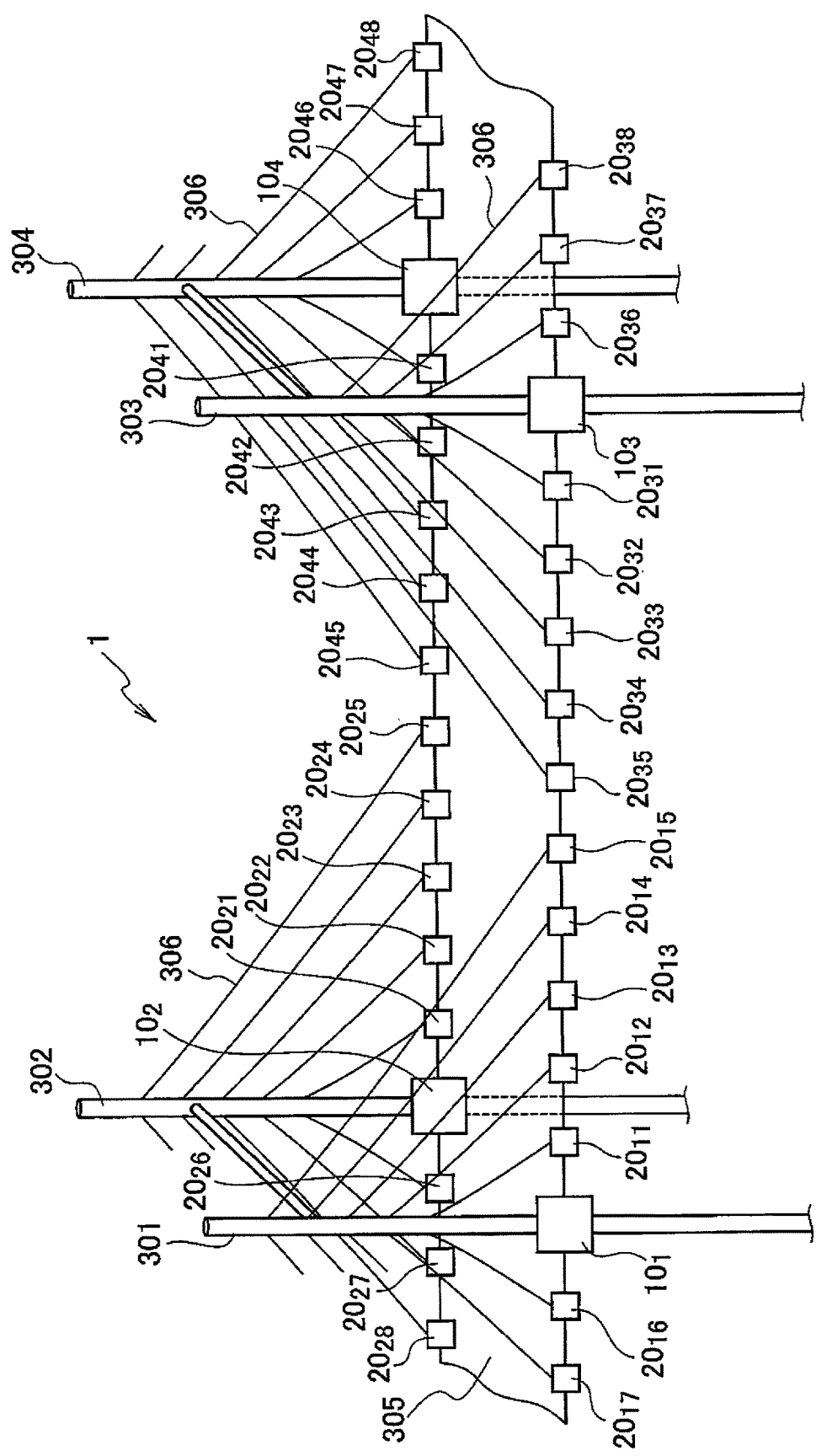
FIG. 36 is a schematic bird's-eye view configuration diagram of a wireless sensor network system for bridges to which the sensor network system according to the embodiments can be applied.

FIG. 36 shows a schematic bird's-eye view configuration of a wireless sensor network system for bridges to which the sensor network system according to the embodiments can be applied.

As shown in FIG. 36, the sensor network system 1 according to the embodiments includes: a plurality of sensor node communication terminals $(20_{11}, 20_{12}, \ldots)$ $(20_{21}, 20_{22}, \ldots)$ $(20_{31}, 20_{32}, \ldots)$, $(20_{41}, 20_{42}, \ldots)$ (respectively corresponding to the sensor node communication terminals SNi); and hosts communication terminals $10_1, 10_2, 10_3,$ and $10_4$ capable of constantly or periodically receiving measured data transmitted from the plurality of the sensor node communication terminals $(20_{11}, 20_{12}, \ldots)$, $(20_{21}, 20_{22}, \ldots)$, $(20_{31}, 20_{32}, \ldots)$, $(20_{41}, 20_{42}, \ldots)$ (respectively corresponding to the host communication terminals H1).

The host communication terminals $10_1, 10_2, 10_3,$ and $10_4$ may be respectively arranged on connected portions between the supports 301, 302, 303, 304 having a predetermined height and a road (or railroad line) 305, for example.

A plurality of wires 306 are connected between the supports 301, 302, 303, and 304 and the road (or railroad line) 305, and thereby the road (or railroad line) 305 is supported by the supports 301, 302, 303, and 304.

The plurality of the sensor node communication terminals $(20_{11}, 20_{12}, \ldots)$, $(20_{21}, 20_{22}, \ldots)$, $(20_{31}, 20_{32}, \ldots)$ $(20_{41}, 20_{42}, \ldots)$ may be arranged at connected portions between the plurality of the wires 306 and the roads (or railroad line) 305.

The plurality of the sensor node communication terminals $20_{11}, 20_{12}, \ldots$ are capable of executing wireless transmission and reception to/from the host communication terminal $10_1$, for example. Similarly, the plurality of the sensor node communication terminals $20_{21}, 20_{22}, \ldots$ are capable of executing wireless transmission and reception to/from the host communication terminal $10_2$; The plurality of the sensor node communication terminals $20_{31}, 20_{32}, \ldots$ are capable of executing wireless transmission and reception to/from the host communication terminal $10_3$; and the plurality of the sensor node communication terminals $20_{41}, 20_{42}, \ldots$ are capable of executing wireless transmission and reception to/from the host communication terminal $10_4$.

Each sensor node communication terminal $(20_{11}, 20_{12}, \ldots)$, $(20_{21}, 20_{22}, \ldots)$, $(20_{31}, 20_{32}, \ldots)$, $(20_{41}, 20_{42}, \ldots)$ can mount a plurality of the sensor elements SE1, SE2, SE3, and SE4.

Failure determinations of the sensor elements SE1, SE2, SE3, and SE4 may be respectively executed by the host communication terminals $10_1, 10_2, 10_3,$ and $10_4$. The processing procedure of the sensor failure determination processing explained with reference to FIG. 9 can be applied to the determination method thereof.

Information collected in the host communication terminals $10_1, 10_2, 10_3,$ and $10_4$ can be supplied to a cloud computing system through the Internet line etc., and then can be integrally managed therein. Accordingly, the failure determination of the sensor elements SE1, SE2, SE3, SE4 may be executed in a management company accessible to a cloud computing system.

Accordingly, maintenance, such as a replacement or repair, of the sensor elements SE1, SE2, SE3, SE4 etc. can be performed. Moreover, it becomes possible to execute continuous structural health monitoring of bridges as a kind of building structures by adopting data measured in the sensor element which normally operates.

(Other Sensor Network System for Bridges)

Figure 37:
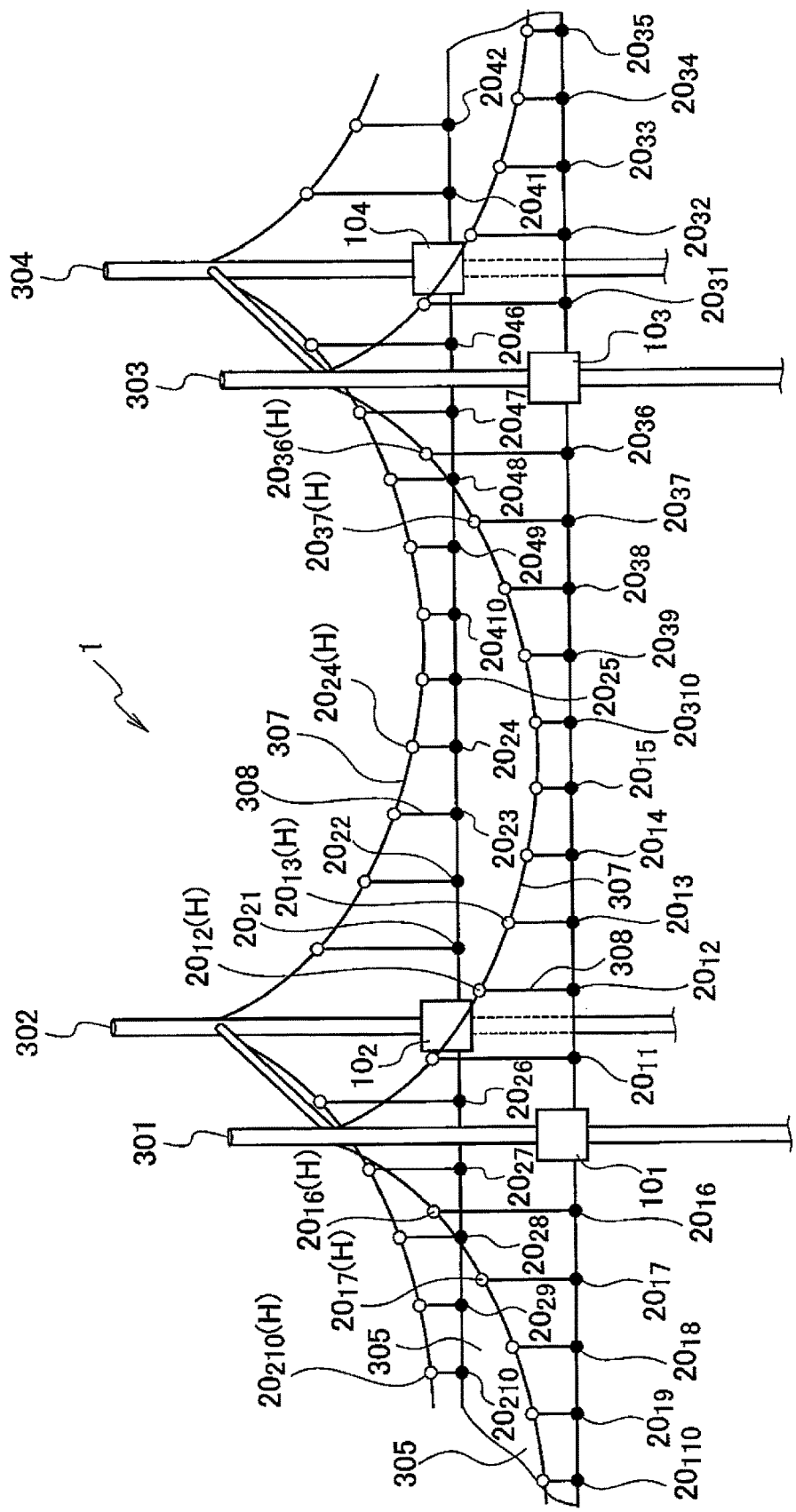
FIG. 37 is a schematic bird's-eye view configuration diagram of another wireless sensor network system for bridges to which the sensor network system according to the embodiments can be applied.

FIG. 37 shows a schematic bird's-eye view configuration of another wireless sensor network system for bridges to which the sensor network system according to the embodiments can be applied.

As shown in FIG. 37, the sensor network system 1 according to the embodiments includes: a plurality of sensor node communication terminals $(20_{11}, 20_{12}, \ldots, 20_{11}$ (H), $20_{12}$ (H), $\ldots)$, $(20_{21}, 20_{22}, \ldots, 20_{21}$ (H), $20_{22}$ (H), $\ldots)$, $(20_{31}, 20_{32}, \ldots, 20_{31}$ (H), $20_{32}$ (H), $\ldots)$, $(20_{41}, 20_{42}, \ldots, 20_{41}$ (H), $20_{42}$ (H), $\ldots)$ respectively corresponding to the sensor node communication terminals SNi): and hosts communication terminals $10_1, 10_2, 10_3,$ and $10_4$ capable of constantly or periodically receiving measured data transmitted from the plurality of the sensor node communication terminals $(20_{11}, 20_{12}, \ldots, 20_{11}$ (H) $20_{12}$ (H), $\ldots)$, $(20_{21}, 20_{22}, \ldots, 20_{21}$ (H), $20_{22}$ (H), $\ldots)$, $(20_{31}, 20_{32}, \ldots, 20_{31}$ (H), $20_{32}$ (H), $\ldots)$, $(20_{41}, 20_{42}, \ldots, 20_{41}$ (H), $20_{42}$ (H), $\ldots)$ (respectively corresponding to the host communication terminals H1).

The host communication terminals $10_1, 10_2, 10_3,$ and $10_4$ may be respectively arranged on connected portions between the supports 301, 302, 303, 304 having a predetermined height and a road (or railroad line) 305, for example.

In FIG. 37, wires 307 having suspension-bridge structure are respectively strung between supports 301, 303 and between supports 302, 304, and wires 308 are respectively strung to connected portions of the road (or railroad line) 305 in a substantially vertical direction from the wire 307 having the suspension-bridge structure, and thereby the road (or railroad line) 305 is supported by the supports 301, 302, 303, 304.

The plurality of the sensor node communication terminals ($20_{11}, 20_{12}, \ldots$), ($20_{21}, 20_{22}, \ldots$), ($20_{31}, 20_{32}, \ldots$) ($20_{41}, 20_{42}, \ldots$) may be disposed at connected portions (shown with the black circle plots) between the plurality of the wires 307 and the roads (or railroad line) 305.

Moreover, the plurality of sensor communication terminal nodes ($20_{11}$ (H), $20_{12}$ (H), ...), ($20_{21}$ (H), $20_{22}$ (H), ...), ($20_{31}$ (H), $20_{32}$ (H), ...), ($20_{41}$ (H), $20_{42}$ (H), ...) may be disposed at connected portions (shown with the white circle plots) between the wires 307 having suspension-bridge structure and the wires 308.

The plurality of the sensor node communication terminals $20_{11}, 20_{12}, \ldots, 20_{11}$ (H), $20_{12}$ (H), . . . are capable of executing wireless transmission and reception to/from the host communication terminal $10_1$, for example. Similarly, the plurality of the sensor node communication terminals $20_{21}, 20_{22}, \ldots, 20_{21}$ (H), $20_{22}$ (H), . . . are capable of executing wireless transmission and reception to/from the host communication terminal $10_2$; the plurality of the sensor node communication terminals $20_{31}, 20_{32}, \ldots, 20_{31}$ (H), $20_{32}$ (H), . . . are capable of executing wireless transmission and reception to/from the host communication terminal $10_3$; and the plurality of the sensor node communication terminals $20_{41}, 20_{42}, \ldots, 20_{41}$ (H), $20_{42}$ (H), . . . are capable of executing wireless transmission and reception to/from the host communication terminal $10_4$.

Each sensor node communication terminal ($20_{11}, 20_{12}, \ldots, 20_{11}$ (H), $20_{12}$ (H), ...), ($20_{21}, 20_{22}, \ldots, 20_{21}$ (H), $20_{22}$ (H), ...), ($20_{31}, 20_{32}, \ldots, 20_{31}$ (H), $20_{32}$ (H), ...), ($20_{41}, 20_{42}, \ldots, 20_{41}$ (H), $20_{42}$ (H), ...) can mount a plurality of the sensor elements SE1, SE2, SE3, and SE4.

Failure determinations of the sensor elements SE1, SE2, SE3, and SE4 may be respectively executed by the host communication terminals $10_1, 10_2, 10_3,$ and $10_4$. The processing procedure of the sensor failure determination processing explained with reference to FIG. 9 can be applied to the determination method thereof.

Information collected in the host communication terminals $10_1, 10_2, 10_3,$ and $10_4$ can be supplied to a cloud computing system through the Internet line etc., and then can be integrally managed therein. Accordingly, the failure determination of the sensor elements SE1, SE2, SE3, and SE4 may be executed in a management company accessible to a cloud computing system.

Accordingly, maintenance, such as a replacement or repair, of the sensor elements SE1, SE2, SE3, SE4 etc. can be performed. Moreover, it becomes possible to execute continuous structural health monitoring of bridges as a kind of building structures by adopting data measured in the sensor element which normally operates.

(Sensor Network System for Farms)

Figure 38:
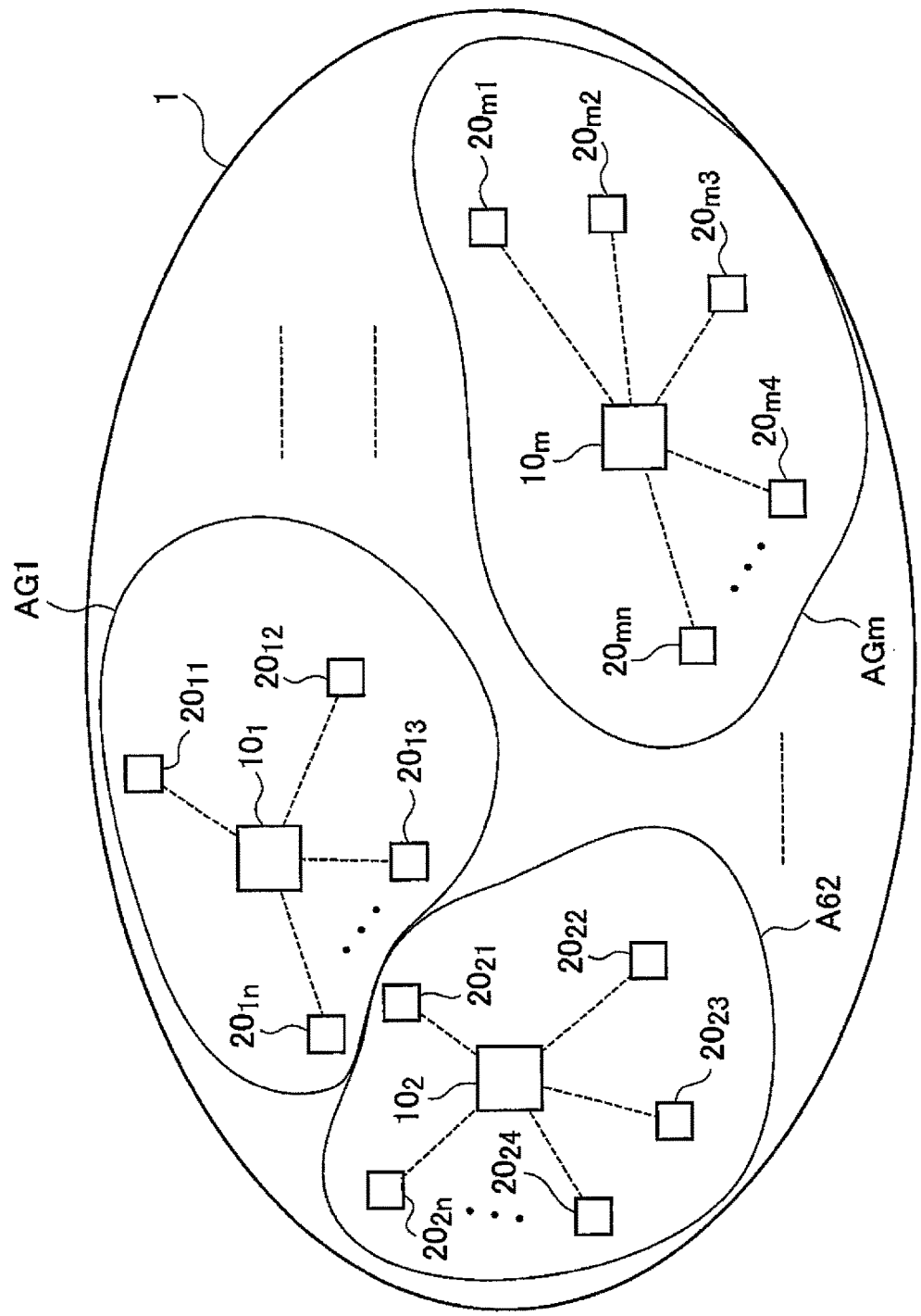
FIG. 38 is a schematic configuration diagram of a wireless sensor network system for farms to which the sensor network system according to the embodiments can be applied.

FIG. 38 shows a schematic configuration of a wireless sensor network system for farms to which the sensor network system according to the embodiments can be applied.

As shown in FIG. 38, the sensor network system according to the embodiments may be configured to include a plurality of small-scaled wireless sensor network system for farms AG1, AG2, . . . , AGm.

The plurality of the small-scaled wireless sensor network system for farms AG1, AG2, . . . , AGm may be separated in the unit of crops to be cultivated, for example.

As shown in FIG. 38, the sensor network system 1 according to the embodiments includes: a plurality of sensor node communication terminals ($20_{11}, 20_{12}, \ldots, 20_{1n}$), ($20_{21}, 20_{22}, \ldots, 20_{2n}$), . . . , ($20_{m1}, 20_{m2}, \ldots, 20_{mn}$); and a plurality of hosts $10_1, 10_2, \ldots, 10_m$ capable of constantly or periodically receiving first wireless transmission data transmitted from the plurality of the sensor nodes sensor node communication terminals ($20_{11}, 20_{12}, \ldots, 20_{1n}$), ($20_{21}, 20_{22}, \ldots, 20_{2n}$), . . . , ($20_{m1}, 20_{m2}, \ldots, 20_{mn}$).

The plurality of the sensor node communication terminals $20_{11}, 20_{12}, \ldots, 20_{1n}$ are capable of executing wireless transmission and reception to/from the host communication terminal $10_1$, for example. Similarly, the plurality of the sensor node communication terminals $20_{21}, 20_{22}, \ldots, 20_{2n}$ are capable of executing wireless transmission and reception to/from the host communication terminal $10_2$; and the plurality of the sensor node communication terminals $20_{m1}, 20_{m2}, \ldots, 20_{mn}$ are capable of executing wireless transmission and reception to/from the host communication terminal $10_m$.

The plurality of the sensor node communication terminals ($20_{11}, 20_{12}, \ldots, 20_{1n}$), ($20_{21}, 20_{22}, \ldots, 20_{2n}$), . . . , ($20_{m1}, 20_{m2}, \ldots, 20_{mn}$) respectively include sensor elements SE1, SE2, SE3, and SE4 for obtaining sensor information according to respective crops.

Failure determinations of the sensor elements SE1, SE2, SE3, and SE4 may be respectively executed by the host communication terminals $10_1, 10_2, \ldots, 10_m$. The processing procedure of the sensor failure determination processing explained with reference to FIG. 9 can be applied to the determination method thereof.

Information collected in the host communication terminals $10_1, 10_2, \ldots, 10_m$ can be supplied to a cloud computing system through the Internet line etc., and then can be integrally managed therein. Accordingly, the failure determination of the sensor elements SE1, SE2, SE3, and SE4 may be executed in a management company accessible to a cloud computing system.

Accordingly, maintenance, such as a replacement or repair, of the sensor elements SE1, SE2, SE3, SE4 etc. can be performed. Moreover, it becomes possible to execute continuous monitoring of farms by adopting data measured in the sensor element which normally operates.

As explained above, according to the embodiments, there can be provided: the sensor network system capable of executing the self-diagnostics of the sensor element and/or the sensor node communication terminal and also capable of executing continuously the conservation and maintenance thereof; and the operational method of such a sensor network system.

Other Embodiments

As explained above, the embodiments have been described, as a disclosure including associated description and drawings to be construed as illustrative, not restrictive. This disclosure makes clear a variety of alternative embodiments, working examples, and operational techniques for those skilled in the art.

Such being the case, the embodiments described herein cover a variety of embodiments, whether described or not.

INDUSTRIAL APPLICABILITY

The sensor network system of the embodiments can be applied to infrastructures monitoring of various kinds of building structures, e.g. bridges, roads, railroad services, and buildings. Furthermore, it is not limited to the building structures, but also is various fields, e.g.: air pollution; forest fire; quality control of wine brewing; care of children who play outdoors; care of people who play sports; detection of smartphones; surrounding access control to nuclear power plants, defense facilities, etc.; detection of radioactivity levels of nuclear power plants; control of intensity levels of electromagnetic fields; grasp of traffic congestion situations, e.g. traffic jams; smart roads; smart lightings; high-function shopping; noise environment maps; high-efficiency shipment of vessels; water quality managements; refuse disposal managements; smart parking; managements of golf courses; managements of water leakage/gas leakage; managements of automatic driving; efficiently arrangements and managements of infrastructures in urban areas; farms, etc.

What is claimed is:

1. A sensor network system comprising:
   a sensor object;
   a plurality of sensor node communication terminals mounted on the sensor object, the plurality of the sensor node communication terminals respectively comprising a plurality of sensor elements having a function equivalent to one another;
   a data server configured to store sensor information for every plurality of the sensor node communication terminals obtained by the plurality of the sensor elements; and
   a data management unit configured to analyze the sensor information stored in the data server, wherein
   each sensor node communication terminal removes a noise from the sensor information obtained by each sensor element in each sensor node communication terminal and transmits the sensor information to the data server, and
   the data management unit executes self-diagnostics of failures of the plurality of the sensor elements and the plurality of the sensor node communication terminals in accordance with a failure diagnosis algorithm, on the basis of the sensor information of each sensor element received and stored by the data server, the sensor information from which the noise has been removed, and thereby maintenance of the sensor element or sensor node communication terminal determined to be in failure can be performed.

2. The sensor network system according to claim 1, further comprising:
   a cloud computing system connectable to the plurality of the sensor node communication terminals through an Internet, wherein
   the data management unit is connected to the cloud computing system through a first exclusive Internet, and
   the data server is connected to the cloud computing system through a second exclusive Internet.

3. The sensor network system according to claim 2, wherein
   the data management unit can access to the data server through the first exclusive Internet, the cloud computing system, and the second exclusive Internet.

4. The sensor network system according to claim 2, wherein
   the sensor node communication terminal and the cloud computing system connectable through the Internet can be connected to each other by any one of wired communication or wireless communication.

5. A sensor network system comprising:
   a sensor object;
   a plurality of sensor node communication terminals mounted on the sensor object, the plurality of the sensor node communication terminals respectively comprising a plurality of sensor elements having a function equivalent to one another; and
   a host communication terminal comprising a data storage unit and a data management unit, the data storage unit configured to collect and store sensor information for the plurality of every sensor node communication terminals obtained in the plurality of the sensor elements, the data management unit configured to analyze the sensor information stored in the data storage unit, wherein
   each sensor node communication terminal removes a noise from the sensor information obtained by each sensor element in each sensor node communication terminal and transmits the sensor information to the data server, and
   the data management unit executes self-diagnostics of failures of the plurality of the sensor elements and the plurality of the sensor node communication terminals in accordance with a failure diagnosis algorithm, on the basis of the sensor information of each sensor element received and stored by the data server, the sensor information from which the noise has been removed, and thereby maintenance of the sensor element or sensor node communication terminal determined to be in failure can be performed.

6. A sensor network system comprising:
   a sensor object;
   a plurality of sensor node communication terminals mounted on the sensor object, the plurality of the sensor node communication terminals respectively comprising a plurality of sensor elements having a function equivalent to one another;
   a host communication terminal configured to collect sensor information for every plurality of the sensor node communication terminals obtained by the plurality of the sensor elements;
   a data server configured to store the sensor information for every plurality of the sensor node communication terminals obtained by the plurality of the sensor elements; and
   a data management unit configured to analyze the sensor information stored in the data server, wherein
   each sensor node communication terminal removes a noise from the sensor information obtained by each sensor element in each sensor node communication terminal and transmits the sensor information to the data server, and
   the data management unit executes self-diagnostics of failures of the plurality of the sensor elements and the plurality of the sensor node communication terminals in accordance with a failure diagnosis algorithm, on the basis of the sensor information of each sensor element received and stored by the data server, the sensor information from which the noise has been removed, and thereby maintenance of the sensor element or sensor node communication terminal determined to be in failure can be performed.

7. The sensor network system according to claim 5, wherein
the plurality of the sensor node communication terminals and the host communication terminals can be connected to each other by any one of wired communication or wireless communication.

8. The sensor network system according to claim 6, further comprising:
a cloud computing system connectable to the plurality of the host communication terminals through an Internet, wherein
the data management unit is connected to the cloud computing system through a first exclusive Internet, and
the data server is connected to the cloud computing system through a second exclusive Internet.

9. The sensor network system according to claim 8, wherein
the data management unit can access to the data server through the first exclusive Internet, the cloud computing system, and the second exclusive Internet.

10. The sensor network system according to claim 8, wherein
the host communication terminal and the cloud computing system connectable through the Internet can be connected to each other by any one of wired communication or wireless communication.

11. A sensor network system comprising:
a sensor object;
a plurality of group network systems mounted on the sensor object, the plurality of the group network systems respectively including a plurality of sensor node communication terminals and a host communication terminal, each of the sensor node communication terminals including a plurality of sensor elements, each of the sensor elements having a function equivalent to one another, the host communication terminal configured to collect sensor information for every plurality of the sensor node communication terminals obtained by the plurality of the sensor elements;
a data server configured to store the sensor information for every plurality of the sensor node communication terminals obtained by the plurality of the sensor elements; and
a data management unit configured to analyze the sensor information stored in the data server, wherein
each sensor node communication terminal removes a noise from the sensor information obtained by each sensor element in each sensor node communication terminal and transmits the sensor information to the data server, and
the data management unit executes self-diagnostics of failures of the plurality of the sensor elements and the plurality of the sensor node communication terminals in accordance with a failure diagnosis algorithm, on the basis of the sensor information of each sensor element received and stored by the data server, the sensor information from which the noise has been removed, and thereby maintenance of the sensor element or sensor node communication terminal determined to be in failure can be performed.

12. The sensor network system according to claim 11, wherein
the plurality of the sensor node communication terminals and the host communication terminals can be connected to each other by any one of wired communication or wireless communication, in the plurality of the group network systems.

13. The sensor network system according to claim 11, further comprising:
a cloud computing system connectable to the plurality of the host communication terminals through an Internet, wherein
the data management unit is connected to the cloud computing system through a first exclusive Internet, and
the data server is disposed in the cloud computing system.

14. The sensor network system according to claim 13, wherein
the data management unit is accessible to the data server through the first exclusive Internet.

15. The sensor network system according to claim 13, wherein
the host communication terminal and the cloud computing system connectable through the Internet can be connected to each other by any one of wired communication or wireless communication.

16. An operational method of a sensor network system comprising:
in a plurality of sensor node communication terminals mounted on a sensor object, the plurality of the sensor node communication terminals respectively comprising a plurality of sensor elements having a function equivalent to one another,
obtaining sensor information by each sensor element in each sensor node communication terminal;
removing a noise from the sensor information obtained by each sensor node communication terminal and transmitting the sensor information to a data management unit;
receiving, by the data management unit, measured values of the sensor information from which the noise has been removed of a plurality of sensor elements, and storing the received measured values therein;
excepting, by the data management unit, a sensor element already failed therefrom to be analyzed;
determining, by the data management unit, whether or not a variation in each measured value is within a relationship range;
analyzing, by the data management unit, the measured value of an available sensor element if a result of the determination is YES;
determining, by the data management unit, the corresponding sensor element as a failure if the result of the determination is NO, and analyzing the measured value of the available sensor element;
determining, by the data management unit, whether or not a failure level is not less than a reference value;
completing, by the data management unit, failure determination if the failure level is less than the reference value;
performing, by the data management unit, maintenance of the corresponding sensor element if the failure level is not less than the reference value; and
completing, by the data management unit, the failure determination after resetting failure information of the corresponding sensor element.

* * * * *